(12) United States Patent
Magnan et al.

(10) Patent No.: US 11,078,583 B2
(45) Date of Patent: *Aug. 3, 2021

(54) PROCESSES FOR PREPARING LITHIUM HYDROXIDE

(71) Applicant: NEMASKA LITHIUM INC., Québec (CA)

(72) Inventors: Jean-François Magnan, Neuville (CA); Guy Bourassa, Québec (CA); Gary Pearse, Ottawa (CA); Peter Symons, Williamsville, NY (US); J. David Genders, Elma, NY (US)

(73) Assignee: NEMASKA LITHIUM INC., Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,173

(22) Filed: Sep. 23, 2019

(65) Prior Publication Data

US 2020/0087804 A1 Mar. 19, 2020

Related U.S. Application Data

(63) Continuation of application No. 14/776,922, filed as application No. PCT/CA2014/000264 on Mar. 17, 2014, now abandoned.

(Continued)

(51) Int. Cl.
*C25B 15/02* (2006.01)
*C25B 1/16* (2006.01)
(Continued)

(52) U.S. Cl.
CPC .............. *C25B 15/02* (2013.01); *B01D 61/44* (2013.01); *B01D 61/445* (2013.01); *C25B 1/00* (2013.01);
(Continued)

(58) Field of Classification Search
CPC .. C25B 15/02; C25B 9/08; C25B 1/00; C25B 13/02; C25B 1/16; B01D 61/44; B01D 61/445; Y02E 60/366
See application file for complete search history.

(56) References Cited

U.S. PATENT DOCUMENTS 2,331,838 A 10/1943 Lindblad et al.
2,516,109 A 7/1950 Ellestad et al.
(Continued)

FOREIGN PATENT DOCUMENTS

AU 2012211033 8/2012
AU 2012261548 1/2013
(Continued)

OTHER PUBLICATIONS

John Jacco Krol, "Monopolar and Bipolar Ion Exchange Membranes", Mass Transport Limitations, published on Aug. 25, 1969.

(Continued)

*Primary Examiner* — Arun S Phasge
(74) *Attorney, Agent, or Firm* — Bereskin & Parr LLP/S.E.N.C.R.L., s.r.l.

(57) ABSTRACT

There are provided processes for preparing lithium hydroxide that comprise submitting an aqueous composition comprising a lithium compound to an electrolysis or an electrodialysis under conditions suitable for converting at least a portion of the lithium compound into lithium hydroxide. For example, the lithium compound can be lithium sulphate and the aqueous composition can be at least substantially maintained at a pH having a value of about 1 to about 4.

18 Claims, 38 Drawing Sheets

Related U.S. Application Data

(60) Provisional application No. 61/788,292, filed on Mar. 15, 2013.

(51) Int. Cl.

| | |
|---|---|
| *B01D 61/44* | (2006.01) |
| *C25B 9/19* | (2021.01) |
| *C25B 1/00* | (2021.01) |
| *C25B 13/02* | (2006.01) |

(52) U.S. Cl.
CPC .................. *C25B 1/16* (2013.01); *C25B 9/19* (2021.01); *C25B 13/02* (2013.01); *Y02E 60/36* (2013.01)

(56) References Cited

U.S. PATENT DOCUMENTS

| | | | |
|---|---|---|---|
| 2,793,941 A | 5/1957 | Estes | |
| 2,872,393 A | 2/1959 | Gardiner et al. | |
| 3,007,771 A | 11/1961 | Mazza et al. | |
| 3,214,362 A | 10/1965 | Juda | |
| 3,597,340 A | 8/1971 | Honeycutt et al. | |
| 3,857,920 A | 12/1974 | Grantham et al. | |
| 3,899,403 A | 8/1975 | Cook, Jr. et al. | |
| 3,994,741 A * | 11/1976 | Robinson ................ C04B 33/13 501/131 | |
| 4,035,713 A | 7/1977 | Kawamoto et al. | |
| 4,036,713 A | 7/1977 | Brown | |
| 4,207,297 A | 6/1980 | Brown et al. | |
| 4,273,628 A | 6/1981 | Kidon et al. | |
| 4,287,163 A | 9/1981 | Garrett et al. | |
| 4,391,680 A | 7/1983 | Mani et al. | |
| 4,561,945 A | 12/1985 | Coker et al. | |
| 4,707,234 A | 11/1987 | Mori et al. | |
| 4,723,962 A | 2/1988 | Mehta | |
| 4,806,215 A | 2/1989 | Twardowski | |
| 4,999,095 A | 3/1991 | Chlanda et al. | |
| 5,120,576 A | 6/1992 | Goldsmith et al. | |
| 5,129,936 A | 7/1992 | Wilson | |
| 5,198,080 A | 3/1993 | Cowley et al. | |
| 5,198,081 A | 3/1993 | Kanoh et al. | |
| 5,227,031 A | 7/1993 | Sundblad | |
| 5,246,551 A | 9/1993 | Pletcher et al. | |
| 5,258,103 A | 11/1993 | Habermann et al. | |
| 5,423,959 A | 6/1995 | Sundblad et al. | |
| 5,445,717 A | 8/1995 | Kärki et al. | |
| 5,595,641 A | 1/1997 | Traini et al. | |
| 5,788,943 A | 8/1998 | Aladjov | |
| 6,004,445 A | 12/1999 | Genders et al. | |
| 6,048,507 A | 4/2000 | Amouzegar et al. | |
| 6,306,787 B1 | 10/2001 | Sato et al. | |
| 6,331,236 B1 | 12/2001 | Mani | |
| 6,375,824 B1 | 4/2002 | Phinney | |
| 6,514,311 B1 | 2/2003 | Lin et al. | |
| 6,514,640 B1 | 2/2003 | Armand et al. | |
| 6,547,836 B1 | 4/2003 | Lukes | |
| 6,592,832 B1 | 7/2003 | Friedrich et al. | |
| 6,747,065 B1 | 6/2004 | Paszkowski | |
| 6,770,187 B1 | 8/2004 | Pütter et al. | |
| 7,192,564 B2 | 3/2007 | Cardarelli et al. | |
| 7,695,649 B2 | 4/2010 | Paulsen et al. | |
| 8,431,005 B1 | 4/2013 | Zbranek et al. | |
| 8,715,482 B2 | 5/2014 | Amendola et al. | |
| 8,936,770 B2 | 1/2015 | Burba, III | |
| 9,255,011 B2 | 2/2016 | Kawata et al. | |
| 9,255,012 B2 | 2/2016 | Tiihonen et al. | |
| 9,382,126 B2 | 7/2016 | Bourassa et al. | |
| 9,447,480 B2 | 9/2016 | Vaughan et al. | |
| 9,493,881 B2 | 11/2016 | Kosmoski et al. | |
| 9,677,181 B2 * | 6/2017 | Bourassa ................ C25B 1/16 | |
| 9,890,053 B2 | 2/2018 | Bourassa et al. | |
| 10,036,094 B2 | 7/2018 | Magnan et al. | |
| 10,066,305 B2 | 9/2018 | Bourassa et al. | |
| 10,144,990 B2 | 12/2018 | Bourassa et al. | |
| 10,450,630 B2 | 10/2019 | Johnson et al. | |
| 10,544,512 B2 | 1/2020 | Magnan et al. | |
| 10,597,305 B2 | 3/2020 | Magnan et al. | |
| 10,633,748 B2 | 4/2020 | Bourassa et al. | |
| 10,661,227 B2 | 5/2020 | Park et al. | |
| 10,800,663 B2 | 10/2020 | Bourassa et al. | |
| 2001/0040093 A1 | 11/2001 | Mani | |
| 2005/0051488 A1 | 3/2005 | Nagghappan et al. | |
| 2006/0105239 A1 | 5/2006 | Paulsen et al. | |
| 2011/0044882 A1 | 2/2011 | Buckley et al. | |
| 2011/0123427 A1 | 5/2011 | Boryta et al. | |
| 2011/0200508 A1 | 8/2011 | Harrison et al. | |
| 2011/0203929 A1 * | 8/2011 | Buckley ................ B01D 61/445 204/537 | |
| 2012/0107210 A1 | 5/2012 | Harrison et al. | |
| 2014/0010743 A1 | 1/2014 | Kosmoski et al. | |
| 2014/0023572 A1 | 1/2014 | Vaughan et al. | |
| 2014/0037521 A1 * | 2/2014 | Harrison ............ C01G 45/1228 423/179.5 | |
| 2015/0139886 A1 | 5/2015 | Bourassa et al. | |
| 2015/0364761 A1 | 12/2015 | Fukui et al. | |
| 2016/0032471 A1 | 2/2016 | Magnan et al. | |
| 2016/0258071 A1 | 9/2016 | Magnan et al. | |
| 2016/0304988 A1 | 10/2016 | Vaughan et al. | |
| 2017/0233848 A1 | 8/2017 | Johnson et al. | |
| 2018/0244531 A1 | 8/2018 | Magnan et al. | |
| 2019/0032227 A1 | 1/2019 | Lipp et al. | |
| 2019/0345582 A1 | 11/2019 | Bourassa et al. | |
| 2020/0115807 A1 | 4/2020 | Magnan et al. | |
| 2020/0376409 A1 | 12/2020 | Magnan et al. | |
| 2020/0407237 A1 | 12/2020 | Bourassa et al. | |
| 2021/0024362 A1 | 1/2021 | Bourassa et al. | |

FOREIGN PATENT DOCUMENTS

| | | |
|---|---|---|
| CA | 504477 | 7/1954 |
| CA | 659894 | 3/1963 |
| CA | 1073847 | 3/1980 |
| CA | 1272982 | 8/1990 |
| CA | 2205199 | 1/1997 |
| CA | 2205493 | 1/1997 |
| CA | 2786317 | 7/2011 |
| CA | 2796849 | 10/2011 |
| CA | 2820112 | 6/2012 |
| CA | 2825583 | 8/2012 |
| CN | 103086405 | 5/2013 |
| CN | 106315625 | 1/2017 |
| CN | 106365181 | 2/2017 |
| CN | 109694957 | 4/2019 |
| GB | 530028 | 12/1940 |
| GB | 841989 | 7/1960 |
| GB | 845511 | 8/1960 |
| JP | 5795826 | 6/1982 |
| JP | 2008166269 | 7/2008 |
| JP | 2009298679 | 12/2009 |
| JP | 2010080394 | 4/2010 |
| JP | 2013173629 | 9/2013 |
| JP | 2013227180 | 11/2013 |
| RU | 2196735 | 1/2003 |
| SU | 310538 | 8/1974 |
| WO | 9859385 | 12/1998 |
| WO | 2010056322 | 5/2010 |
| WO | 2010103173 | 9/2010 |
| WO | 2011133165 | 10/2011 |
| WO | 2011148040 | 12/2011 |
| WO | 2011156861 | 12/2011 |
| WO | 2013140039 | 9/2013 |
| WO | 2013153692 | 10/2013 |
| WO | 2013159194 | 10/2013 |
| WO | 2013182749 | 12/2013 |
| WO | 2014040138 | 3/2014 |
| WO | 2014138933 | 9/2014 |
| WO | 2015081385 | 6/2015 |
| WO | 2017144469 | 8/2017 |
| WO | 2017157906 | 9/2017 |
| WO | 2018223192 | 12/2018 |
| WO | 2018223193 | 12/2018 |

(56) References Cited

FOREIGN PATENT DOCUMENTS

| WO | 2018227237 | 12/2018 |
|---|---|---|
| WO | 2018234614 | 12/2018 |
| WO | 2019059654 | 3/2019 |

OTHER PUBLICATIONS

Walesh, S.G. (Feb. 21, 1989) Sedimentation Basin Design, in Urban Surface Water Management, pp. 297-313, John Wiley & Sons, Inc., Hoboken, NJ, USA, DOI: 10.002/9780470172810.

Tongwen Xu, "Ion exchange membranes: State of their development and perspective", Journal of Membrane Science 263 (2005) 1-29.

English Abstract of KR20130092323(A), "Lithium Compound Recovering Device, Method for Recovering Lithium Compound and Lithium Compound Recovering System", published on Aug. 20, 2013.

Ryabtsev et al., "Preparation of High-Purity Lithium Hydroxide Monohydrate from Technical-Grade Lithium Carbonate by Membrane Electrolysis", Russian Journal of Applied Chemistry, vol. 77, No. 7, 2004, pp. 1108-1116. (The year of publication is sufficiently earlier than the effective U.S. filing date so that the particular month of publication is not an issue).

English Abstract of PH12013501570A1, "Improved Method of Ore Processing", published on Sep. 30, 2013.

English Abstract of CL2012002968(A1), "Method for preparing lithium carbonate from brines containing lithium chloride which comprises contacting the salumera with sodium hydroxide and then contacting with carbon dioxide", published on Jan. 11, 2013.

English Abstract of Helmold v. Plessen, Heinz Kau, "Utilization of sodium sulphate", Chem.-Ing.-Tech. 61 (1989) 12, pp. 933-940. (The year of publication is sufficiently earlier than the effective U.S. filing date so that the particular month of publication is not an issue).

Ulrich Joachim, "Crystallization", Kirk Othmer Encyclopedia of Chemical Technology, vol. 8 (Aug. 16, 2002), pp. 95-147.

English Abstract—Machine Translation of JP2013227180A, "Method for Producing Lithium Sulfide", published on Nov. 7, 2013.

English Abstract—Machine Translation of JPS5798826A, "Manufacture of High Purity Lithium Salt of Mineral Acid", published on Jun. 14, 1982.

English Translation—Machine Generated—Description of SU310538, published on Aug. 5, 1974.

Tipping et al., "Conditions Required for the Precipitation of Aluminium in Acidic Natural Waters", Wat. Res. vol. 22, No. 5, pp. 585-592, 1988. (The year of publication is sufficiently earlier than the effective U.S. filing date so that the particular month of publication is not an issue).

English Translation—Machine Generated of CN106315625(A), "Method for composite production of high-purity lithium hydroxide monohydrate, high-purity lithium carbonate and battery grade lithium carbonate", published on Jan. 11, 2017.

English Translation—Machine Generated of CN106365181(A), "Method of preparing battery-grade lithium carbonate from lithium-rich solution being high in content of impurities", published on Feb. 1, 2017.

Ogawa et al., "Effects of the Chemical Compositions of Salars de Uyuni and Atacama Brines on Lithium Concentration during Evaporation" Resource Geology, vol. 64, No. 2: 91-101, Mar. 2014.

English Abstract of China Lithium Products Tech. Co., Ltd., "Lithium Hydroxide Purified Grade", Published on Jun. 6, 2011.

English Abstract of Scribd, "Extraction, Properties and Use of Lithium", Published on Feb. 2, 2009.

English Abstract of Sun et al., "Preparation of Li2CO3 by Gas-Liquid Reactive Crystallization of LiOH and CO2", Published on Jan. 31, 2012.

English Abstract of CN102030346 (A), "Preparation method for lithium carbonate", Published on Apr. 27, 2011.

English Abstract of JP62161973A, "Production of High-Purity Lithium Carbonate", Published on Jul. 17, 1987.

English Abstract of JP2004196606(A), "Method for Manufacturing High Purity Lithium Carbonate", Published on Jul. 15, 2004.

English Abstract of JP2004196607(A), "Method for Manufacturing High Purity Lithium Carbonate", Published on Jul. 15, 2004.

English Abstract of JP2009046390(A), "Production Method of High Purity Lithium Carbonate", Published on Mar. 5, 2009.

English Abstract of JP2009057278(A), "Method of Manufacturing High Purity Lithium Carbonate", Published on Mar. 19, 2009.

English Abstract of JP2010029797 (A), "Lithium Isotope Separation and Condensation Method, Apparatus, Measure, Lithium Ion Selective Permeation Membrane, and Lithium Isotope Concentrate", Published on Feb. 12, 2010.

English Abstract of JP2009270189A, "Method of Manufacturing High-Purity Lithium Hydroxide", published on Nov. 19, 2009.

English Abstract of JP2011031232, "Method of Manufacturing Lithium Hydroxide", published on Feb. 17, 2011.

English Abstract of JPS5443174(A), "Preparation of Lithium Hydroxide", Published on Apr. 5, 1979.

English Abstract of JP2009270188(A), "Method of Manufacturing High-Purity Lithium Hydroxide", published on Nov. 19, 2009.

Koter et al., "Electromembrane Processes in Environment Protection", Polish Journal of Environmental Studies vol. 9, No. 1 (2000), 45-56.

Rjabtsev Ad. et al., Abstract and Figure 1 of RU2196735C1, "Process of Extracting Monohydrate of High-Purity Lithium Hydroxide From Materials Containing Lithium Carbonate", Published on Jan. 20, 2003.

Rjabtsev Ad. et al., English Translation of Abstract and Figure 1 of RU2196735C1, "Process of Extracting Monohydrate of High-Purity Lithium Hydroxide From Materials Containing Lithium Carbonate", Published on Jan. 20, 2003.

English Translation—Machine Generated of WO2019059654A1, "Cathode Active Material Precursor for Secondary Battery, Cathode Active Material, and Lithium Secondary Battery Comprising Same", Published on Mar. 28, 2019.

English Abstract of JP2013173629A, "Method of Producing High-Purity Lithium Hydroxide", Published on Sep. 5, 2013.

Sitando et al., "Processing of a Zimbabwean Petalite to Obtain Lithium Carbonate", International Journal of Mineral Processing, 102-103 (2012) 45-50 (Available Online: Oct. 5, 2011).

Ryabtsev et al., "Preparation of High-Purity Lithium Hydroxide Monohydrate From Technical-Grade Lithium Carbonate by Membrane Electrolysis", Russian Journal of Applied Chemistry, vol. 77, No. 7, Feb. 2004, pp. 1108-1116.

English Translation of RU2196735C1, "Method for Producing High Purity Lithium Hydroxide Monohydrate From Materials Containing Lithium Carbonate", Published on Jan. 20, 2003.

Communication pursuant to Rule 114(2) EPC—Third Party Observation for application No. EP20140764466 dated Jan. 13, 2021.

English Translation—Machine Generated of CN103086405A, "Clean Production Method of Battery Level Lithium Carbonate", Published on May 8, 2013.

English Translation—Machine Generated of CN109694957A, "A Lithium Ion Battery Using Ion Liquid Extraction Method of the Metal Ion of the Leachate", Published on Apr. 30, 2019.

English Translation—Machine Generated of JP2008166269A, "Li-Ni Compound Oxide Particle Powder for Nonaqueous Electrolyte Secondary Battery and Its Manufacturing Method, As Well As Nonaqueous Electrolyte Secondary Battery", Published on Jul. 17, 2008.

English Translation—Machine Generated of JP2009298679A, "Production Method of Aluminium-Containing Nickel Hydroxide Particle", Published on Dec. 24, 2009.

English Translation—Machine Generated of JP2010080394A, "Positive Electrode Active Material for Nonaqueous Electrolyte Secondary Battery and Manufacturing Method Therefor, and Nonaqueous Electrolyte Secondary Battery", Published on Apr. 8, 2010.

English Translation of WO2013153692A1, "Method for Recovering Lithium", Published on Oct. 17, 2013.

\* cited by examiner ural brines are also associated with high concentrations of magnesium or other metals which can make lithium recovery uneconomical. Thus, the production of lithium hydroxide monohydrate from natural brines can be a difficult task.

PROCESSES FOR PREPARING LITHIUM HYDROXIDE

The present application is a continuation of U.S. Ser. No. 14/776,922 filed on Sep. 15, 2015 that is a 35 USC 371 national state entry of PCT/CA2014/000264 filed on Mar. 17, 2014 and which claims priority on U.S. 61/788,292 filed on Mar. 15, 2013. These documents are hereby incorporated by reference in their entirety.

The present disclosure relates to improvements in the field of chemistry applied to the manufacture of lithium hydroxide. For example, such processes are useful for preparing lithium hydroxide from lithium-containing materials. For example, the disclosure also relates to the production of other lithium products such as lithium carbonate and lithium sulphate.

The demand for lithium hydroxide is growing rapidly. The market for lithium hydroxide is expanding and the current world production capacity will likely not meet the expected increase in demand. For example, lithium hydroxide is used for purification of gases and air (as a carbon dioxide absorbent), as a heat transfer medium, as a storage-battery electrolyte, as a catalyst for polymerization, in ceramics, in Portland cement formulations, in manufacturing other lithium compounds and in esterification, especially for lithium stearate.

Lithium batteries have become the battery of choice in several existing and proposed new applications due to their high energy density to weight ratio, as well as their relatively long useful life when compared to other types of batteries. Lithium batteries are used for several applications such as laptop computers, cell phones, medical devices and implants (for example cardiac pacemakers). Lithium batteries are also an interesting option in the development of new automobiles, e.g., hybrid and electric vehicles, which are both environmentally friendly and "green" because of reduced emissions and decreased reliance on hydrocarbon fuels.

High purity can be required for lithium hydroxide that is used, for example, for various battery applications. There is a limited number of lithium hydroxide producers. As a direct result of increased demand for lithium products, battery manufacturers are looking for additional and reliable sources of high quality lithium products, for example lithium hydroxide.

Few methods have been proposed so far for preparing lithium hydroxide. One of them being a method that uses natural brines as a starting material. Battery applications can require very low levels of impurities, notably sodium, calcium and chlorides. The production of lithium hydroxide product with a low impurities content can be difficult unless one or more purification steps are performed. These additional purification steps add to the time and cost of the manufacture of the desired lithium hydroxide product. Natural brines are also associated with high concentrations of magnesium or other metals which can make lithium recovery uneconomical. Thus, the production of lithium hydroxide monohydrate from natural brines can be a difficult task.

There is thus a need for providing an alternative to the existing solutions for preparing lithium hydroxide.

According to one aspect, there is provided a process for preparing lithium hydroxide, the process comprising:

submitting an aqueous composition comprising a lithium compound to an electrolysis or an electrodialysis under conditions suitable for converting at least a portion of the lithium compound into lithium hydroxide.

According to another aspect, there is provided a process for preparing lithium hydroxide, the process comprising:

submitting an aqueous composition comprising a lithium compound to an electrolysis or an electrodialysis under conditions suitable for converting at least a portion of the lithium compound into lithium hydroxide, wherein during the electrolysis or the electrodialysis, the aqueous composition comprising the lithium compound is at least substantially maintained at a pH having a value of about 1 to about 4.

According to another aspect, there is provided a process for preparing lithium hydroxide, the process comprising:

submitting an aqueous composition comprising lithium sulphate to an electrolysis or an electrodialysis under conditions suitable for converting at least a portion of the lithium sulphate into lithium hydroxide, wherein during the electrolysis or the electrodialysis, the aqueous composition comprising lithium sulphate is at least substantially maintained at a pH having a value of about 1 to about 4.

According to another aspect, there is provided a process for preparing lithium hydroxide, the process comprising:

leaching an acid roasted lithium-containing material with water so as to obtain an aqueous composition comprising $Li^+$ and at least one metal ion;

reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;

contacting the aqueous composition comprising $Li^+$ and having a reduced content of the at least one metal ion with an ion exchange resin so as to at least partially remove at least one metal ion from the composition, thereby obtaining an aqueous composition comprising a lithium compound; and submitting the aqueous composition comprising the lithium compound to an electrolysis or an electrodialysis under conditions suitable for converting at least a portion of the lithium compound into lithium hydroxide.

According to another aspect, there is provided a process for preparing lithium hydroxide, the process comprising:

leaching a base-baked lithium-containing material with water so as to obtain an aqueous composition comprising $Li^+$ and at least one metal ion;

reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;

optionally reacting the aqueous composition comprising $Li^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising $Li^+$ and having a reduced content of the at least one metal ion, and separating the aqueous composition from the precipitate;

contacting the aqueous composition comprising $Li^+$ and having a reduced content of the at least one metal ion with an ion exchange resin so as to at least partially remove at least one metal ion from the composition, thereby obtaining an aqueous composition comprising a lithium compound; and submitting the aqueous composition comprising the lithium compound to an electrolysis or an electrodialysis under conditions suitable for converting at least a portion of the lithium compound into lithium hydroxide.

According to another aspect, there is provided a process for preparing lithium hydroxide, the process comprising:

leaching a base-baked lithium-containing material with water so as to obtain an aqueous composition comprising $Li^+$ and at least one metal ion;

optionally reacting the aqueous composition comprising $Li^+$ and the at least one metal ion with a base so as to obtain a pH of about 4.5 to about 6.5;

at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;

optionally reacting the aqueous composition comprising $Li^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising $Li^+$ and having a reduced content of the at least one metal ion, and separating the aqueous composition from the precipitate;

contacting the aqueous composition comprising $Li^+$ and having a reduced content of the at least one metal ion with an ion exchange resin so as to at least partially remove at least one metal ion from the composition, thereby obtaining an aqueous composition comprising a lithium compound; and submitting the aqueous composition comprising the lithium compound to an electrolysis or an electrodialysis under conditions suitable for converting at least a portion of the lithium compound into lithium hydroxide.

According to another aspect, there is provided a process for preparing lithium hydroxide, the process comprising:

leaching an acid roasted lithium-containing material with water so as to obtain an aqueous composition comprising $Li^+$ and at least one metal ion;

reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;

optionally reacting the aqueous composition comprising $Li^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising $Li^+$ and having a reduced content of the at least one metal ion, and separating the aqueous composition from the precipitate;

contacting the aqueous composition comprising $Li^+$ and having a reduced content of the at least one metal ion with an ion exchange resin so as to at least partially remove at least one metal ion from the composition, thereby obtaining an aqueous composition comprising a lithium compound; and submitting the aqueous composition comprising the lithium compound to an electrolysis or an electrodialysis under conditions suitable for converting at least a portion of the lithium compound into lithium hydroxide.

According to another aspect, there is provided a process for preparing lithium sulphate, the process comprising:

leaching an acid roasted lithium-containing material with water so as to obtain an aqueous composition comprising $Li^+$ and at least one metal ion, wherein the lithium-containing material is a material that has been previously reacted with $H_2SO_4$;

reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate; and contacting the aqueous composition comprising $Li^+$ and having a reduced content of the at least one metal ion with an ion-exchange resin so as to at least partially remove at least one metal ion from the composition, thereby obtaining an aqueous composition comprising a lithium sulphate.

According to another aspect, there is provided a process for preparing lithium sulphate, the process comprising:

leaching an acid roasted lithium-containing material with water so as to obtain an aqueous composition comprising $Li^+$ and at least one metal ion, wherein the lithium-containing material is a material that has been previously reacted with $H_2SO_4$;

reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;

optionally reacting the aqueous composition comprising $Li^+$ and having the reduced content of the at least one metal ion with another base so as to obtain a pH of about 9.5 to about 11.5 and with at least one metal carbonate thereby at least partially precipitating at least one metal ion under the form of at least one carbonate so as to obtain a precipitate comprising the at least one carbonate and an aqueous composition comprising $Li^+$ and having a reduced content of the at least one metal ion, and separating the aqueous composition from the precipitate; and contacting the aqueous composition comprising $Li^+$ and having a reduced content of the at least one metal ion with an ion-exchange resin so as to at least partially remove at least one metal ion from the composition, thereby obtaining an aqueous composition comprising a lithium sulphate.

In the following drawings, which represent by way of example only, various embodiments of the disclosure:

Figure 1:
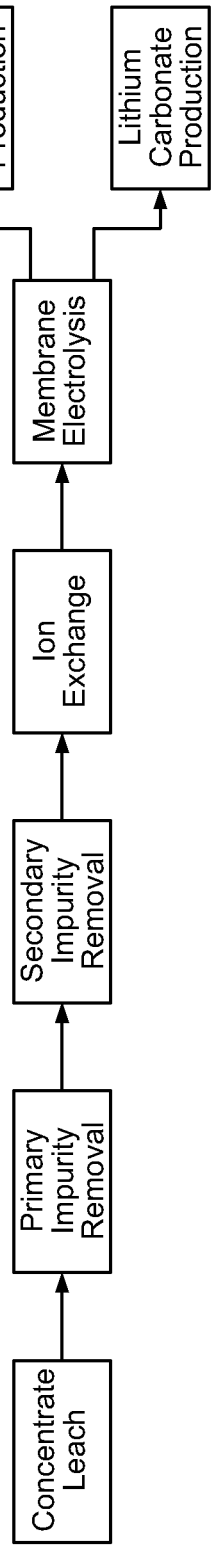
FIG. 1 is a block diagram concerning an example of a process according to the present disclosure.

Further features and advantages will become more readily apparent from the following description of various embodiments as illustrated by way of examples.

The term "suitable" as used herein means that the selection of the particular conditions would depend on the specific manipulation or operation to be performed, but the selection would be well within the skill of a person trained in the art. All processes described herein are to be conducted under conditions sufficient to provide the desired product. A person skilled in the art would understand that all reaction conditions, including, when applicable, for example, reaction time, reaction temperature, reaction pressure, reactant ratio, flow rate, reactant purity, current density, voltage, retention time, pH, oxidation reduction potential, bed volumes, type of resin used, and recycle rates can be varied to optimize the yield of the desired product and it is within their skill to do so.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The expression "at least one metal ion", as used herein refers, for example, to at least one type of ion of at least one metal. For example, the at least one metal ion can be $M^{X+}$. In this example, $M^{X+}$ is an ion of the metal M, wherein $X^+$ is a particular form or oxidation state of the metal M. Thus, $M^{X+}$ is at least one type of ion (oxidation state $X^+$) of at least one metal (M). For example, $M^{Y+}$ can be another type of ion of the metal M, wherein X and Y are different integers.

The expression "is at least substantially maintained" as used herein when referring to a value of a pH or a pH range that is maintained during a process of the disclosure or a portion thereof (for example heating, electrodialysis, electrolysis, etc.) refers to maintaining the value of the pH or the pH range at least 75, 80, 85, 90, 95, 96, 97, 98 or 99% of the time during the process or the portion thereof.

The expression "is at least substantially maintained" as used herein when referring to a value of a concentration or a concentration range that is maintained during a process of the disclosure or a portion thereof (for example heating, electrodialysis, electrolysis, etc.) refers to maintaining the value of the concentration or the concentration range at least 75, 80, 85, 90, 95, 96, 97, 98 or 99% of the time during the process or the portion thereof.

The expression "is at least substantially maintained" as used herein when referring to a value of a temperature or a temperature range that is maintained during a process of the disclosure or a portion thereof (for example heating, electrodialysis, electrolysis, etc.) refers to maintaining the value of the temperature or the temperature range at least 75, 80, 85, 90, 95, 96, 97, 98 or 99% of the time during the process or the portion thereof.

The expression "is at least substantially maintained" as used herein when referring to a value of an oxidation potential or an oxidation potential range that is maintained during a process of the disclosure or a portion thereof (for example heating, electrodialysis, electrolysis, etc.) refers to maintaining the value of the oxidation potential or the oxidation potential range at least 75, 80, 85, 90, 95, 96, 97, 98 or 99% of the time during the process or the portion thereof.

The expression "is at least substantially maintained" as used herein when referring to a value of an electrical current or an electrical current range that is maintained during a process of the disclosure or a portion thereof (for example electrodialysis, electrolysis, etc.) refers to maintaining the value of the electrical current or the electrical current range at least 75, 80, 85, 90, 95, 96, 97, 98 or 99% of the time during the process or the portion thereof.

The expression "is at least substantially maintained" as used herein when referring to a value of a voltage or a voltage range that is maintained during a process of the disclosure or a portion thereof (for example electrodialysis, electrolysis, etc.) refers to maintaining the value of the voltage or the voltage range at least 75, 80, 85, 90, 95, 96, 97, 98 or 99% of the time during the process or the portion thereof.

The below presented examples are non-limitative and are used to better exemplify the processes of the present disclosure.

The processes of the present disclosure can be effective for treating various lithium-containing materials. The lithium-containing material can be a lithium-containing ore, a lithium compound, or a recycled industrial lithium-containing entity. For example, the lithium-containing ore can be, for example, α-spodumene, β-spodumene, lepidolite, pegmatite, petalite, eucryptite, amblygonite, hectorite, jadarite, smectite, a clay, or mixtures thereof. The lithium compound can be, for example, LiCl, $Li_2SO_4$, $LiHCO_3$, $Li_2CO_3$, $LiNO_3$, $LiC_2H_3O_2$ (lithium acetate), LiF, lithium stearate or lithium citrate. The lithium-containing material can also be a recycled industrial lithium-containing entity such as lithium batteries, other lithium products or derivatives thereof.

A person skilled in the art would appreciate that various reaction parameters such as, for example, reaction time, reaction temperature, reaction pressure, reactant ratio, flow rate, reactant purity, current density, voltage, retention time, pH, oxidation reduction potential, bed volumes, type of resin used, and/or recycle rates, will vary depending on a number of factors, such as the nature of the starting materials, their level of purity, the scale of the reaction as well as all the parameters previously mentioned since they can be dependent from one another, and could adjust the reaction conditions accordingly to optimize yields.

For example, during the electrodialysis or the electrolysis, the pH can be at least substantially maintained at a value of about 1 to about 4, about 1 to about 2, about 1 to about 3, about 2 to about 3, or about 2 to about 4. For example, during the electrolysis, the pH can be at least substantially maintained at a value of about 1 to about 4, about 2 to about 4 or about 2. For example, during the electrodialysis, the pH can be at least substantially maintained at a value of about 1 to about 4 or about 1 to about 2.

For example, the electrodialysis or the electrolysis can be carried out in a three-compartment membrane electrolysis or electrodialysis cell.

For example, the electrodialysis or the electrolysis can be carried out in a two-compartment membrane electrolysis or electrodialysis cell.

For example, the electrolysis can be carried out in a monopolar electrolysis cell.

For example, the electrolysis can be carried out in a bipolar electrolysis cell.

For example, the electrodialysis can be carried out in a bipolar electrodialysis cell.

For example, the aqueous composition comprising lithium sulphate can be submitted to an electrolysis. For example, the aqueous composition comprising the lithium compound can be submitted to a monopolar membrane electrolysis process.

For example, the aqueous composition comprising the lithium compound can be submitted to a monopolar three compartment membrane electrolysis process.

For example, the aqueous composition comprising lithium sulphate can be submitted to an electrodialysis. For example, the aqueous composition comprising lithium sulphate can be submitted to a bipolar membrane electrodialysis process. For example, the aqueous composition comprising the lithium compound can be submitted to a bipolar three compartment membrane electrodialysis process.

For example, the electrodialysis or the electrolysis can be carried out in an electrolytic cell in which a cathodic compartment is separated from the central or anodic compartment by a cathodic membrane.

For example, the electrodialysis or the electrolysis can be carried out by introducing the aqueous composition comprising the lithium compound (for example LiCl, LiF, $Li_2SO_4$, $LiHCO_3$, $Li_2CO_3$, $LiNO_3$, $LiC_2H_3O_2$ (lithium acetate), lithium stearate or lithium citrate) into a central compartment, an aqueous composition comprising lithium hydroxide into a cathodic compartment, and an aqueous composition comprising an acid (for example HCl, $H_2SO_4$, $HNO_3$ or acetic acid) into an anodic compartment. The person skilled in the art would understand that, for example, when LiCl is introduced in the central compartment, HCl is generated in the anodic compartment for example of a bipolar membrane electrodialysis cell. For example, when LiF is introduced in the central compartment, HF is generated in the anodic compartment for example of a bipolar membrane electrodialysis cell. For example, when $Li_2SO_4$ is introduced in the central compartment, $H_2SO_4$ is generated in the anodic compartment for example of a bipolar membrane electrodialysis cell. For example, when $LiHCO_3$ is introduced in the central compartment, $H_2CO_3$ is generated in the anodic compartment for example of a bipolar membrane electrodialysis cell. For example, when $LiNO_3$ is introduced in the central compartment, $HNO_3$ is generated in the anodic compartment for example of a bipolar membrane electrodialysis cell. For example, when $LiC_2H_3O_2$ is introduced in the central compartment, acetic acid is generated in the anodic compartment for example of a bipolar membrane electrodialysis cell. For example, when lithium stearate is introduced in the central compartment, stearic acid is generated in the anodic compartment for example of a bipolar membrane electrodialysis cell. For example, when lithium citrate is introduced in the central compartment, citric acid is generated in the anodic compartment for example of a bipolar membrane electrodialysis cell.

For example, the electrodialysis or the electrolysis can be carried out by introducing the lithium sulphate into a central compartment, an aqueous composition comprising lithium hydroxide into a cathodic compartment, and an aqueous composition comprising sulphuric acid into an anodic compartment.

For example, an anolyte can be used during the process that can comprise ammonia. For example, an anolyte that comprises ammonia can be used during the process, thereby generating an ammonium salt.

For example, the process can further comprise adding gaseous or liquid ammonia, i.e. $NH_3$ or $NH_4OH$ at an anode or adjacently thereof, wherein the anode is used for the process.

For example, the process can further comprise adding ammonia at an anode or adjacently thereof, thereby generating an ammonium salt, wherein the anode is used for the process.

For example, the process can further comprise adding ammonia in an anolyte used for the process.

For example, the process can further comprise adding ammonia in an anolyte used for the process, thereby generating an ammonium salt.

For example, the ammonium salt can be $(NH_4)_2SO_4$.

For example, the electrodialysis or the electrolysis can be carried out by introducing the aqueous composition comprising the lithium compound (for example LiCl, LiF, $Li_2SO_4$, $LiHCO_3$, $Li_2CO_3$, $LiNO_3$, $LiC_2H_3O_2$ (lithium acetate), lithium stearate or lithium citrate) into a central compartment, an aqueous composition comprising lithium hydroxide into a cathodic compartment, and an aqueous composition comprising $NH_3$ into an anodic compartment. For example, when an aqueous composition comprising $NH_3$ is introduced into the anodic compartment, proton-blocking membranes may not be required and membranes which are capable, for example of running at a temperature of about 80° C. and which may, for example, have lower resistance can be used. For example, the aqueous composition comprising the lithium compound can further comprise $Na^+$.

For example, during the electrodialysis or the electrolysis, the aqueous composition comprising lithium hydroxide can be at least substantially maintained at a concentration of lithium hydroxide of about 1.5 M to about 4.5 M, about 2 M to about 4 M, about 2.5 M to about 3.5 M, about 3.1 M to about 3.3 M, about 35 to about 70 g/L or about 45 to about 65 g/L.

For example, during the electrodialysis or the electrolysis, the aqueous composition comprising sulphuric acid can be at least substantially maintained at a concentration of sulphuric acid of about 0.5 M to about 1.4 M, about 0.6 M to about 1.3 M, about 0.65 to about 0.85 M, about 0.7 M to about 1.2 M, about 0.8 M to about 1.1 M, about 8.5 M to about 1.05 M or about 0.9 M to about 1.0 M, about 20 to about 50 g/L, about 20 to about 40 g/L, about 35 to about 70 g/L or about 25 to about 35 g/L.

For example, during the electrodialysis or the electrolysis, the aqueous composition comprising lithium sulphate can be at least substantially maintained at a concentration of lithium sulphate of about 5 to about 30 g/L, about 5 to about 25 g/L, about 10 to about 20 g/L, or about 13 to about 17 g/L.

For example, during the electrodialysis or the electrolysis, temperature of the aqueous composition comprising lithium sulphate can be of about 20 to about 80° C., about 20 to about 60° C., about 30 to about 40° C., about 35 to about 65° C., about 40 to about 60° C., about 35 to about 45° C., about 55 to about 65° C., about 50 to about 60° C., or about 46 to about 54° C.

For example, during the electrodialysis or the electrolysis, temperature of the aqueous composition comprising lithium sulphate can be at least substantially maintained at a value of about 20 to about 80° C., about 20 to about 60° C., about 30 to about 40° C., about 35 to about 65° C., about 40 to about 60° C., about 35 to about 45° C., about 55 to about 65° C., about 50 to about 60° C., or about 46 to about 54° C. For example, when an Asahi AAV or a similar anion exchange membrane is used during the electrodialysis or the electrolysis, temperature of the aqueous composition comprising lithium sulphate can be at least substantially maintained at a value of about 40° C. For example, when a Fumatech FAB or a similar anion exchange membrane is used during the electrodialysis or the electrolysis, temperature of the aqueous composition comprising lithium sulphate can be at least substantially maintained at a value of about 60° C.

For example, a Nafion 324 or a similar cation exchange resin or membrane can be used during the electrodialysis or the electrolysis. Other membranes such Nafion 902, Fumatech FKB, or Neosepta CMB may be used for hydroxide concentration.

For example, when an aqueous composition comprising $NH_3$ is introduced into the anodic compartment during the electrodialysis or the electrolysis, temperature of the aqueous composition comprising lithium sulphate can be at least substantially maintained at a value of about 20 to about 80° C., about 75 to about 85° C., about 20 to about 60° C., about 30 to about 40° C., about 35 to about 65° C., about 40 to about 60° C., about 35 to about 45° C., about 55 to about 65° C., about 50 to about 60° C. or about 46 to about 54° C.

For example, during the electrodialysis or the electrolysis, electrical current can be at least substantially maintained at a density of about 50 to about 150 $A/m^2$, about 60 to about 140 $A/m^2$, about 70 to about 130 $A/m^2$, about 80 to about 120 $A/m^2$, or about 90 to about 110 $A/m^2$.

For example, during the electrodialysis or the electrolysis, electrical current can be at least substantially maintained at a density of about 400 to about 3000 $A/m^2$, about 400 to about 2000 $A/m^2$, about 400 to about 1500 $A/m^2$, about 400 to about 1200 $A/m^2$, about 400 to about 1000 $A/m^2$, about 400 to about 600 $A/m^2$, about 425 to about 575 $A/m^2$, about 450 to about 550 $A/m^2$ or about 475 to about 525 $A/m^2$.

For example, during the electrolysis, electrical current can be at least substantially maintained at a density of about 700 to about 1200 $A/m^2$.

For example, during the electrolysis, cell voltage can be at least substantially maintained at a value of about 2 to about 10 V, about 3.0 V to about 8.5 V, about 6.5 V to about 8 V, about 5.5 V to about 6.5 V or about 6 V.

For example, during the electrodialysis or the electrolysis, voltage can be at least substantially maintained at a value of about 4.5 V to about 8.5 V, about 6.5 V to about 8 V, about 5.5 V to about 6.5 V or about 6 V.

For example, during the electrodialysis or the electrolysis, electrical current can be at least substantially maintained at a constant value.

For example, during the electrodialysis or the electrolysis, voltage can be at least substantially maintained at a constant value.

For example, during the electrodialysis or the electrolysis, the overall LiOH current efficiency can be about 50% to about 90%, about 60% to about 90%, about 60% to about 70%, about 60% to about 80%, about 65% to about 85%, about 65% to about 80%, about 65% to about 75%, about 70% to about 85% or about 70% to about 80%.

For example, during the electrodialysis or the electrolysis, the overall $H_2SO_4$ current efficiency can be about 55% to about 90%, about 60% to about 85%, about 65% to about 80% or about 70% to about 80%.

For example, the aqueous composition comprising $Li^+$ and at least one metal ion can be reacted with the base so as to obtain a pH of about 4.8 to about 6.5, about 5.0 to about 6.2, about 5.2 to about 6.0, about 5.4 to about 5.8 or about 5.6.

For example, the aqueous composition comprising $Li^+$ and at least one metal ion can be reacted with lime.

For example, the at least one metal ion comprised in the aqueous composition that is reacted with the base so as to obtain a pH of about 4.5 to about 6.5 can be chosen from $Fe^{2+}$, $Fe^{3+}$ and $Al^{3+}$.

For example, the at least one metal ion comprised in the aqueous composition that is reacted with the base so as to obtain a pH of about 4.5 to about 6.5 can comprise $Fe^{3+}$.

For example, the at least one metal ion comprised in the aqueous composition that is reacted with the base so as to obtain a pH of about 4.5 to about 6.5 can comprise $Al^{3+}$.

For example, the at least one metal ion comprised in the aqueous composition that is reacted with the base so as to obtain a pH of about 4.5 to about 6.5 can comprise $Fe^{3+}$ and $Al^{3+}$.

For example, the at least one hydroxide comprised in the precipitate can be chosen from $Al(OH)_3$ and $Fe(OH)_3$.

For example, the precipitate can comprise at least two hydroxides that are $Al(OH)_3$ and $Fe(OH)_3$.

For example, the base used so as to obtain a pH of about 4.5 to about 6.5 can be lime.

For example, lime can be provided as an aqueous composition having a concentration of about 15% by weight to about 25% by weight.

For example, the processes can further comprise maintaining the aqueous composition comprising $Li^+$ and the at least one metal ion that is reacted with a base so as to obtain a pH of about 4.5 to about 6.5 at an oxidative potential of at least about 350 mV.

For example, the aqueous composition can be at least substantially maintained at an oxidative potential of at least about 350 mV by sparging therein a gas comprising $O_2$. For example, the gas can be air. Alternatively, the gas can be $O_2$.

For example, the processes can comprise reacting the aqueous composition comprising $Li^+$ and having the reduced content of the at least one metal ion with the another base so as to obtain a pH of about 9.5 to about 11.5, about 10 to about 11, about 10 to about 10.5, about 9.8 to about 10.2 or about 10.

For example, the base used so as to obtain a pH of about 9.5 to about 11.5 can be NaOH or KOH.

For example, the base used so as to obtain a pH of about 9.5 to about 11.5 can be NaOH.

The base and metal carbonate can be a mixture of aqueous NaOH, $NaHCO_3$, LiOH and $LiHCO_3$.

For example, the at least one metal carbonate can be chosen from $Na_2CO_3$, $NaHCO_3$, and $(NH_4)_2CO_3$.

For example, the at least one metal carbonate can be $Na_2CO_3$.

For example, the aqueous composition comprising $Li^+$ and having the reduced content of the at least one metal ion can be reacted with the another base over a period of time sufficient for reducing the content of the at least one metal ion in the aqueous composition below a predetermined value. For example, the at least one metal ion can be chosen from $Mg^{2+}$, $Ca^{2+}$ and $Mn^{2+}$. For example, the reaction can be carried out over a period of time sufficient for reducing the content of $Ca^{2+}$ below about 250 mg/L, about 200 mg/L, about 150 mg/L, or about 100 mg/L. For example, the reaction can be carried out over a period of time sufficient for reducing the content of $Mg^{2+}$ below about 100 mg/L, about 50 mg/L, about 25 mg/L, about 20 mg/L, about 15 mg/L or about 10 mg/L.

For example, the ion exchange resin can be a cationic resin.

For example, the ion exchange resin can be a cationic resin that is substantially selective for divalent and/or trivalent metal ions.

For example, contacting with the ion exchange resin can allow for reducing a content of $Ca^{2+}$ of the composition below about 10 mg/L, about 5 mg/L, about 1 mg/L or about 0.5 mg/L.

For example, contacting with the ion exchange resin can allow for reducing total bivalent ion content such as $Ca^{2+}$, $Mg^{2+}$ or $Mn^{2+}$, of the composition below about 10 mg/L, about 5 mg/L, about 1 mg/L or about 0.5 mg/L.

For example, the acid roasted lithium-containing material can be leached with water so as to obtain the aqueous composition comprising $Li^+$ and at least three metal ions chosen from the following metals iron, aluminum, manganese and magnesium.

For example, the acid roasted lithium-containing material can be leached with water so as to obtain the aqueous composition comprising $Li^+$ and at least three metal ions chosen from $Al^{3+}$, $Fe^{2+}$, $Fe^{3+}$, $Mg^{2+}$, $Ca^{2+}$, $Cr^{2+}$, $Cr^{3+}$, $Cr^{6+}$, $Zn^{2+}$ and $Mn^{2+}$.

For example, the acid roasted lithium-containing material can be leached with water so as to obtain the aqueous composition comprising $Li^+$ and at least four metal ions chosen from $Al^{3+}$, $Fe^{2+}$, $Fe^{3+}$, $Mg^{2+}$, $Ca^{2+}$, $Cr^{2+}$, $Cr^{3+}$, $Cr^{6+}$, $Zn^{2+}$ and $Mn^{2+}$.

For example, the acid roasted lithium-containing material can be β-spodumene that has been previously reacted with $H_2SO_4$.

For example, the acid roasted lithium-containing material can be a α-spodumene, β-spodumene, lepidolite, pegmatite, petalite, amblygonite, hectorite, smectite, clays, or mixtures thereof, that has been previously reacted with $H_2SO_4$.

For example, the acid roasted lithium-containing material can be obtained by using a process as described in CA 504,477, which is hereby incorporated by reference in its entirety.

For example, the base-baked lithium-containing material can be β-spodumene that has been previously reacted with $Na_2CO_3$ and with $CO_2$, and eventually heated.

In the processes of the present disclosure, the pH can thus be controlled by further adding some base, some acid or by diluting. The ORP can be controlled as previously indicated by sparging air.

For example, when reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate, the metal of the at least one metal ion can be Fe, Al, Cr, Zn or mixtures thereof.

For example, when reacting the aqueous composition comprising $Li^+$ and having the reduced content of the at least one metal ion with another base so as to obtain a pH of about 9.5 to about 11.5, and with optionally at least one metal carbonate, thereby at least partially precipitating at least one metal ion, the metal of the at least one metal ion can be Mn, Mg, Ca or mixtures thereof.

For example, when contacting the aqueous composition comprising $Li^+$ and having a reduced content of the at least one metal ion with an ion-exchange resin so as to at least partially remove at least one metal ion, the at least one metal ion can be $Mg^{2+}$, $Ca^{2+}$ or a mixture thereof.

EXAMPLE 1

As shown in FIG. 1, lithium hydroxide can be obtained, for example, by using such a process and by using a pre-leached lithium-containing material as a starting material. For example, various leached ores such as acid roasted β-spodumene can be used. The process shown in FIG. 1 can also be used for producing lithium carbonate. According to another embodiment, the starting material can be a lithium compound such as lithium sulphate, lithium chloride or lithium fluoride. In such a case, the process would be shorter and would be starting at the box entitled "membrane electrolysis".

Acid Roasted β-Spodumene (AR β-Spodumene)

Two different blends of the AR β-spodumene were tested. The samples were composed of different ratios of the flotation and dense media separation (DMS) concentrates. The samples were identified as 75/25 and 50/50. The former sample contained about 75% by weight of the flotation concentrate and about 25% by weight of the DMS concentrate. The latter sample contained substantially equal portions by mass of the two concentrates. The assay data of the feed samples is summarized in Table 1. The two samples had very similar analytical profiles. The 75/25 sample had higher levels of Fe, Mn, Mg, Ca and K than the 50/50 sample. Both samples had typical compositions for AR β-spodumene.

TABLE 1

| Assay Data of the AR β-Spodumene Samples | | | | | | |
| --- | --- | --- | --- | --- | --- | --- |
| Sample | Li | Si | Al | Fe | Na | S |
| | % | | | | | |
| 75/25 Comp | 2.24 | 25.0 | 10.5 | 1.04 | 0.39 | 6.09 |
| 50/50 Comp | 2.29 | 24.4 | 10.4 | 0.96 | 0.36 | 6.06 |

| Sample | Cr | Zn | Mn | Mg | Ca | K |
| --- | --- | --- | --- | --- | --- | --- |
| | g/t | | | | | |
| 75/25 Comp | 167 | 134 | 1962 | 1186 | 3431 | 3653 |
| 50/50 Comp | 163 | 103 | 1755 | 905 | 2311 | 3376 |

Concentrate Leach (CL) and Primary Impurity Removal (PIR)

The objectives of the Concentrate Leach (CL) and the Primary Impurity Removal (PIR) were 1) to dissolve lithium sulphate contained in the AR β-spodumene and 2) to remove the major impurities from the process solution that co-leach with lithium from the feed solids.

Figure 2:
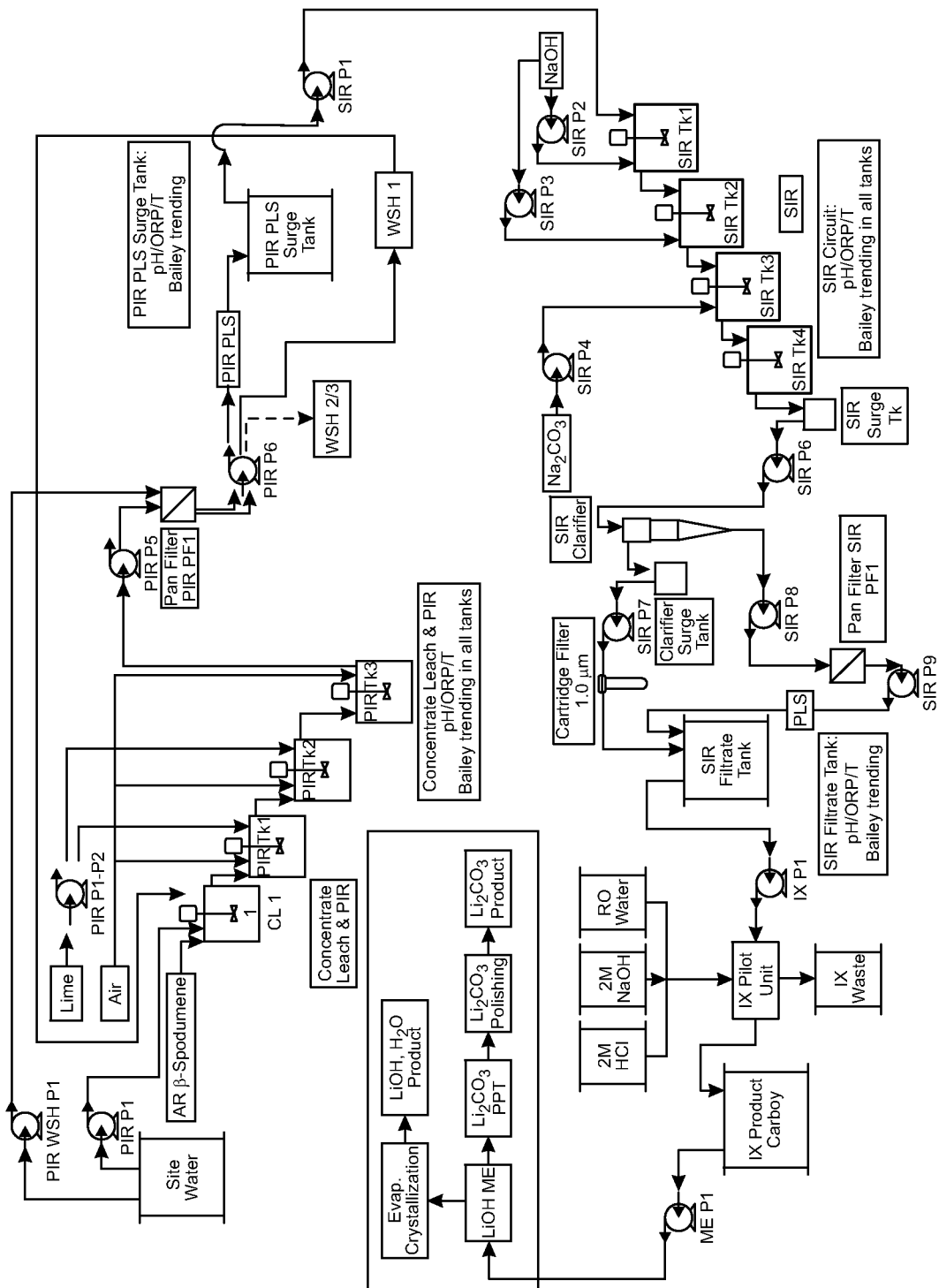
FIG. 2 is a flow sheet diagram concerning another example of a process according to the present disclosure.

A four tank cascade was used for the combined CL and PIR process circuit (see FIG. 2). The AR β-spodumene was added using a feed hopper that was equipped with a vibratory feeder. Each of the reactors was equipped with the following: an overhead mixer motor (0.5 hp) with a 4-blade pitch impeller attached, pH and ORP (Oxidation Reduction Potential) probes. The PIR reactors also had air spargers located directly below the impeller. The process slurry flowed by gravity from one reactor to the next through overflow ports. The overflow port of the CL reactor was set such that the active volume of the tank was about 32 L. The PIR reactors each had an active volume of about 14 L. The overflow from PIR Tank 3 (the last reactor of the tank train) was pumped to the filtration station.

About 1,200 kg of the 75/25 and about 1,400 kg of the 50/50 AR β-spodumene samples were leached in about 85 hours of operation. The change over from one feed to the other occurred at the 37th hour of operation. Time zero of the operation was when pulp began to overflow from the CL reactor.

In the CL step, water and solids were combined in an agitated tank at a 50:50 weight ratio and mixed for about 30 to about 45 minutes under ambient conditions. Lithium was extracted along with undesirable gangue metals such as, for example, iron, aluminum, silicon, manganese, and magnesium. The obtained slurry (CL slurry) thus comprised a solid composition and an aqueous (liquid) composition containing solubilized $Li^+$ (lithium ions) as well as solubilized ions of the above-mentioned metals. The CL slurry pH and ORP were monitored but not controlled. Alternatively, the pH can eventually be controlled by further adding some base, some acid or by diluting. The ORP can also be controlled as previously indicated by sparging air. The CL slurry flowed by gravity to the PIR Tank 1. The aqueous composition can alternatively be separated from the solid composition before being introduced in the PIR Tank 1 (or before carrying out PIR. In such a case, the aqueous composition (instead of the whole CL slurry as it is the case for the present example) would be inserted into Tank 1.

After 9 hours of operation there was sufficient volume of the Wash 1 fraction (the first displacement wash fraction generated when washing the combined CL and PIR solids residue) to recycle back to the CL. The initial recycle rate of the Wash 1 was set to about 50% of the water addition requirement of the CL. After 37 hours of operation, this amount was increased to make-up 60% of the water addition to the process. This wash stream contained on average about 12 g/L Li (about 95 g/L of $Li_2SO_4$).

Primary Impurity Removal (PIR) was carried out, for example, to substantially remove Fe, Al and Si from the aqueous composition while substantially not precipitating any lithium. In this process, the pH of the concentrate leach slurry (comprising the aqueous composition and the solid composition) was elevated to about 5.6 by lime slurry addition to the three PIR tanks. The lime was added as a slurry having a concentration of about 20 wt %. The CL slurry was thus converted into a precipitate and an aqueous composition. The impurities such as Fe, Al and Si were at least substantially precipitated as insoluble metal hydroxides and found in the precipitate while the lithium ions were substantially found in the aqueous composition. The retention time for the PIR circuit was about 45 to about 60 minutes. Air was sparged into the PIR tanks in order to maintain the oxidative potential of the process slurry at or above about 350 mV. At this level, iron present in the ferrous ($Fe^{2+}$) form would likely oxidize to ferric iron ($Fe^{3+}$), a form suitable for precipitation at such a pH. Thus, a precipitate comprising, for example, metal hydroxides of Fe, Al and Si was obtained and eventually separated from the aqueous composition comprising lithium ions. In the PIR, the pH can thus be controlled by further adding some base, some acid or by diluting. The ORP can be controlled as previously indicated by sparging air.

The resulting slurry (comprising the aqueous composition and the solid composition (comprising the precipitate)) was filtered on pan filters. The filtrate (aqueous composition comprising lithium ions and having a reduced content of the above mentioned metals (such as Fe, Al and Si)) proceeded to Secondary Impurity Removal (SIR). The PIR filter cake underwent three displacement washes with site water. The first wash fraction was collected separately from the second two washes. The first wash stream was recycled to the CL process as a portion of the water feed stream to recover the contained lithium. Wash fractions 2 and 3 were combined and stored as a solution. This solution can be used for lime slurry make-up to recover the lithium units.

Figure 3:
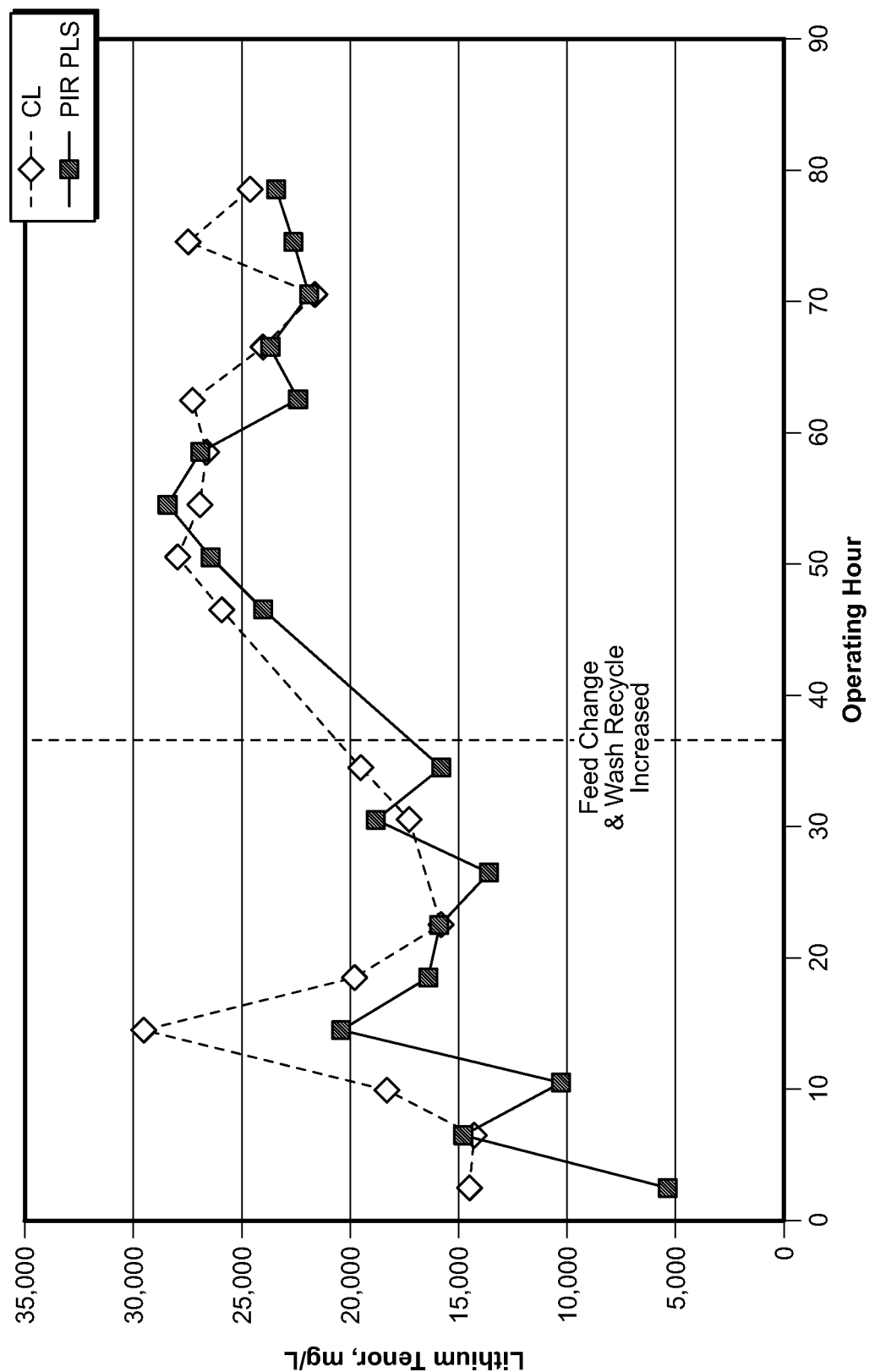
FIG. 3 is a plot showing lithium tenor as a function of time in another example of a process according to the present disclosure.

The lithium tenors in CL and PIR are presented in FIG. 3. At hour 9, the first wash fraction from PIR was recycled back to the CL tank to make-up half of the water addition to the leach. Lithium tenors increased throughout the circuit to about 18 g/L (about 142.6 g/L of $Li_2SO_4$) as a result. At hour 37.5, the recycle rate was increased to make-up 60% of the water to the leach and lithium tenors increased to about 25 g/L (about 198 g/L of $Li_2SO_4$). The PIR first wash lithium tenors ranged from about 12 to about 15 g/L (about 95 g/L to about 118.8 g/L of $Li_2SO_4$).

The pH was substantially steady throughout the operation once the throughput was reduced. The ORP of the slurry in PIR tank 3 was substantially steady and above about 350 mV during the operation. The iron tenors for CL and PIR are presented in FIG. 4. At hours 10 and 54, the pH of PIR3 was near a value of about 5.6 and yet the iron tenor in the PIR3 liquor increased.

Figure 4:
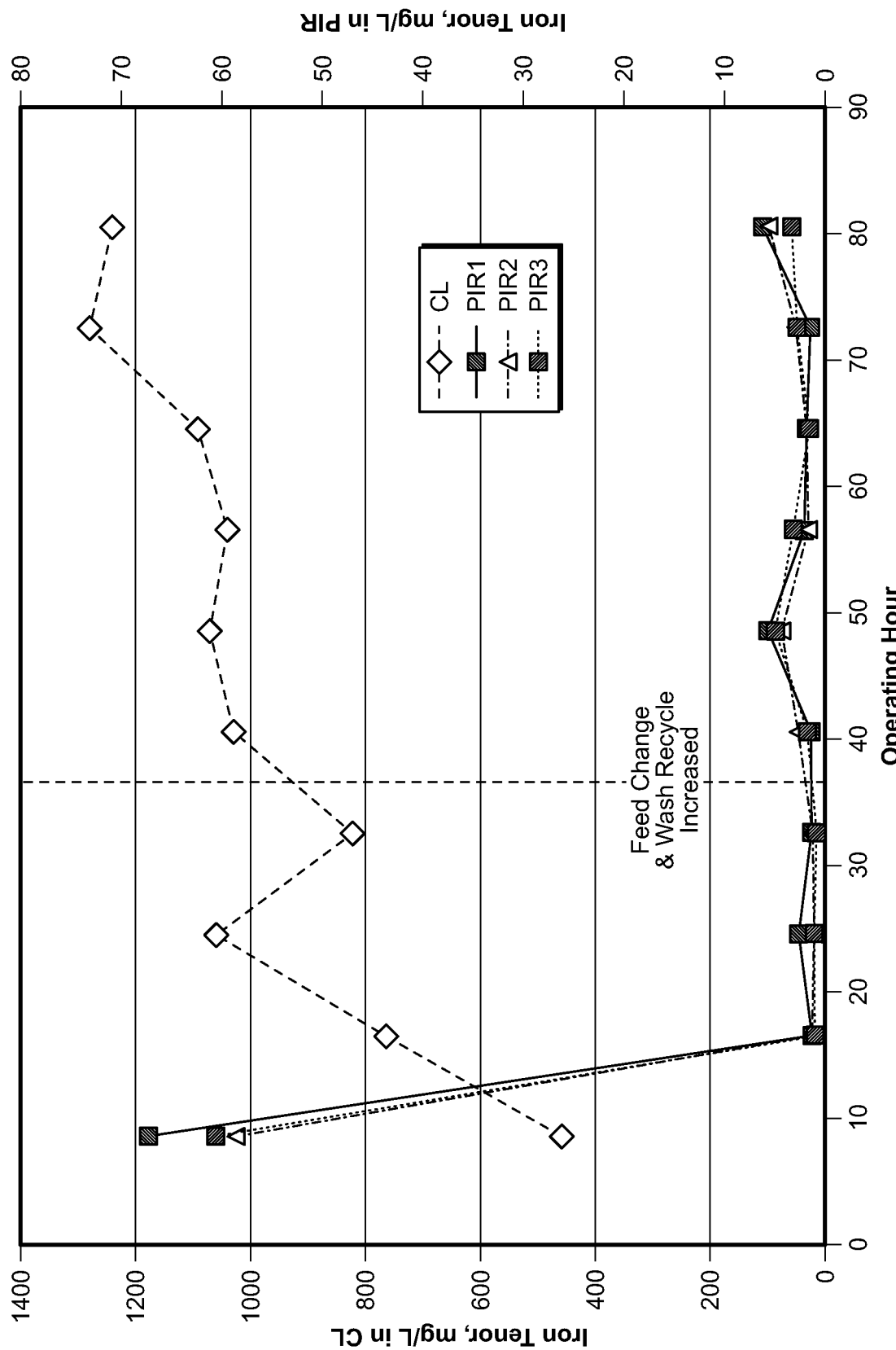
FIG. 4 is a plot showing iron tenor as a function of time in another example of a process according to the present disclosure.
Figure 5:
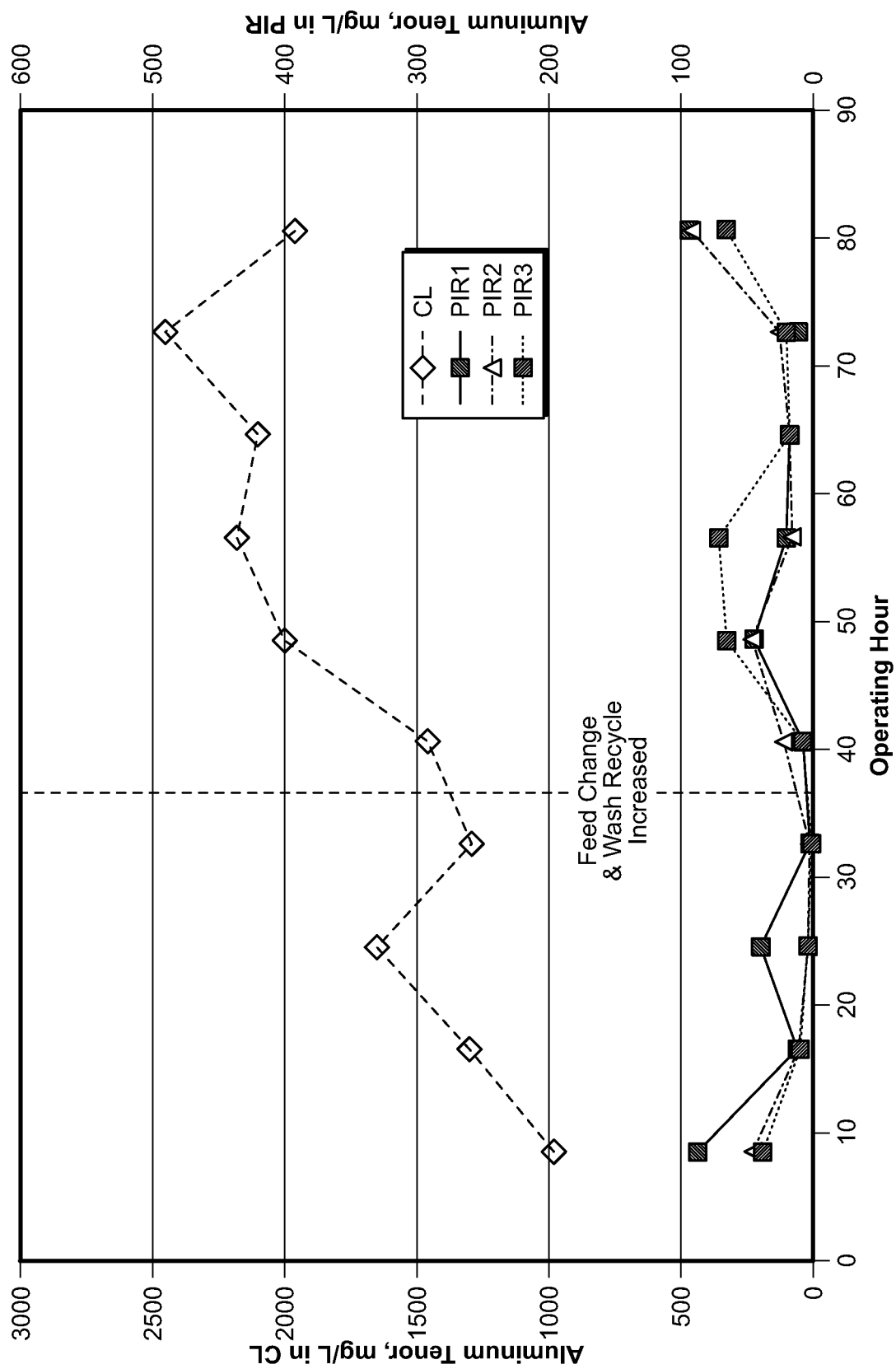
FIG. 5 is a plot showing aluminum tenor as a function of time in another example of a process according to the present disclosure.

Iron and aluminum profiles are presented in FIGS. 4 and 5. Both iron and aluminum showed increasing levels in the CL tank throughout the run. Iron levels maintained below about 5 mg/L in PIR3 for most of the run regardless of the increase observed in CL. Aluminum in PIR3 was less than about 10 mg/L for the first 40 hours, and then ranged between about 20 and about 65 mg/L for the remainder of the operating time.

A mass balance for the CL and PIR circuits is shown in Table 3. Lithium extraction and impurity precipitation is calculated based on solids assays. The mass balance shows that overall about 82% of the lithium present in the AR β-spodumene feed proceeded to Secondary Impurity Removal (SIR). Specifically, about 79% lithium extraction was achieved for the 75/25 blend and about 86% for the 50/50 blend. The portions of aluminum and iron that either did not leach or precipitated totaled about 96% and about 99%, respectively.

TABLE 3

Mass Balance of CL and PIR circuits

| Process Streams | | | Metal Content, mg/L or % | | | | |
|---|---|---|---|---|---|---|---|
| | | | Li | Al | Fe | Cr | Zn |
| | Op Hr | Quantity, kg | % or mg/L | | g/t or mg/L | | |
| INPUTS | | | | | | | |
| AR | 13.5 | 485 | 2.25 | 106909 | 9792 | 173 | 130 |
| B-Spodumene | 25.5 | 436 | 2.19 | 102675 | 10072 | *192* | *154* |
| | 37.5 | 323 | 2.15 | 101087 | 10352 | 211 | 177 |
| | 49.5 | 407 | 2.21 | 104792 | 11261 | 212 | 148 |
| | 61.5 | 435 | 2.28 | 106909 | 8883 | 212 | 119 |
| | 73.5 | 363 | 2.31 | 107438 | 8813 | 182 | 88 |
| | 80.0 | 205 | *2.31* | *107438* | *8813* | *182* | *88* |

TABLE 3-continued

Mass Balance of CL and PIR circuits

| | | | | | | | |
|---|---|---|---|---|---|---|---|
| PIR Wash 1 | 13.5 | 113 | *11200* | 77 | *11.2* | *<0.2* | *5.6* |
| | 25.5 | 252 | 11200 | 77 | 11.2 | <0.2 | 5.6 |
| | 37.5 | 214 | 11200 | 77 | 11.2 | <0.2 | 5.6 |
| | 49.5 | 273 | 15300 | 65 | 4.3 | <0.2 | 5.9 |
| | 61.5 | 273 | *15300* | *65* | *4.3* | *<0.2* | *5.9* |
| | 73.5 | 249 | 12300 | 64 | 3.1 | <0.2 | 3.5 |
| | 80.0 | 157 | 12600 | 62 | 1.5 | <0.2 | 3.6 |
| OUTPUTS | | | | | | | |
| PIR3 Solids | 13.5 | 536 | 0.60 | 126491 | 11960 | 247 | 133 |
| | 25.5 | 277 | 0.40 | 121198 | 11471 | *229* | *160* |
| | 37.5 | 268 | 0.58 | 119611 | 13219 | 211 | 187 |
| | 49.5 | 333 | 0.31 | 123315 | *13079* | *211* | *164* |
| | 61.5 | 294 | 0.46 | 126491 | 11051 | 210 | 140 |
| | 73.5 | 282 | 0.48 | 124374 | 10771 | 201 | 141 |
| | 80.0 | 169 | 0.50 | 125962 | 11051 | *201* | *141* |
| PIR3 Solution | 13.5 | 600 | 10700 | 37.3 | 60.5 | <0.2 | 5.5 |
| | 25.5 | 642 | 20100 | 6.95 | 1.05 | <0.2 | 3.9 |
| | 37.5 | 470 | 16400 | 1.3 | 0.8 | <0.2 | 1.7 |
| | 49.5 | 515 | 24550 | 36.45 | 3.3 | <0.2 | 5.4 |
| | 61.5 | 582 | 23500 | 71 | 3.2 | <0.2 | 4.6 |
| | 73.5 | 484 | 22800 | 19.5 | 2.15 | <0.2 | 3.45 |
| | 80.0 | 290 | 25900 | 65.5 | 3.4 | <0.2 | 4.8 |

| Process Streams | | | | Metal Units, g | | | | |
|---|---|---|---|---|---|---|---|---|
| | Op Hr | Density kg/L | % Solids | Li | Al | Fe | Cr | Zn |
| INPUTS | | | | | | | | |
| AR B-Spodumene | 13.5 | | | 10912 | 51847 | 4749 | 84 | 63 |
| | 25.5 | | | 9555 | 44797 | 4394 | 84 | 67 |
| | 37.5 | | | 6938 | 32621 | 3340 | 68 | 57 |
| | 49.5 | | | 8995 | 42653 | 4583 | 86 | 60 |
| | 61.5 | | | 9907 | 46455 | 3860 | 92 | 52 |
| | 73.5 | | | 8397 | 39053 | 3203 | 66 | 32 |
| | 80.0 | | | 4732 | 22007 | 1805 | 37 | 18 |
| PIR Wash 1 | 13.5 | 1.06 | | 1195 | 8 | 1 | 0 | 1 |
| | 25.5 | 1.07 | | 2631 | 18 | 3 | 0 | 1 |
| | 37.5 | 1.06 | | 2262 | 15 | 2 | 0 | 1 |
| | 49.5 | 1.10 | | 3800 | 16 | 1 | 0 | 1 |
| | 61.5 | 1.12 | | 3748 | 16 | 1 | 0 | 1 |
| | 73.5 | 1.09 | | 2821 | 15 | 1 | 0 | 1 |
| | 80.0 | 1.08 | | 1829 | 9 | 0 | 0 | 1 |
| OUTPUTS | | | | | | | | |
| PIR3 Solids | 13.5 | | 47.2 | 3218 | 67836 | 6414 | 132 | 71 |
| | 25.5 | | 30.1 | 1107 | 33534 | 3174 | 63 | 44 |
| | 37.5 | | 36.3 | 1556 | 32094 | 3547 | 57 | 50 |
| | 49.5 | | 39.3 | 1032 | 41042 | 4353 | 70 | 54 |
| | 61.5 | | 33.6 | 1354 | 37238 | 3253 | 62 | 41 |
| | 73.5 | | 36.8 | 1353 | 35070 | 3037 | 57 | 40 |
| | 80.0 | | *36.8* | 844 | 21268 | 1866 | 34 | 24 |
| PIR3 Solution | 13.5 | 1.07 | | 5995 | 21 | 34 | 0 | 3 |
| | 25.5 | 1.12 | | 11477 | 4 | 1 | 0 | 2 |
| | 37.5 | 1.11 | | 6970 | 1 | 0 | 0 | 1 |
| | 49.5 | 1.15 | | 10953 | 16 | 1 | 0 | 2 |
| | 61.5 | 1.15 | | 11926 | 36 | 2 | 0 | 2 |
| | 73.5 | 1.15 | | 9580 | 8 | 1 | 0 | 1 |
| | 80.0 | 1.16 | | 6464 | 16 | 1 | 0 | 1 |
| Units IN | 13.5 | | | 12107 | 51855 | 4750 | 84 | 64 |
| | 25.5 | | | 12186 | 44815 | 4397 | 84 | 68 |
| | 37.5 | | | 9200 | 32636 | 3343 | 68 | 58 |
| | 49.5 | | | 12795 | 42669 | 4585 | 86 | 62 |
| | 61.5 | | | 13655 | 46471 | 3861 | 92 | 53 |
| | 73.5 | | | 11218 | 39068 | 3204 | 66 | 33 |
| | 80.0 | | | 6560 | 22017 | 1805 | 37 | 19 |
| | TOTAL | | | 77722 | 279532 | 25945 | 517 | 356 |
| Units OUT | 13.5 | | | 9212 | 67857 | 6448 | 132 | 74 |
| | 25.5 | | | 12584 | 33538 | 3174 | 63 | 46 |
| | 37.5 | | | 8527 | 32095 | 3547 | 57 | 51 |
| | 49.5 | | | 11985 | 41058 | 4355 | 70 | 57 |
| | 61.5 | | | 13281 | 37274 | 3255 | 62 | 44 |

TABLE 3-continued

Mass Balance of CL and PIR circuits

|  |  |  |  |  |  |  |
|---|---|---|---|---|---|---|
|  | 73.5 |  | 10934 | 35078 | 3038 | 57 | 41 |
|  | 80.0 |  | 7308 | 21284 | 1867 | 34 | 25 |
|  | TOTAL |  | 73830 | 268184 | 25684 | 475 | 338 |
| Extraction | 13.5 |  | 71 |  |  |  |  |
|  | 25.5 |  | 88 |  |  |  |  |
|  | 37.5 |  | 78 |  |  |  |  |
|  | 49.5 |  | 89 |  |  |  |  |
|  | 61.5 |  | 86 |  |  |  |  |
|  | 73.5 |  | 84 |  |  |  |  |
|  | 80.0 |  | 82 |  |  |  |  |
|  | TOTAL |  | 82 |  |  |  |  |
| Precipitation | 13.5 |  |  | 131 | 135 | 158 | 113 |
|  | 25.5 |  |  | 75 | 72 | 76 | 66 |
|  | 37.5 |  |  | 98 | 106 | 83 | 88 |
|  | 49.5 |  |  | 96 | 95 | 81 | 90 |
|  | 61.5 |  |  | 80 | 84 | 67 | 80 |
|  | 73.5 |  |  | 90 | 95 | 86 | 124 |
|  | 80.0 |  |  | 97 | 103 | 91 | 132 |
|  | TOTAL |  |  | 96 | 99 | 92 | 93 |
| Accountability, OUT/IN % |  |  | 76 | 131 | 136 | 158 | 117 |
|  |  |  | 103 | 75 | 72 | 76 | 68 |
|  |  |  | 93 | 98 | 106 | 83 | 87 |
|  |  |  | 94 | 96 | 95 | 81 | 92 |
|  |  |  | 97 | 80 | 84 | 67 | 82 |
|  |  |  | 97 | 90 | 95 | 86 | 126 |
|  |  |  | 111 | 97 | 103 | 91 | 135 |
|  | TOTAL |  | 95 | 96 | 99 | 92 | 95 |

*Averages if shown in italics

Secondary Impurity Removal

Secondary Impurity Removal (SIR) was performed on the PIR filtrate (aqueous composition comprising lithium ions and having a reduced content of the above mentioned metals (such as Fe, Al and Si)) to substantially precipitate and remove Ca, Mg and Mn impurities therefrom. Feed addition to the SIR circuit started at operating hour 6 (six hours after overflow from the CL tank). There are four process tanks arranged in a cascade (see FIG. 2). The tank volumes could be adjusted during the run from about 11.8 to about 17.5 L by changing the tank overflow ports. All tanks are baffled and agitated by overhead mixers. pH, ORP and temperature were monitored in all tanks.

In the first two agitated tanks, the pH was increased to about 10 using about 2 M sodium hydroxide (NaOH) (another base). Following this pH adjustment, an excess of sodium carbonate ($Na_2CO_3$) based on levels of targeted impurities in the feed was added to the third tank to convert the remaining divalent impurities to insoluble carbonates. The slurry from the third tank was pumped to a clarifier. Underflow solids were removed and recovered by filtration while the overflow solution was collected in an about 1000 L tote.

Figure 6:
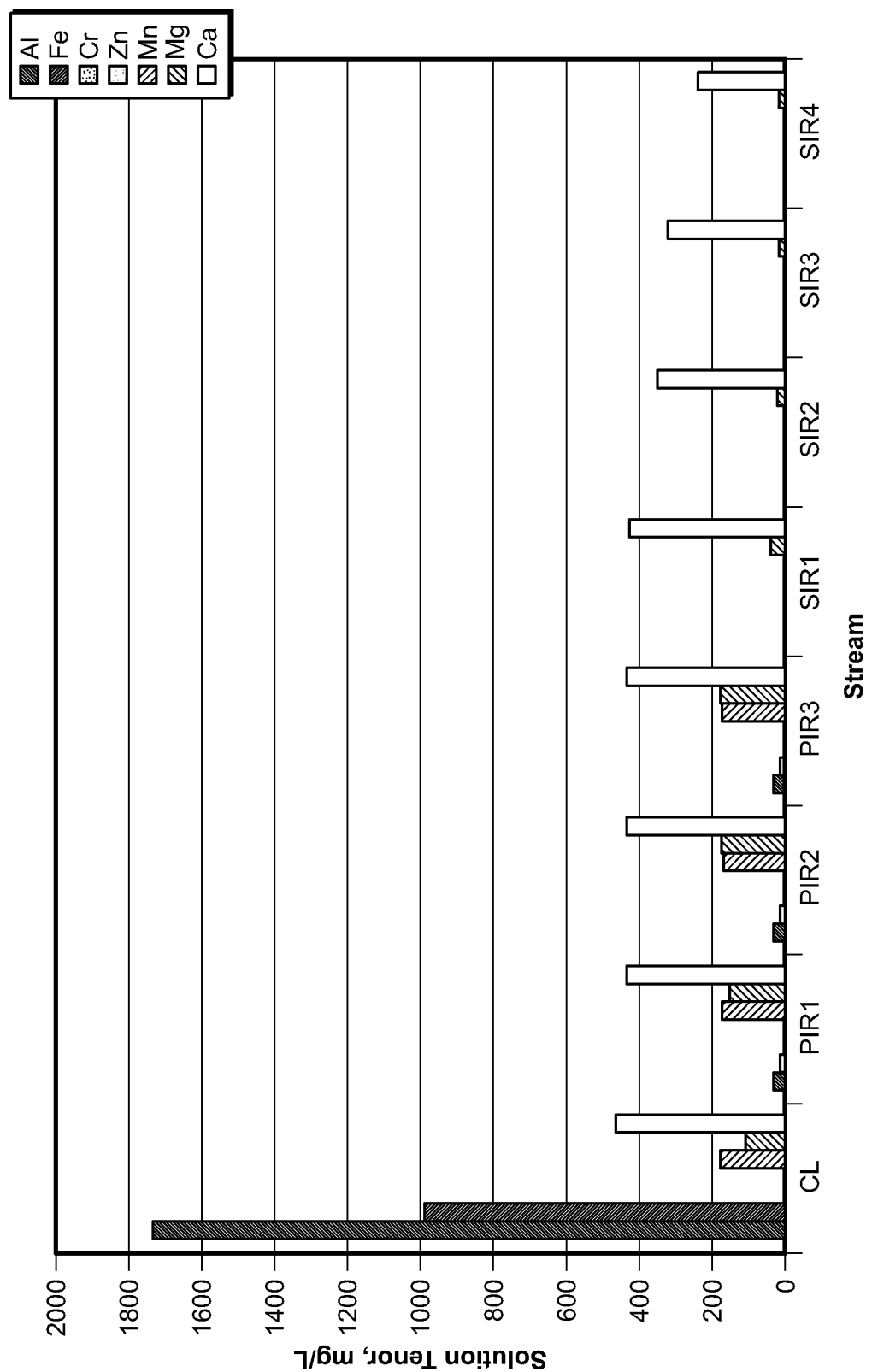
FIG. 6 is a diagram showing various metals tenor as a function of time in another example of a process according to the present disclosure.

Averaged impurity tenors of solutions from the Concentrate Leach stage through to the final tank of Secondary Impurity Removal are shown in Table 4 and FIG. 6.

TABLE 4

Profile of Selected Impurities

| Stream | Li mg/L | Al mg/L | Fe mg/L | Cr mg/L | Zn mg/L | Mn mg/L | Mg mg/L | Ca mg/L |
|---|---|---|---|---|---|---|---|---|
| CL | 23880 | 1737 | 985 | 5.9 | 9.1 | 178 | 109 | 468 |
| PIR1 | 21290 | 34 | 9 | 0.0 | 4.3 | 174 | 153 | 435 |
| PIR2 | 21240 | 28 | 8 | 0.0 | 4.0 | 173 | 175 | 433 |
| PIR3 | 21140 | 30 | 8 | 0.0 | 4.2 | 174 | 179 | 434 |
| SIR1 | 20093 | 1 | 0 | 0.0 | 0.0 | 2 | 43 | 426 |
| SIR2 | 22500 | 0 | 0 | 0.0 | 0.0 | 1 | 19 | 352 |
| SIR3 | 19050 | 1 | 0 | 0.0 | 0.0 | 1 | 16 | 322 |
| SIR4 | 22400 | 0 | 0 | 0.0 | 0.0 | 1 | 14 | 241 |

Impurities introduced in the leach stage included iron, aluminum, chromium, zinc, magnesium, manganese and calcium. Substantially all of the chromium and over about 98% of the iron and aluminum substantially precipitated in the first PIR tank (PIR1). Minimal precipitation occurred in the next two tanks of PIR (PIR2 and PIR3). By the first tank of SIR (SIR1), the only impurities substantially remaining in solution were magnesium and calcium. All other elements were less than about 1 mg/L. Although most of the precipitation occurred in SIR1, the extra retention time of SIR2 dropped the magnesium tenor from about 40 to about 20 mg/L. From SIR2 through SIR4, magnesium and calcium tenors showed a steady decline with more retention time. Impurity levels for SIR4 averaged to about 1 mg/L Mn, about 14 mg/L Mg and about 241 mg/L Ca during the pilot plant run. However, levels as low as about 200 mg/L Ca and about 2 mg/L Mg were attained by the optimization of key parameters.

pH and ORP were monitored throughout the operation. pH was only controlled in the first two tanks. Initially, the selected pH for SIR2 was about 10. At operating hour 30, the pH in SIR2 was increased to about 10.5. With the exception of a 2-hour period at hour 50, where the pH in SIR2 dropped to about 10, pH remained at about 10.5 for the remainder of the run. The average pH values achieved over the two periods were about 10.1 and about 10.5 and the resulting sodium hydroxide consumptions were about 0.022 and about 0.024 kg sodium hydroxide per hour, respectively. The overall sodium hydroxide consumption was about 10 kilograms of sodium hydroxide solution per about 1000 kg of lithium carbonate equivalent (LCE).

Figure 7:
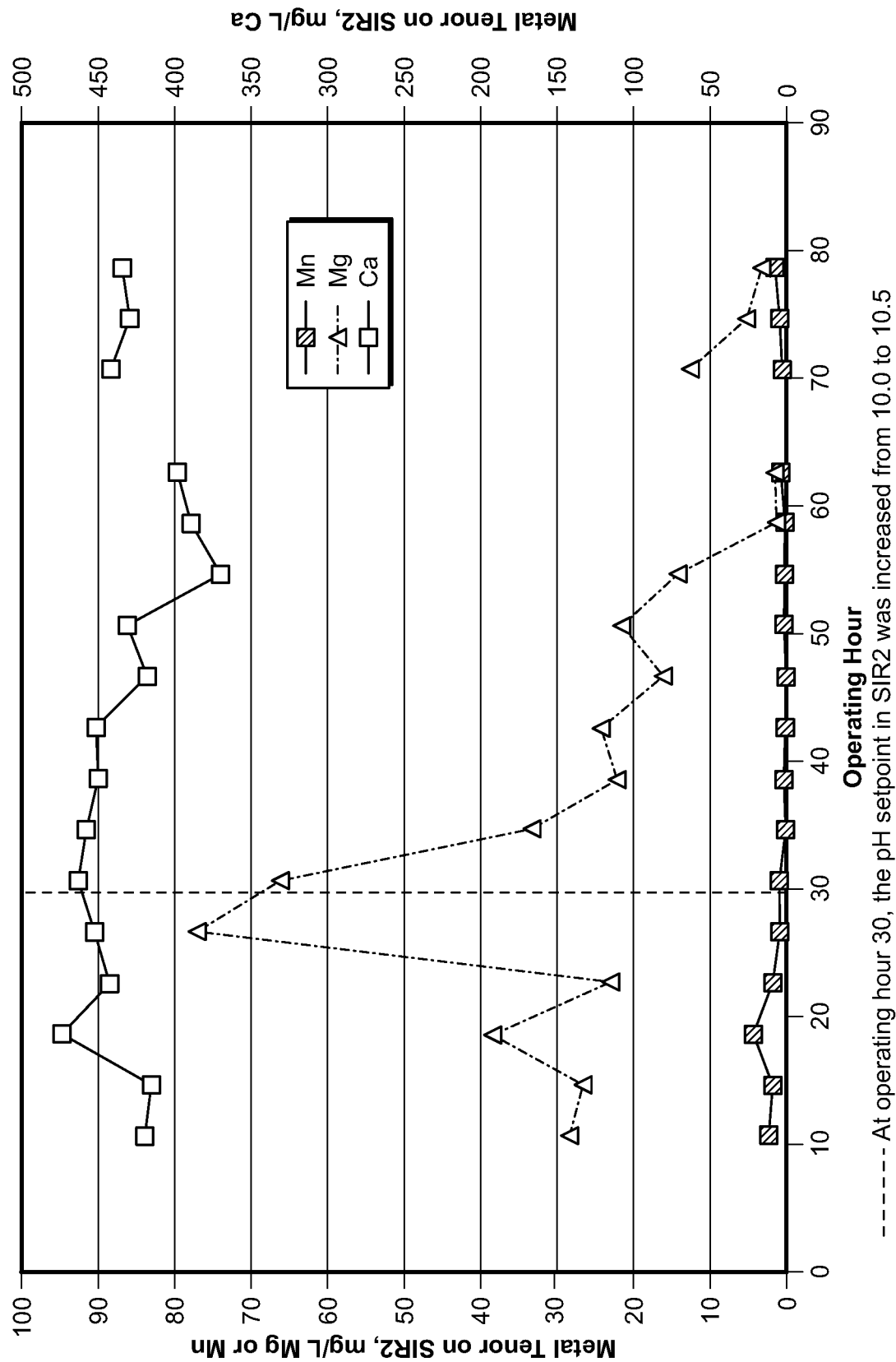
FIG. 7 is a plot showing various metals tenor as a function of time in another example of a process according to the present disclosure.

The impurity tenors of SIR2 solutions are plotted over time in FIG. 7. These solutions have been pH adjusted by sodium hydroxide to above 10, but have not yet been dosed with sodium carbonate. Magnesium tenors are lower after the adjustment, but the levels show a gradual trend downwards that appears to begin prior to the set point change. It should be noted that later in the pilot plant, the retention time was increased for all SIR tanks, which may have also contributed to improved precipitation performance.

Figure 8:
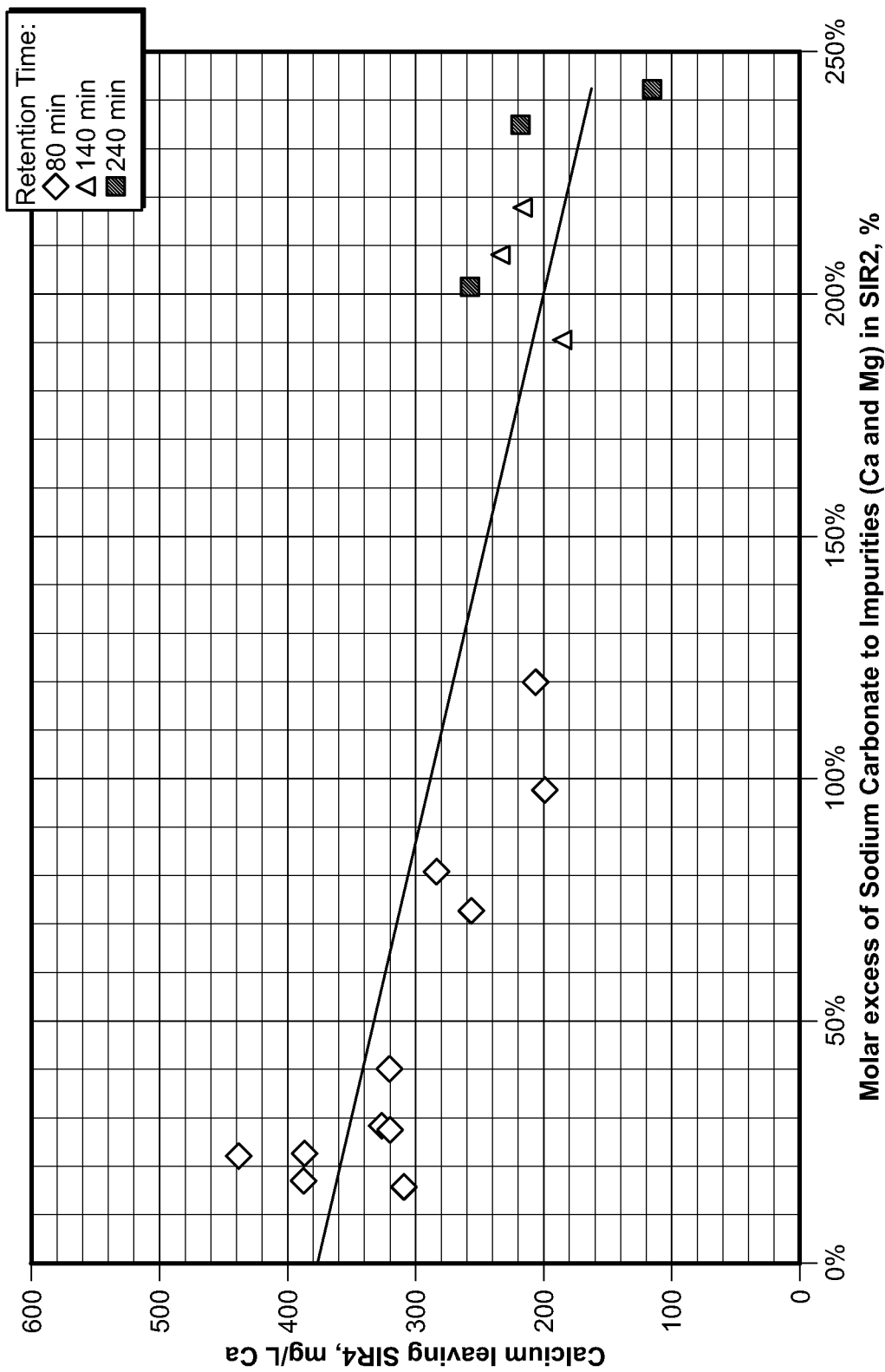
FIG. 8 is a plot showing calcium tenor as a function of molar excess of sodium carbonate in another example of a process according to the present disclosure.
Figure 9:
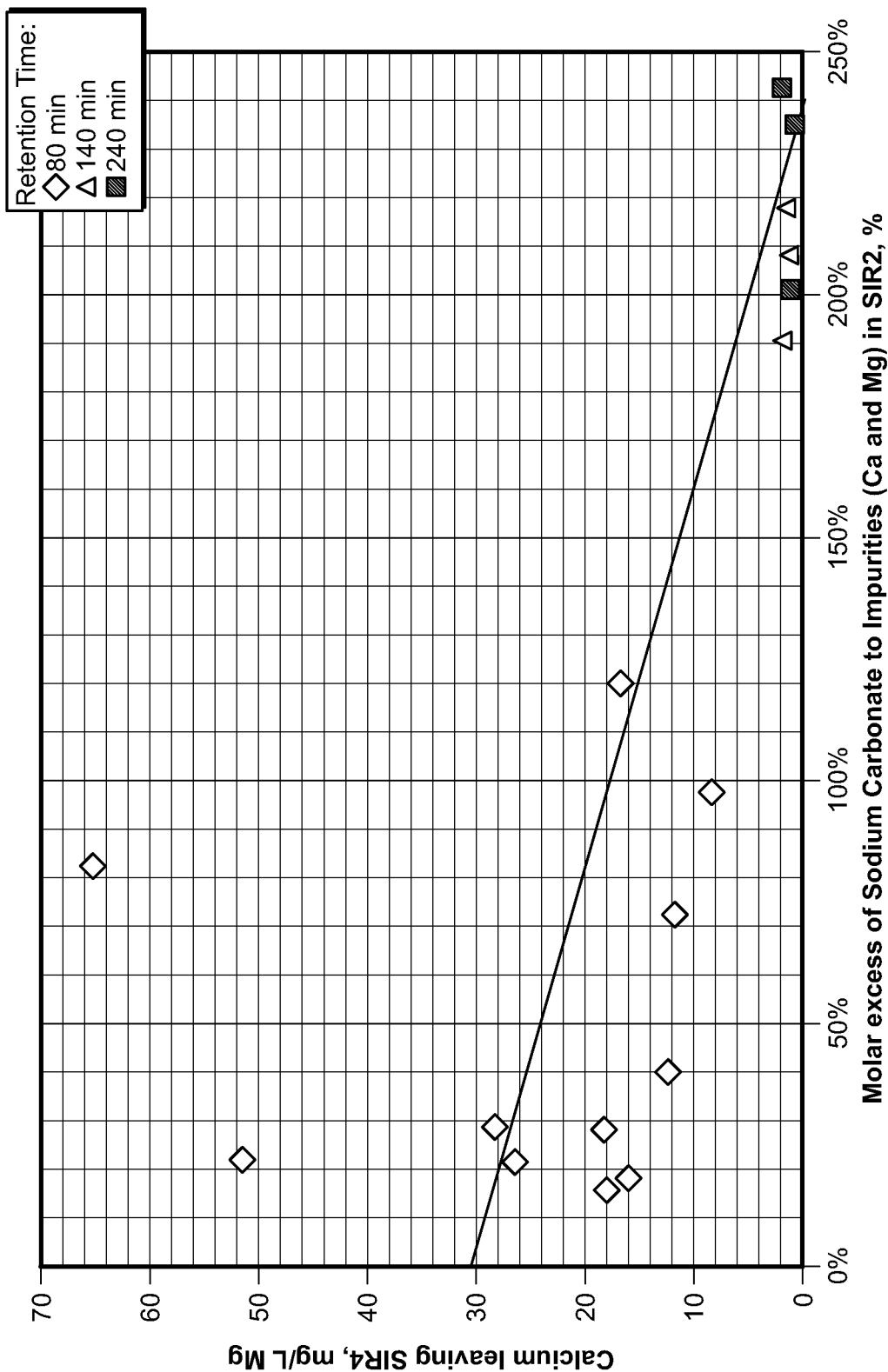
FIG. 9 is a plot showing magnesium tenor as a function of molar excess of sodium carbonate in another example of a process according to the present disclosure.

Calcium and magnesium tenors in solutions leaving SIR4 are plotted in FIGS. 8 and 9. These Figures relate impurity tenor (Mg and Ca only) with the sodium carbonate dosage used at the time the sample was taken. Additionally, the data are plotted based on the retention times of the entire SIR circuit at the time of each sample. Within the range tested, as the sodium carbonate increased, metal tenors decreased. It should be noted that the lowest impurity tenors also corresponded with greater circuit retention time. Sodium carbonate dosage is expressed as molar excess of calcium impurities present prior to sodium carbonate addition (using assays from SIR2). The data indicated that the solution tenor of Ca can decrease to below about 200 mg/L.

Product from the SIR circuit was assayed every about 4 hours as it left the final tank (SIR4) (see FIG. 2). The SIR4 product was pumped into an about 100 L clarifier and the overflow from the clarifier was filtered through an about 0.5 μm spiral wound cartridge filter and then collected in about 1000 L plastic totes. These totes were assayed again to confirm bulk calcium feed tenors for Ion Exchange (IX). When the totes were sampled light brown solids were observed in the bottom of each tote. Assays revealed a significant drop in calcium tenor from the solutions leaving the final tank of the circuit (SIR4) to the solution sitting unmixed in the totes. A comparison of the average assays for both streams is presented in Table 5, below.

TABLE 5

Effect of Aging on SIR Product

| Stream | Mg mg/L | Ca mg/L |
|---|---|---|
| SIR4 Product | 17 | 286 |
| IX Feed Tote | 15 | 140 |

A mass balance for the SIR circuit is shown in Table 6. The mass balance shows that overall about 92% of the magnesium and all of the manganese reported to the solids. The distribution of lithium to the solids is about 0.9% for an overall SIR lithium recovery of about 99.1%.

TABLE 6

Mass Balance of SIR circuit

| Process Streams | | Quantity, | Metal Content, mg/L or % | | |
|---|---|---|---|---|---|
| | | | Mn | Mg | Ca |
| | | Op Hr | kg | g/t or mg/L | | |
| INPUTS | | | | | |
| SIR Feed | | 13.5 | 600 | 72 | 69 | 438 |
| | | 25.5 | 642 | 109 | 111 | 463 |
| | | 37.5 | 470 | 146 | 209 | 459 |
| | | 49.5 | 515 | 199 | 216 | 451 |
| | | 61.5 | 582 | 227 | 181 | 415 |
| | | 73.5 | 484 | 203 | 154 | 441 |
| | | 80.0 | 290 | 195 | 150 | 443 |
| OUTPUTS | | | | | |
| SIR Solids | Pail 1 Solids | | 3.17 | 64700 | 63600 | 86300 |
| | Pail 2 Solids | | 4.03 | 68000 | 54700 | 85200 |
| SIR4 Solution | | 13.5 | 176 | 0.7 | 18 | 309 |
| | | 25.5 | 383 | 1.2 | 21 | 358 |
| | | 37.5 | 426 | 1.6 | 48 | 370 |
| | | 49.5 | 395 | 0.1 | 20 | 325 |
| | | 61.5 | 208 | 0.2 | 7.6 | 191 |
| | | 73.5 | 214 | 0.2 | 1.4 | 220 |
| | | 80.0 | 206 | 0.4 | 1.5 | 225 |
| SIR Lithium Recovery | | | | | |
| SIR solids, kg Li | | | 0.3 | | |
| SIR total out, kg Li | | | 36.3 | | |
| Lithium Recovery, % | | | 99.1 | | |
| Process Streams | | | Metal Units, g | | |
| | | Op Hr | Density kg/L | Mn | Mg | Ca |
| INPUTS | | | | | |
| SIR Feed | | 13.5 | 1.08 | 40 | 38 | 242 |
| | | 25.5 | 1.03 | 68 | 69 | 288 |
| | | 37.5 | 1.12 | 62 | 88 | 193 |
| | | 49.5 | 1.14 | 90 | 97 | 203 |
| | | 61.5 | 1.10 | 121 | 96 | 220 |
| | | 73.5 | 1.20 | 81 | 62 | 177 |
| | | 80.0 | 1.17 | 48 | 37 | 109 |
| OUTPUTS | | | | | |
| SIR Solids | Pail 1 Solids | | | 205 | 201 | 273 |
| | Pail 2 Solids | | | 274 | 221 | 343 |
| SIR4 Solution | | 13.5 | 1.05 | 0 | 3 | 52 |
| | | 25.5 | 1.09 | 0 | 7 | 126 |
| | | 37.5 | 1.11 | 1 | 18 | 143 |
| | | 49.5 | 1.15 | 0 | 7 | 112 |
| | | 61.5 | 1.15 | 0 | 1 | 35 |
| | | 73.5 | 1.20 | 0 | 0 | 39 |
| | | 80.0 | 1.21 | 0 | 0 | 38 |
| Precipitation = (1 − SIR4 solution/SIR Feed)*100 | | | | | |
| | | 13.5 | | 100 | 92 | 79 |
| | | 25.5 | | 99 | 89 | 56 |
| | | 37.5 | | 99 | 79 | 26 |
| | | 49.5 | | 100 | 93 | 45 |
| | | 61.5 | | 100 | 99 | 84 |
| | | 73.5 | | 100 | 100 | 78 |
| | | 80.0 | | 100 | 99 | 65 |
| | TOTAL | | | 100 | 92 | 62 |
| Accountability, OUT/IN % | | | | 94 | 94 | 81 |
| Distribution to Solids | | | | 100 | 92 | 53 |

Ion Exchange

The SIR product is processed through an ion-exchange (IX) circuit to further reduce the Ca and Mg tenors prior to lithium product production. The IX circuit comprises three columns packed with Purolite™ S950, a cationic resin that can be used in the sodium form that is selective towards divalent and trivalent metal ions. Purolite™ S950 comprises an aminophosphonic resin supported on a macroporous cross-linked polymer. It can be used for the removal of heavy metal cations. At high pH it can be active in the removal of Group 2 metal cations (Mg, Ca and Ba) and Cd, Ni and Co. At high pH divalent metal cations are preferentially absorbed over monovalent metal cations (e.g. Li, Na, K). Any ion exchange resin that would be suitable for substantially selectively removing divalent metal cations such as $Ca^{2+}$ and $Mg^{2+}$ and/or trivalent metal cations could be alternatively used in the present disclosure. Alternatively, more than one type of resin can be used to selectively remove the various metal cations. Thus, different ion exchange resins can be used for different metal cations.

Figure 10:
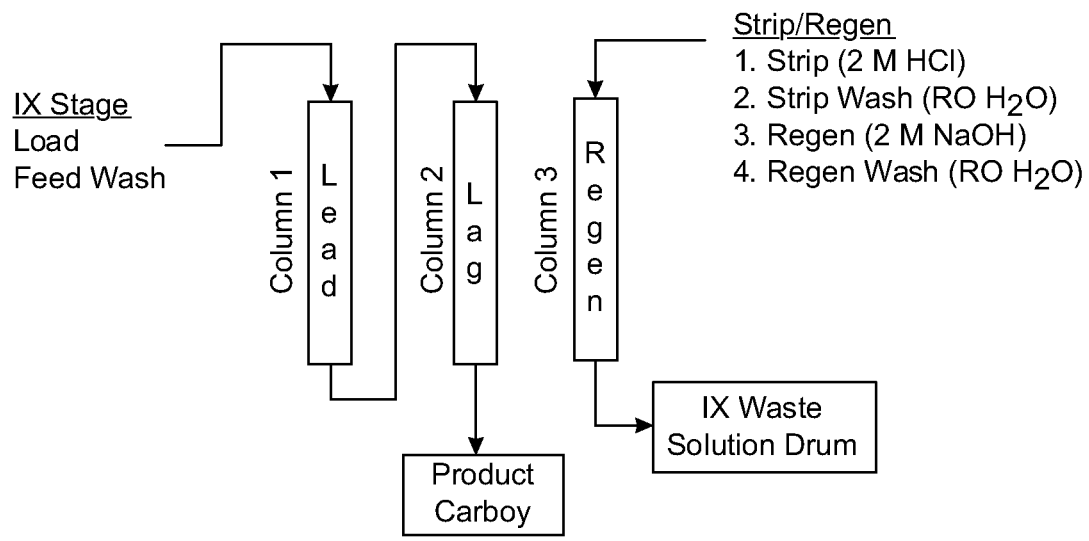
FIG. 10 is a schematic representation of another example of a process according to the present disclosure.
Figure 10:
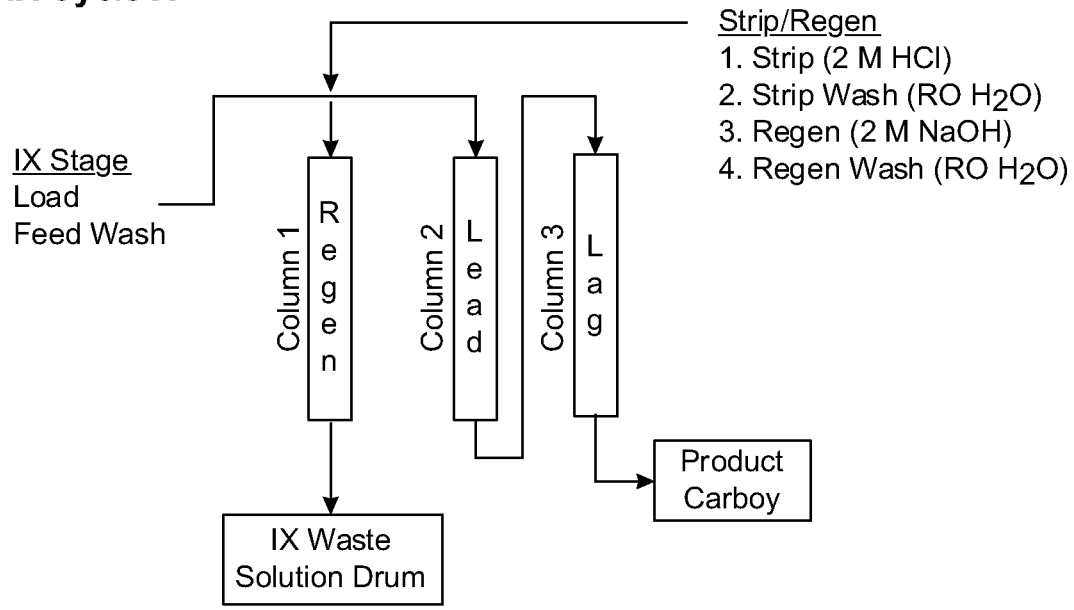

The operating philosophy used for the IX circuit was a Lead-Lag Regeneration process (see FIGS. 2 and 10). Two of the IX columns of the circuit are involved with Ca and Mg removal, while the resin regeneration cycle is conducted on the third column. A schematic illustrating the solution flow through the IX circuit and the lead-lag regeneration operation is provided in FIG. 10. The loading of Ca and Mg will take place on two columns denoted lead and lag and will produce an effluent having both Ca and Mg solution tenors below about 10 mg/L. The loaded column undergoes stripping and regeneration stages prior to being reintroduced as the lag column for the next loading cycle. The columns were constructed from clear PVC pipe. Each column had a diameter of about 15 cm and a height of about 76 cm. The bed volume of each column was about 10 L.

The parameters for the IX operation are summarized in Table 7. These parameters were based on the laboratory tests results and the Lead-Lag column configuration was designed to process 75 bed volumes (BV) of feed solution before the Ca and Mg tenors in the Lag effluent exceeded established upper limit that was about 10 mg/L that was established for each cation. After processing 75 BV's of feed solution the combined absorption capacity of the resin in the Lead and Lag columns would not be sufficient to produce a final effluent with the Ca and Mg tenors each below about 10 mg/L. At this point the loading cycle is complete. The Lead column is promoted to the Regeneration stage. The Lag column takes the Lead position. The Regenerated column becomes the Lag column.

The Regeneration stage involved washing the Lead column with reverse osmosis (RO) water to flush out the Li rich solution within the column. This solution is passed to the Lag column. The Feed Wash stage is followed by Acid Strip using about 2 M HCl. This removes the absorbed Ca, Mg, Li and other metal cations from the resin. The resin is now in the acid form. An Acid Wash stage follows to rinse the remaining HCl(aq) from the column. The resin is then converted to the Na form by passing about 2 M NaOH through the column (Regeneration Stage). The final step involves washing the excess NaOH from the column using reverse osmosis (RO) water. The resin is now regenerated and ready to be promoted to the Lag position for the next Loading cycle. The effluent from the Acid Strip cycle was collected separately. The effluents from the Acid Wash, Regeneration and Regeneration Wash cycles were all captured in the same drum.

The Acid Strip stage produces a solution that contains Li, Ca, and Mg. The data indicated that Li elutes from the column first followed by Ca and Mg. It can be possible to separately capture the Li fraction and as a result produce a lithium chloride solution.

TABLE 7

IX Pilot Operation Parameters

| IX Stage | Solution | Bed Volume (BV) | Rate, BV/h |
|---|---|---|---|
| Loading | IX Feed | 75 | 5 |
| Feed Wash | RO Water | 1.5 | 5 |
| Acid Strip | 2M HCl | 3 | 5 |
| Acid Wash | RO Water | 5 | 5 |
| Regeneration | 2M NaOH | 3 | 5 |
| Regeneration Wash | RO Water | 3 | 5 |

1 BV = 10 L

A total of about 2154 L of SIR Product solution was processed through the IX circuit in four cycles. The average Li, Ca, and Mg tenors of the feed solutions for each cycle are summarized in Table 8.

TABLE 8

IX - Average Feed Solution Li, Ca and Mg Tenors

| | Average Feed Solution Tenor, mg/L | | |
|---|---|---|---|
| IX Cycle | Li | Ca | Mg |
| C1 | 16480 | 176 | 28.2 |
| C2 | 17600 | 140 | 12.9 |
| C3 & C4 | 21940 | 78.7 | 3.6 |

A cycle was initially designed to operate the Loading stage for 75 BV's. The average loading flow rate was about 832 mL/min (about 49.9 L/h). Cycle 1 was the only cycle where 75 BVs of feed solution was passed through the Lead-Lag columns.

Figure 11:
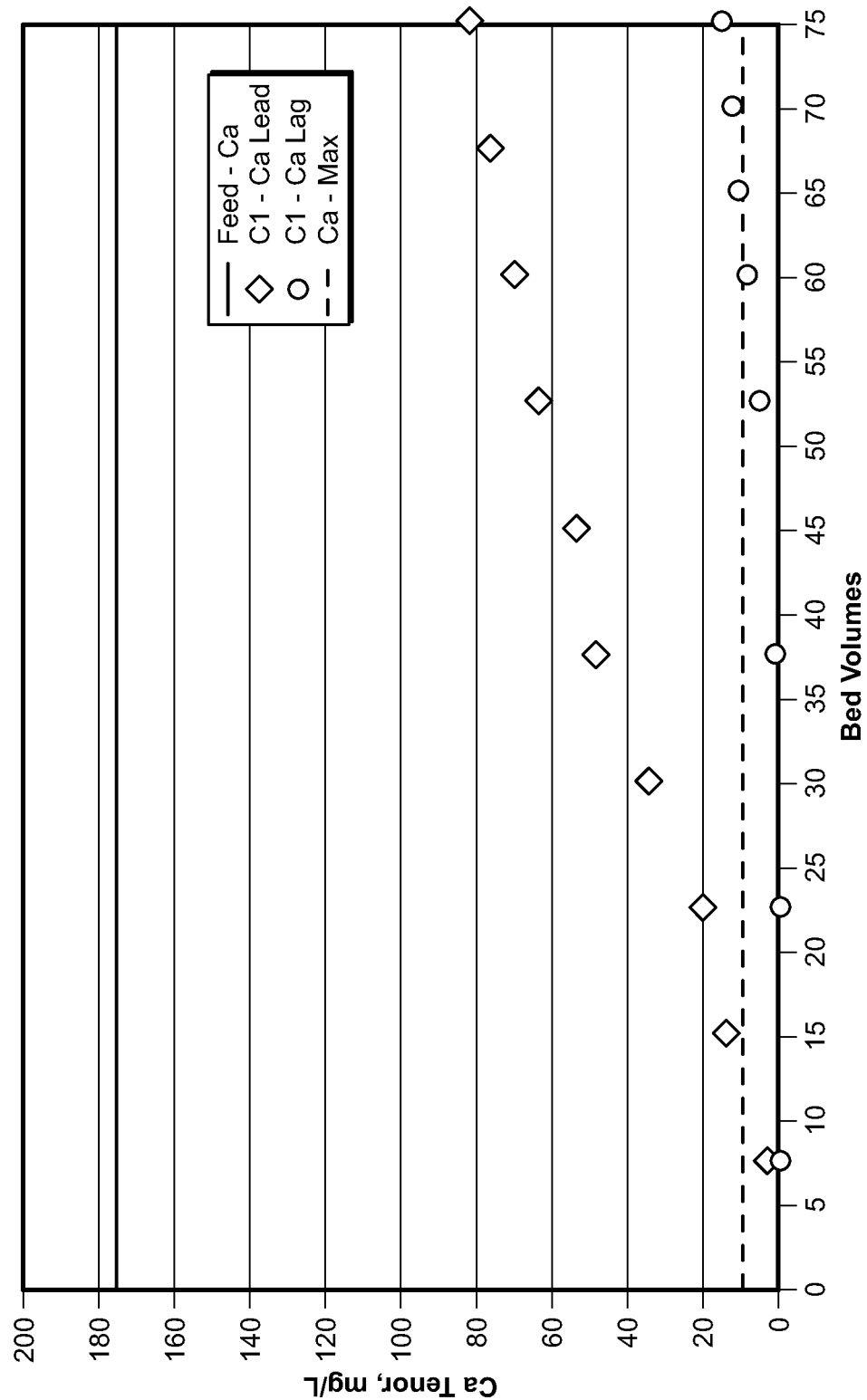
FIG. 11 is a plot showing calcium tenor as a function of bed volumes in ion exchange process in another example of a process according to the present disclosure.

The Ca Loading curve for Cycle 1, where the Ca tenor of the effluents from the Lead and Lag columns are plotted against cumulative bed volume processed, is presented in FIG. 11. Also plotted on this plot is the average Ca tenor in the feed solution and the selected limit for Ca tenor in the Lag effluent (about 10 mg/L) for the present example. The breakthrough point for Ca of the Lead column occurred at 7.5 BV. The Ca tenor of the Lead effluent was about 82.3 mg/L after 75 BV's indicating that the loading capacity of the Lead column was not reached for Ca. The breakthrough point for Ca of the Lag column occurred at about 35 BV. The Ca tenor in the Lag effluent increased above about 10 mg/L between the $60^{th}$ and $65^{th}$ BV. It was decided to continue the Loading stage of Cycle 1 through to the $75^{th}$ BV point even though the Lag effluent was above about 10 mg/L of Ca. The effluent from the $65^{th}$ to $75^{th}$ BV point was diverted to an about 200 L drum and kept separate from the main product solution of Cycle 1. The diverted solution was later combined with the main Cycle 1 product when it was determined that the Ca tenor in the resulting combined solution would not exceed about 10 mg/L.

Figure 12:
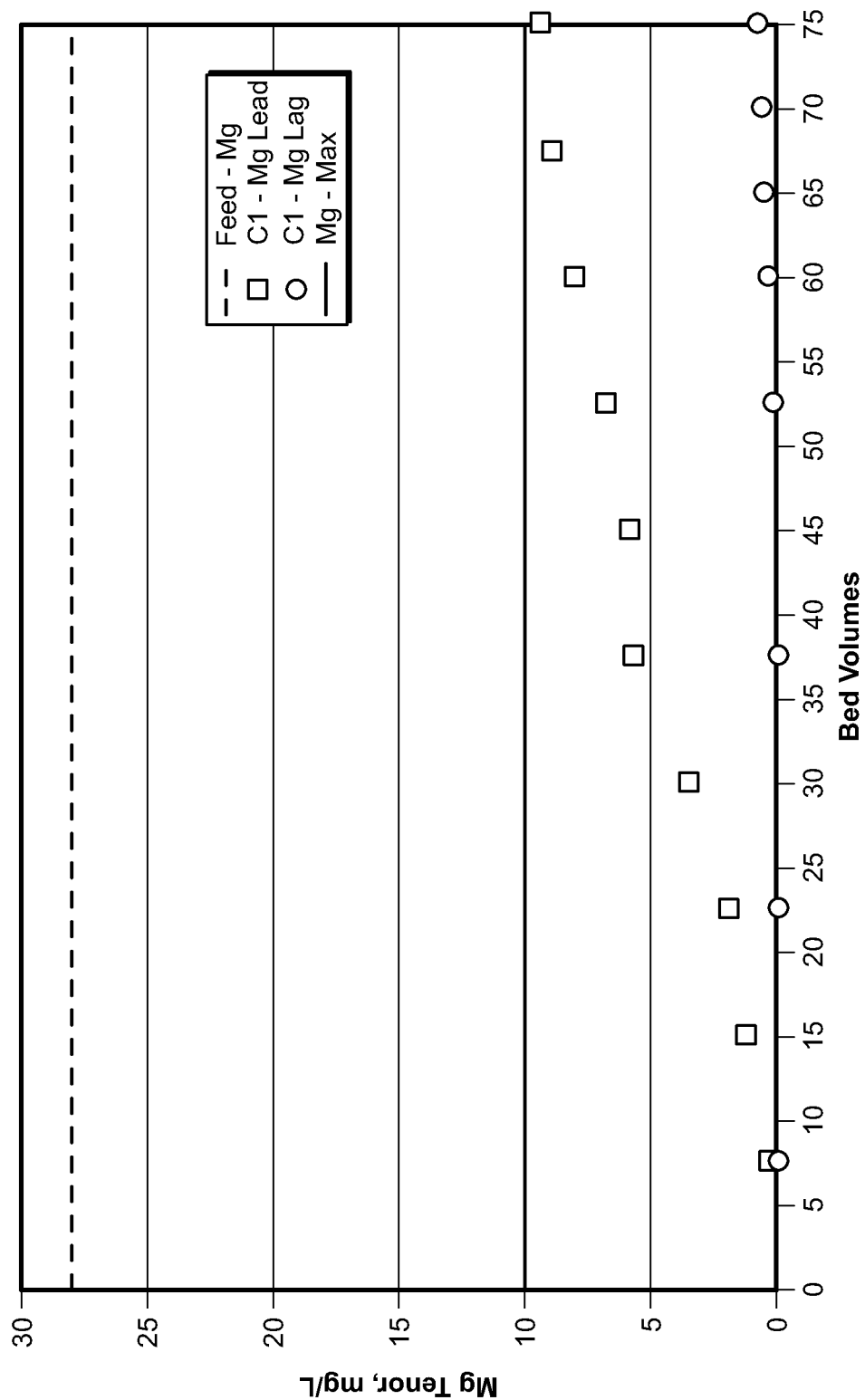
FIG. 12 is a plot showing magnesium tenor as a function of bed volumes in the ion exchange process in another example of a process according to the present disclosure.

A similar loading profile for Mg for Cycle 1 is presented in FIG. 12. The average Mg tenor in the feed solution and for example an upper limit of Mg tenor in the Lag effluent (about 10 mg/L) are also included in this plot. The breakthrough point for Mg of the Lead column occurred at 7.5 BV's. After 75 BV's the Mg tenor of the Lead effluent was about 9.5 mg/L. The breakthrough point for Mg of the Lag column occurred at 52.5 BV's. After 75 BV's the Mg tenor of the Lag effluent was about 0.8 mg/L, well below the selected limit level for Mg in the IX product solution, according to this example.

Figure 13:
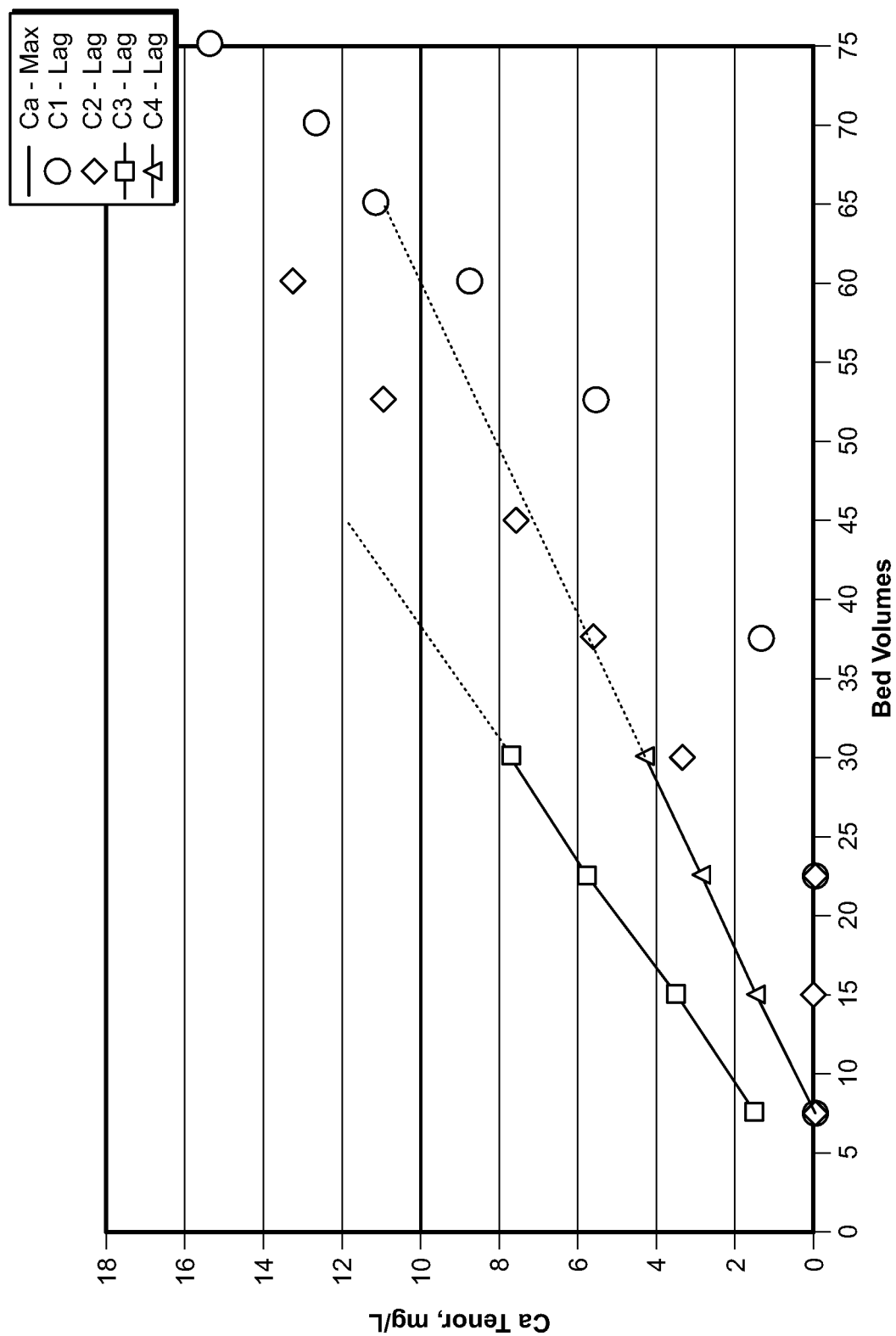
FIG. 13 is a plot showing calcium tenor as a function of bed volumes in another example of a process according to the present disclosure.

Cycles 2 and 3 had to be stopped before 75 BV's of feed solution could be processed through the columns. The Ca tenors of the Lag effluent for each IX cycle are plotted against cumulative BV in FIG. 13. In the case of Cycle 2 the Ca breakthrough points for the Lead and Lag columns occurred at <about 7.5 and about 23 BV, respectively. Cycle 2 was stopped after about 68 BV. The Ca in the Lag effluent had reached about 13 mg/L at after about 60 BV's. Breakthrough of Ca for the Lag column of Cycle 3 occurred within the first 5 BV's. Cycle 3 was stopped after about 30 BV's. The tenor of the Ca in the Lag effluent at the 30 BV point was about 7.7 mg/L.

The balance of the Cycle 3 feed solution was processed over about 36.4 BV's in Cycle 4. The Ca breakthrough points for the Lead and Lag columns for Cycle 4 occurred at <about 7.5 and about 7.5 BV, respectively. Extrapolation of the Cycle 4 Lag effluent Ca tenor data indicated that the product solution would have a Ca tenor >about 10 mg/L after 60 BV's.

Figure 14:
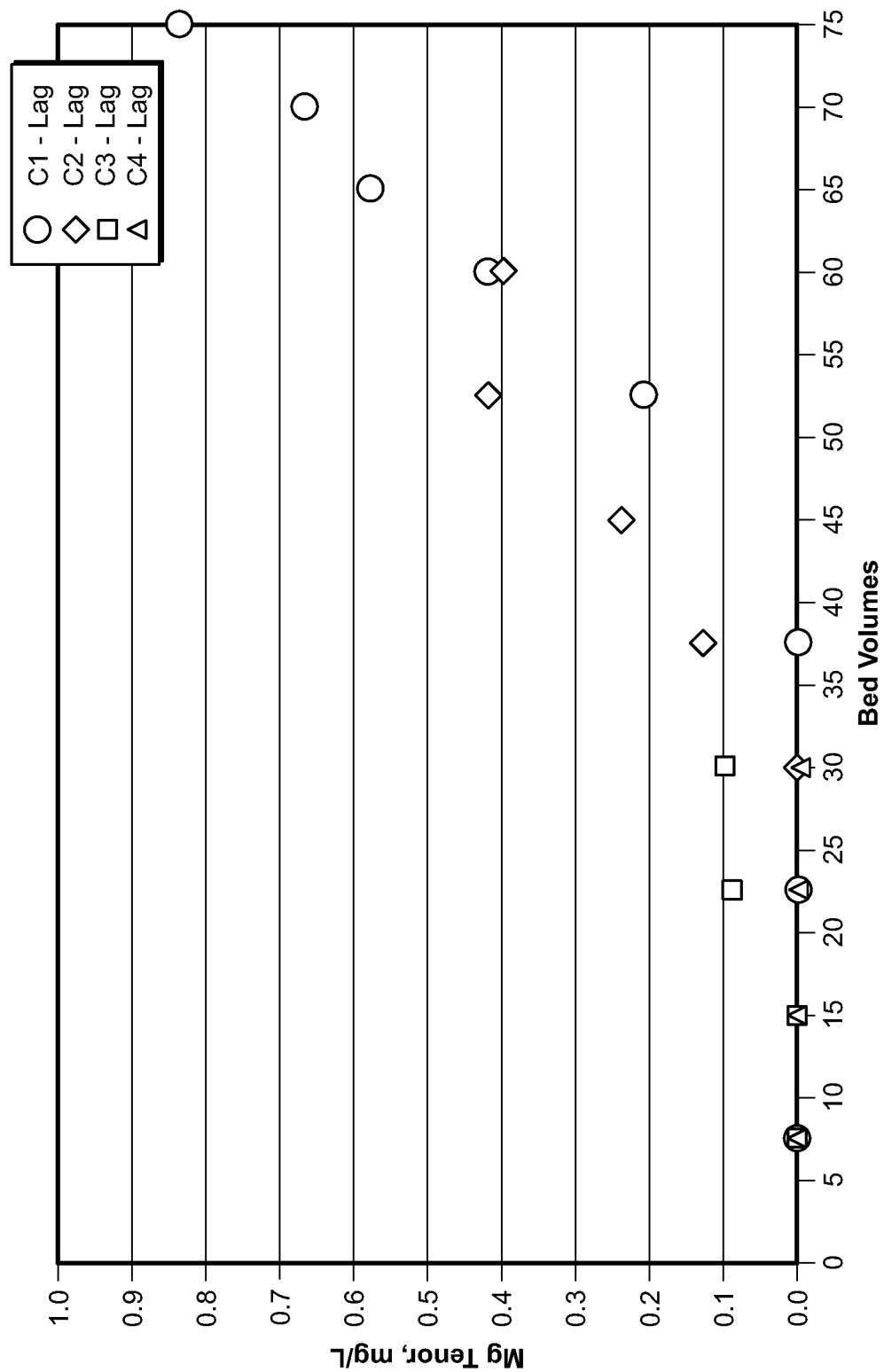
FIG. 14 is a plot showing magnesium tenor as a function of bed volumes in another example of a process according to the present disclosure.

The Mg tenors of the Lag effluent for each IX cycle are plotted against cumulative BV in FIG. 14. It is clear that the Mg tenor in the Lag effluent never approached a level close to the level of about 10 mg/L.

Figure 15:
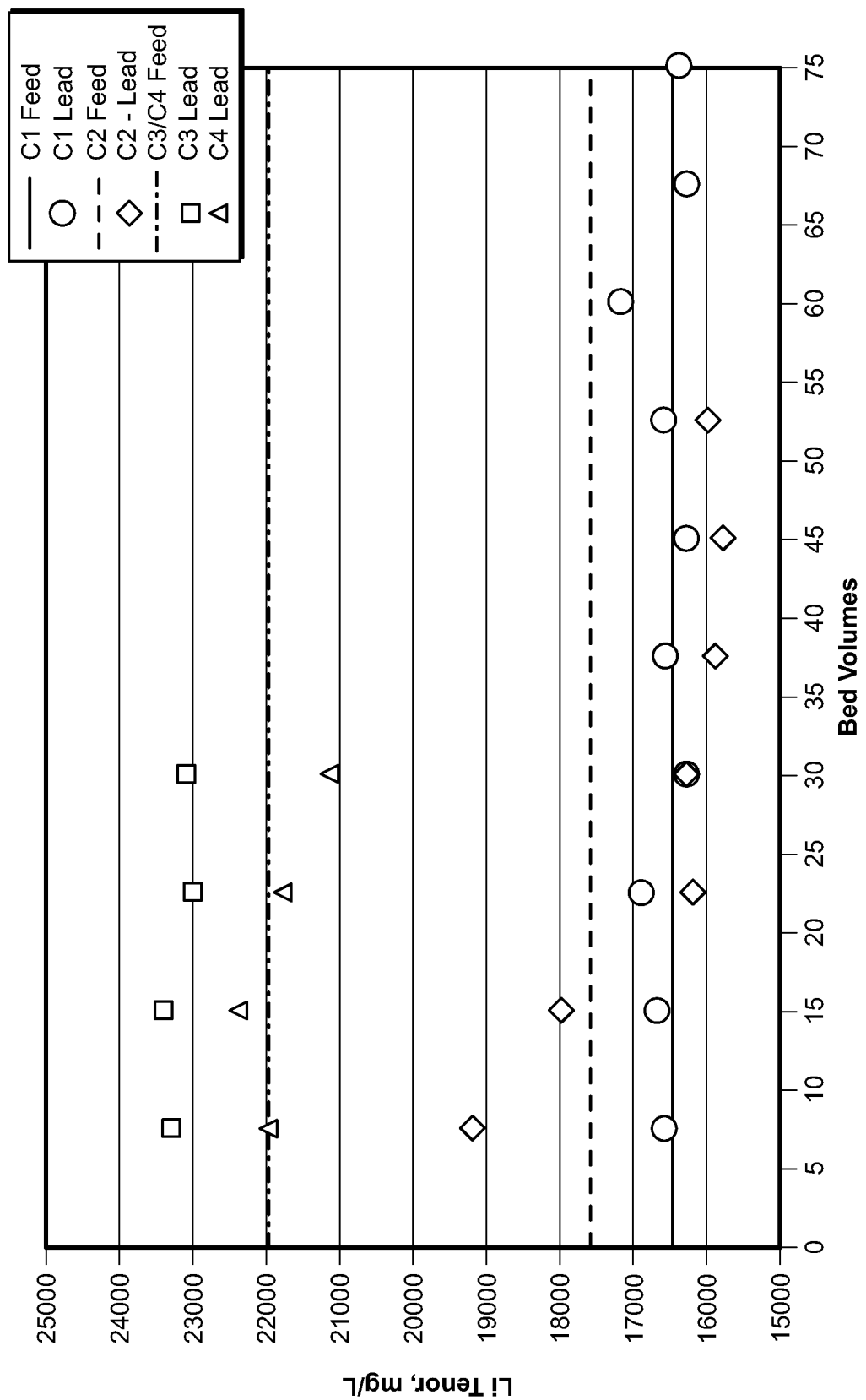
FIG. 15 is a plot showing lithium tenor as a function of bed volumes in another example of a process according to the present disclosure.

The average Li tenors of the Lead effluent for each IX cycle are plotted against cumulative BV in FIG. 15. Also included in this plot are the average Li tenors of the feed solutions. The data indicated that substantially no Li loaded onto the resin.

Figure 16:
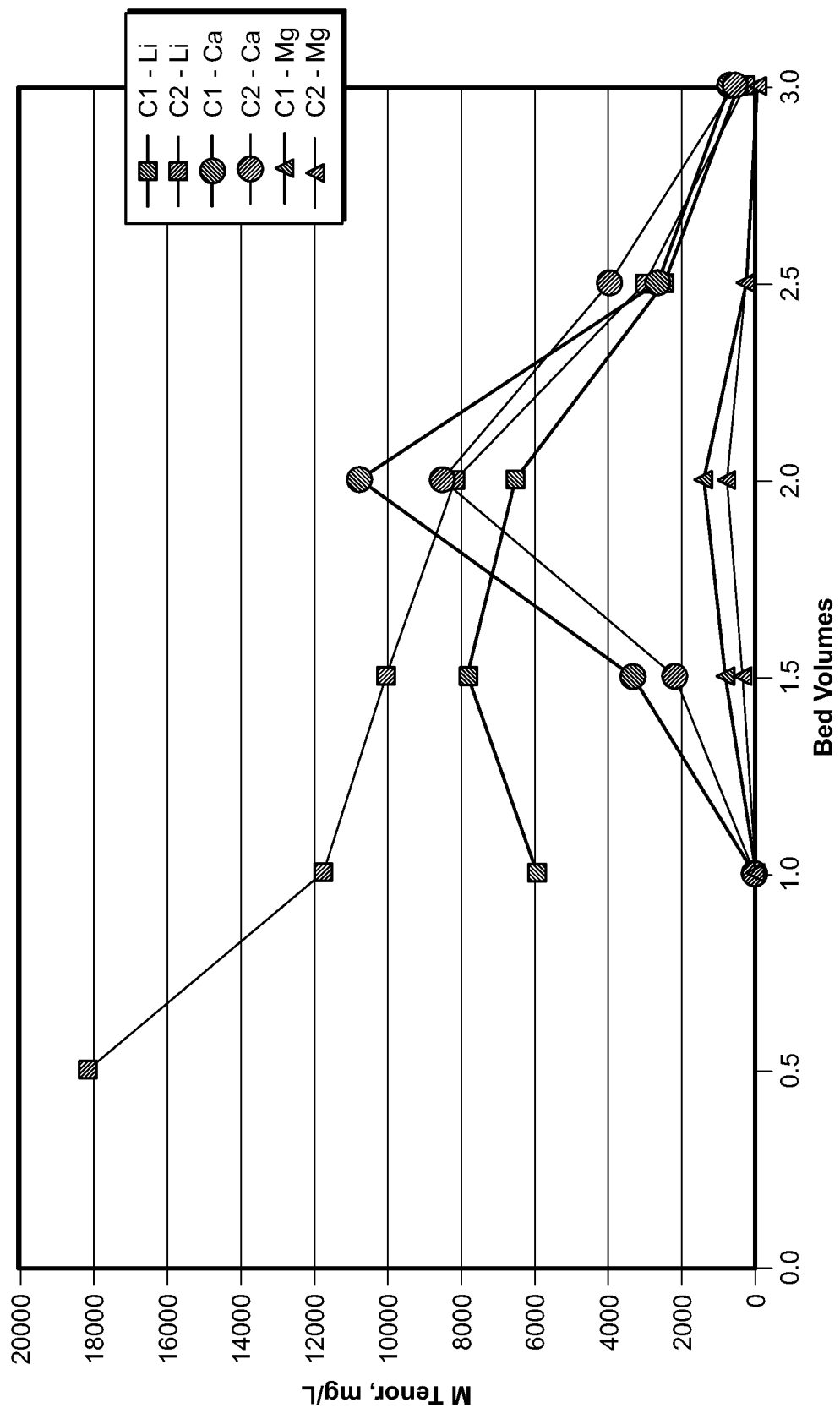
FIG. 16 is a plot showing various metals tenor as a function of bed volumes in another example of a process according to the present disclosure.

The Li, Ca and Mg tenors in the Acid Strip effluents of Cycle 1 and 2 are plotted against cumulative BV in FIG. 16. The data indicate that Li is stripped first from the resin and reaches for example an upper limit tenor in the range of about 0.5 and about 1.5 BV's. The Ca and Mg eluted from the resin starting around 1 BV and both reach for example an upper limit tenor at about 2 BV. The three metals are eluted from the resin after 3 BV's. The Ca and Mg profiles for Cycle 3 and 4 were similar.

Reagent consumptions are reported relative to the LCE produced on a kg per about 1000 kg basis. The lithium sulphate stream produced from Ion Exchange contained about 39.1 kg of Li (this includes 100% of the lithium units in a PIR PLS sample that did not undergo SIR and IX). The equivalent mass of lithium carbonate that could be produced given no losses in downstream processes would equal about 187.7 kg.

The IX circuit produced about 2006 L of product solution. The assay data of the IX Product solutions are summarized in Table 9. The Li tenor ranged from about 15.7 to about 21.9 g/L. The ranges of the Ca and Mg tenors were about 2.4 to about 5.7 mg/L and <about 0.07 to about 0.2 mg/L, respectively. Other constituents of note were Na and K at about 3.5 g/L and about 0.1 g/L on average, respectively. The elements that assayed below the detection limits of the analytical technique are also listed in Table 9.

TABLE 9

IX Product Solution Assays

| IX Product | Solution Tenor, mg/L | | | | | | | | |
|---|---|---|---|---|---|---|---|---|---|
| | Li | SO4 | Cl | Na | K | Ca | Sr | Mg | Ba |
| Carboy 1 | 15700 | 120000 | 5 | 3980 | 107 | 3.8 | 0.61 | 0.2 | 0.03 |
| Carboy 2 | 16700 | 120000 | 4 | 1990 | 105 | 5.7 | 0.9 | 0.18 | 0.043 |
| Carboy 3 | 21900 | 160000 | 5 | 4470 | 117 | 2.4 | 0.74 | <0.07 | 0.05 |

| Elements Assaying below Detection (Detection Limits provided in mg/L) | | | | | | | | | |
|---|---|---|---|---|---|---|---|---|---|
| Ag | Al | As | Be | Bi | Cd | Co | Cr | Cu | Fe |
| <0.5 | <0.8 | <3 | <0.002 | <1 | <0.3 | <0.3 | <0.2 | <0.1 | <0.2 |
| Mn | Mo | Ni | P | Pb | Sb | Se | Sn | Ti | Tl |
| <0.04 | <0.6 | <1 | <5 | <2 | <1 | <3 | <2 | <0.1 | <3 |
| U | | V | | W | | Y | | Zn | |
| <1 | | <0.07 | | <2 | | <0.02 | | <0.7 | |

The mass balance for the IX circuit is provided in Table 10. Good accountability for Li was obtained. About 2.7% of the Li was lost in the Strip/Regeneration process solution. The process removed about 97.6% of the Ca and about 99.0% of the Mg contained in the feed solutions.

The IX circuit met the process objectives by reducing the Ca and Mg tenors in the product solution to below about 10 mg/L for each metal cation. Further, a high quality lithium sulphate solution was produced.

TABLE 10

IX Mass Balance

| | | Assays, mg/L or % | | |
|---|---|---|---|---|
| Process Stream | kg or L | Li | Ca | Mg |
| SIR Feed C1 | 750 | 16480 | 176 | 28.2 |
| SIR Feed C2 | 682 | 17600 | 140 | 12.9 |
| SIR Feed C3 | 359 | 21940 | 78.7 | 3.6 |
| SIR Feed C4 | 364 | 21940 | 78.7 | 3.6 |
| IX Product Carboy 1 | 914 | 15700 | 3.8 | 0.2 |
| IX Product Carboy 2 | 478 | 16700 | 5.7 | 0.18 |
| IX Product Carboy 3 | 614 | 21900 | 2.4 | <0.07 |
| IX Regen Reject Drum 1 | 202 | 16.9 | 35.5 | 2.47 |
| IX Regen Reject Drum 2 | 208 | 12.2 | 16.7 | <0.07 |
| IX Strip - Solids | 0.8 | 0.002 | 26.5 | 0.0004 |
| IX Strip - Solution | 111 | 8760 | 718 | 229 |

TABLE 10-continued

IX Mass Balance

| Process Stream | kg or L | Assays, mg/L or % | | |
|---|---|---|---|---|
| | | Li | Ca | Mg |
| Elemental Masses IN, kg | | | | |
| SIR Feed C1 | | 12.36 | 0.13 | 0.02 |
| SIR Feed C2 | | 11.99 | 0.10 | 0.01 |
| SIR Feed C3 | | 7.87 | 0.03 | 0.00 |
| SIR Feed C4 | | 7.99 | 0.03 | 0.00 |
| Total IN, kg | | 40.2 | 0.28 | 0.03 |
| Elemental Masses OUT, kg | | | | |
| IX Product Carboy 1 | | 14.35 | 0.00 | 0.00 |
| IX Product Carboy 2 | | 7.99 | 0.00 | 0.00 |
| IX Product Carboy 3 | | 13.45 | 0.00 | 0 |
| IX Regen Reject Drum 1 | | 0.00 | 0.01 | 0.00 |
| IX Regen Reject Drum 2 | | 0.00 | 0.00 | 0 |
| IX Strip - Solids | | 0.00 | 0.22 | 0.00 |
| IX Strip - Solution | | 0.97 | 0.08 | 0.03 |
| Total OUT, kg | | 36.8 | 0.32 | 0.03 |
| Distribution, % | | | | |
| Product | | 97.3 | 2.4 | 1.0 |
| Tails | | 2.7 | 97.6 | 99.0 |
| Distribution Total | | 100.0 | 100.0 | 100.0 |
| OUT/IN, % | | 91.4 | 112.4 | 80.3 |
| Li Loss, % | | 2.7 | | |
| M Removed, % | | | 97.6 | 99.0 |

Examination of the semi-quantitative x-ray diffraction (SQ-XRD) data of composite samples of the CL/PIR residues showed that each sample contains both α- and β-spodumene. The SQ-XRD data for the CL/PIR residues generated from each of the two feed samples (75/25 and 50/50) are summarized in Table 11. The presence of α-spodumene indicates that the phase transition step that was conducted by a third party vendor (acid roast of α-spodumene) was not 100% efficient. Any Li present in this form would thus not be chemically available to the hydrometallurgical process. It should be noted that the efficiency of the phase transition step (conversion from α-spodumene to β-spodumene) is not 100% and therefore a percentage of the contained Li in the feed to the Hydrometallurgical process is as α-spodumene.

TABLE 11

SQ-XRD Data of the two CL/PIR Residue Types

| Chemical Composition | 75/25 CL/PIR Residue Drum 1-5, wt % | 50/50 CL/PIR Residue Drum 7-14, wt % |
|---|---|---|
| $H(AlSi_2)O_6$ | 60.6 | 67.3 |
| Spodumene beta | 12.0 | 9.4 |
| $SiO_2$ | 11.6 | 7.5 |
| $NaAlSi_3O_8$ | 3.6 | 3.8 |
| $CaSO_4 \cdot (H_2O)$ | 2.7 | 4.4 |
| $KAlSi_3O_8$ | 1.6 | 3.6 |
| $LiAlSi_2O_6$ | 2.2 | 2.5 |
| $Ca(SO_4)(H_2O)_{0.5}$ | 2.5 | — |
| αFeO·OH | 1.9 | — |
| $Fe_3O_4$ | — | 1.6 |
| $CaSO_4 \cdot 2H_2O$ | 1.1 | — |
| gamma-$Mn_3O_4$ | 0.3 | — |
| | 100.1 | 100.1 |
| Li Bearing Mineral | Relative Distribution of Li, % | |
| Spodumene beta | 94.9 | 92.7 |
| $LiAlSi_2O_6$ | 5.1 | 7.3 |

The Li units that are in the CL/PIR residues as β-spodumene were never available to the process and as a result provide a false low Li recovery value.

An adjusted Li recovery was calculated that did not consider the Li units tied up as β-spodumene in the CL/PIR residue. The data for this calculation are summarized in Table 12. The total Li in all of the out process streams was about 63.2 kg. This included about 11.7 kg of Li in the CL/PIR residue that was present as β-spodumene. The adjusted total Li out value thus becomes about 51.6 kg. The total recoverable Li by the overall process was about 46.9 kg. The adjusted total Li recovery is then calculated to be about 95.8%.

TABLE 12

Adjusted Total Li Recovery

| | Li Mass, g |
|---|---|
| Total Li OUT based on Assays | 60615 |
| Total Li Recovered | 46884 |
| Total Li in CL/PIR Residue as β-Spodumene | 11655 |
| Total Li OUT minus Li as β-Spodumene | 48960 |
| Adjusted Total Li Recovery, % | 95.8 |

A high grade lithium sulphate solution was thus produced. In accordance with FIG. 1, this solution can be used, for example, as the lithium source in the production of a solution of high quality lithium hydroxide and/or high quality lithium carbonate. This high grade lithium sulphate solution can also be used as a feed in the production of other high grade lithium products.

EXAMPLE 2

Electrolysis: Conversion of $Li_2SO_4$ into LiOH

I. Introduction

Nafion™ 324 cation exchange membrane was used. This membrane is a reinforced perfluorinated bi-layer membrane with sulfonic acid exchange groups designed, for example to reduce the backmigration of hydroxide groups (resulting in a higher current efficiency). This can be achieved by placing the higher equivalent weight polymer layer facing the cathode. It can also be used at elevated temperatures. Some alternate, for example less expensive cation exchange membranes may also be suitable for the processes of the present disclosure, such as Nafion 902, Fumatech FKB and Neosepta CMB.

Two different anion exchange membranes were tested herein. The Asahi™ AAV anion exchange membrane is a weakly basic, proton blocking membrane used, for example in acid concentration applications. This membrane was tested at about 40° C. The second anion exchange membrane tested herein was the Fumatech FAB membrane. This membrane is an acid stable proton blocking membrane with excellent mechanical stability, and can withstand higher temperatures. It was tested at about 60° C. Higher operating temperatures may, for example require less cooling of the process feed solution before it enters the electrolysis process as well as reduce the overall energy consumption by increasing solution and membrane conductivities. It may also, for example decrease the amount of heating required for the lithium hydroxide stream in the crystallization loop and for the feed returned to the dissolution step.

II. Experimental

The present experiments were carried out in an Electrocell MP cell equipped with a DSA-$O_2$ anode, stainless steel cathode, and one pair of anion/cation exchange membranes. The feed loop consisted of an insulated about 5 liter glass reservoir with a 600 watt tape heater wrapped around it. The solution was circulated with an Iwaki™ WMD-30LFX centrifugal circulating pump. The solution pH, flow rate, temperature, and inlet pressure (to the cell) were all monitored and controlled. The solution conductivity was also monitored. Acid (or base) when needed, was added to the feed solution for pH control using a peristaltic pump and a graduated cylinder as a reservoir.

The anolyte loop comprised an insulated about 2 liter glass reservoir with a 300 watt heating tape wrapped around it. The solution was circulated with a similar pump to the one described above. The solution flow rate, temperature and inlet pressures were also monitored and controlled. Dilution water (for control of the concentration) was added directly to the reservoir using an adjustable flow rate peristaltic pump. This reservoir was allowed to overflow into a larger polypropylene collection reservoir from which the solution was then circulated back to the glass reservoir via peristaltic pump. The catholyte loop was substantially similar to the anolyte loop.

The electrode reactions are as follows:

Cathode: $H_2O+e^-\rightarrow\frac{1}{2}H_2+OH^-$

Anode: $H_2O\rightarrow\frac{1}{2}O_2+2H^++2e^-$

Figure 17:
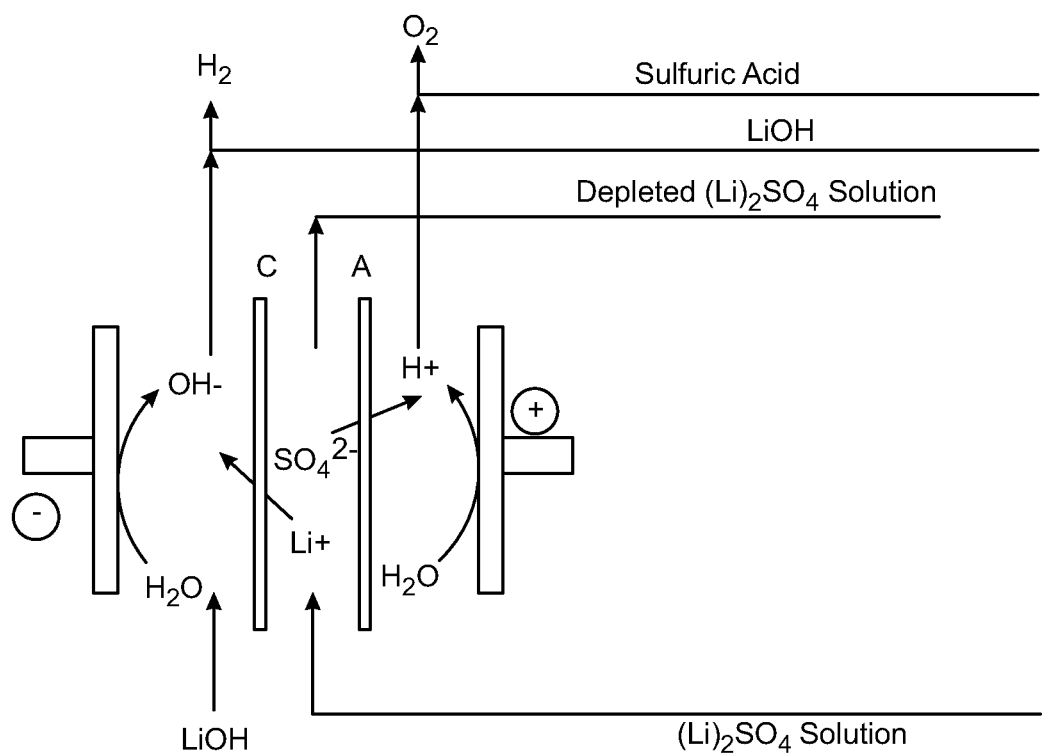
FIG. 17 is a schematic representation of an example of a monopolar membrane electrolysis cell that can be used for carrying out another example of a process according to the present disclosure.

A diagram of the cell configuration is shown in FIG. 17.

The entire electrolysis setup was contained within a fume hood to facilitate proper venting of the hydrogen and oxygen produced at the electrodes.

Samples were taken during the experiments and analyzed for acidity and alkalinity using a simple acid/base titration. Selected samples were also analyzed for anions (sulfate) and cations (lithium and sodium) by Ion Chromatography.

III. Results and Discussion

Experiments with Nafion 324/Asahi AAV Membranes at about 40° C.

Two experiments (856-04 and 856-11) were conducted in this configuration. Table 13 summarizes the parameters used in this experiment. A constant about 6.8 volts was applied for both experiments. This voltage was initially chosen based on prior experience regarding the operating conditions of these membranes.

TABLE 13

Summary of Results with AAV.

| Experiment# | 856-04 | 856-11 |
|---|---|---|
| Membranes | NAF324/AAV | NAF324/AAV |
| Temperature (° C.) | 40 | 40 |
| Mode | Constant 6.8 V | Constant 6.8 V |
| Charge Passed (moles e/% theory Li) | 5.73/58.3 | 5.01/100.7 |
| Time (hr) | 14.25 | 12.78 |
| Avg CD (mA/cm$^2$) | 107.7 | 105 |
| Init [$H_2SO_4$] (molar) | 0.24 | 0.49 |
| Final [$H_2SO_4$] (molar) | 0.97 | 0.53 |
| Acid CE | 62.4 | 65.1 |
| Acid water transport (mol/mol $SO_4$) | 1.6 | −2.7 |
| [Li] and [Na] in initial acid (mMolar) | 0/0* | 0/2.4* |
| [Li] and [Na]* in final acid (mMolar) | 0/0* | 0/2.1* |
| Init Base [Li]/[Na]/[OH] (molar) | 0.49/0/0.46 | 3.1/0.18/2.85 |
| Final Base [Li]/[Na]/[OH] (molar) | 2.97/0.18/3.13 | 3.55/0.23/3.63 |
| Base CE | 82.4 | 73.3 |
| Base water transport (mol/mol Li + Na) | 7.4 | 7.0 |
| [$SO_4$] in base initial/final (mMolar) | 0.4/1.9 | 1.9/1.8 |
| Init Feed [Li]/[Na]/[$SO_4$] (molar) | 3.27/0.18/1.68 | 3.18/0.18/1.65 |
| Final Feed [Li]/[Na]/[$SO_4$] (molar) | 2.39/0.08/1.25 | 1.95/0.05/0.90 |
| % Li Removal | 33.4 | 62.3 |
| LiOH for pH control at 4.0 (% of charge) | 18.2 | 5.7 |
| Li mass balance % | 103 | 99 |
| SO4 mass balance % | 101.5 | 97 |

*Corrected for Na added by KOH used for neutralization of sample prior to IC analysis.

Figure 18:
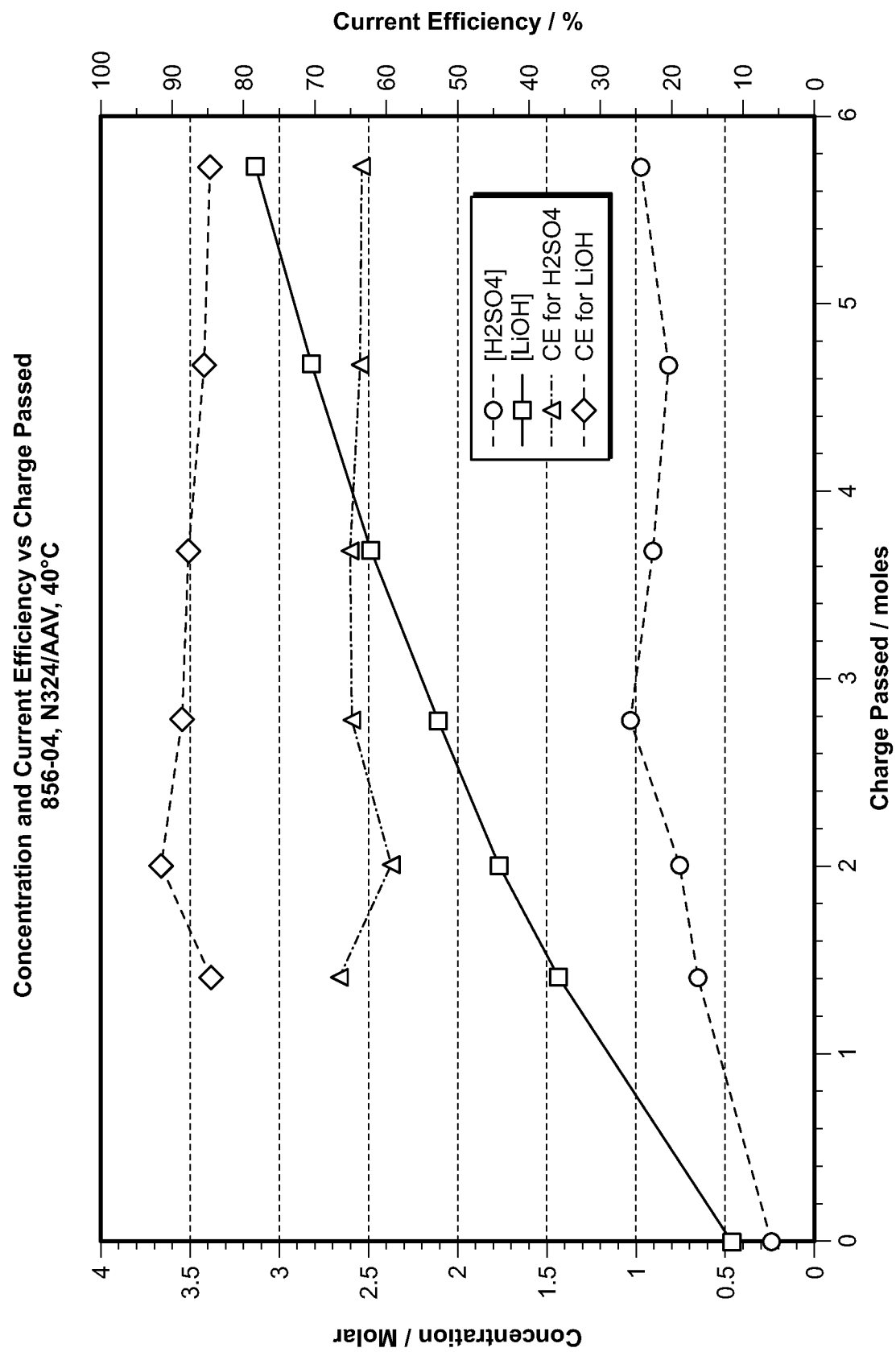
FIG. 18 is a plot showing current efficiency and concentration of $H_2SO_4$ generated in the anolyte, concentration of LiOH generated in the catholyte compartment during monopolar membrane electrolysis at 40 degree C. as a function of charge passed in another example of a process according to the present disclosure.

In the first experiment (#856-04), both acid and base concentrations started at approx. 0.5 N (about 0.25 M sulfuric acid) and were allowed to increase through the electrolysis. The acid strength was allowed to reach about 1 M before being held constant there by the addition of dilution water, whereas the base concentration was allowed to continue increasing. A graph of the concentrations and the resultant current efficiencies is shown in FIG. 18.

A final base concentration of about 3.13 M was achieved at an overall current efficiency of about 82%. The overall acid current efficiency was about 62% with a final acid strength of about 0.97 M.

The feed pH was reduced initially during the experiment down to approximately 4 by the addition of acid and then maintained there. This required metering in lithium hydroxide under pH control, which also indicates that the cation exchange membrane was performing more efficiently than the anion exchange membrane. The amount of lithium hydroxide required to maintain this pH accounts for about 18% of the charge and, as expected, is close to the difference between base and acid current efficiencies. The overall current density was about 108 mA/cm$^2$ for an about 33% of theory lithium removal.

The water transport, which is a measure of the amount of water transported with the ions across the membranes was measured at about 7.4 moles/mole of Li+Na across the Nafion 324 membrane into the base compartment and about 1.6 moles/mole sulfate across the Asahi AAV membrane into the acid compartment.

Figure 19:
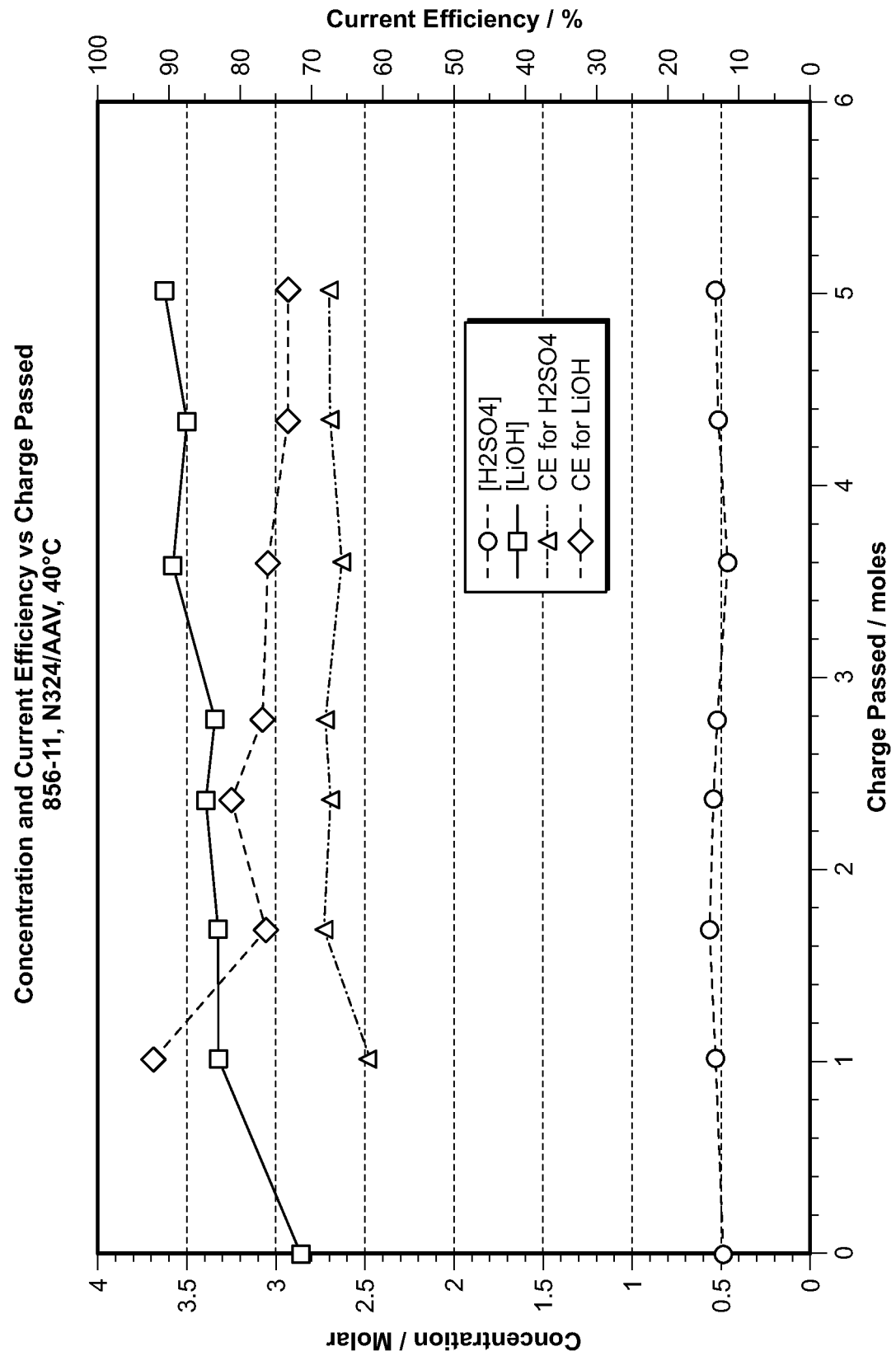
FIG. 19 is a plot showing current efficiency and concentration at 40 degree C. as a function of charge passed in another example of a process according to the present disclosure.

In the second experiment (#856-11) with this membrane configuration, the acid strength was kept constant at a reduced concentration of about 0.5 M, and a higher base concentration (about 2.85 M) was used initially and allowed to rise up to about 3.63 M. In addition, less starting feed was used so that higher depletion could be achieved. Under these conditions, less lithium hydroxide (corresponding to about 6% of the current) was needed to maintain the feed pH at about 4.0, indicating that while the efficiency of both membranes were closer together, the Nafion 324 membrane efficiency remained higher than that of the AAV membrane. A graph of the concentrations and the resultant current efficiencies is shown in FIG. 19.

The overall base current efficiency was about 73% and the acid current efficiency was about 65%. The difference in efficiencies again corresponds well to the amount of lithium hydroxide required to maintain feed pH (about 6%). The overall current density for this experiment was very similar to the previous run at about 105 mA/cm$^2$ for about 62% of theory lithium removal. The water transport rate across the Nafion 324 was similar at about 7.0 moles/mole Li+Na.

Water transport across the Asahi AAV was measured at about −2.7 moles/mole sulfate. (i.e. water transport was from acid to feed due to the lower acid concentration used). Experiments with Nafion 324/Fumatech FAB Membranes at about 60° C.

Initial Baseline Tests

A total of six experiments (#856-22 to #856-63) were conducted in this configuration. Table 14 summarizes the results of the first three experiments, which were used to determine various effects when process variables were manipulated.

TABLE 14

Summary of Results with FAB.

| Experiment# | 856-22 | 856-31 | 856-40 |
|---|---|---|---|
| Membranes | NAF324/FAB | NAF324/FAB | NAF324/FAB |
| Temperature ° C. | 60 | 60 | 60 |
| Mode | Constant 6.8 V | Constant 6.8 V | Constant 6.8 V |
| Charge Passed (moles e/% theory Li) | 6.08/95.9 | 11.11/136.9 | 14.11/124.7 |
| Time (hr) | 15.95 | 44.38 | 45.53 |
| Avg CD (mA/cm$^2$) | 102.2 | 67.1 | 83.1 |
| Init [H$_2$SO$_4$] (molar) | 0.46 | 0.48 | 0.70 |
| Final [H$_2$SO$_4$] (molar) | 0.99 | 0.79 | 0.915 |
| Acid CE | 64.9 | 76.8 | 76.7 |
| Acid water transport (mol/mol SO$_4$) | 3.0 | 0.14 | 1.17 |
| [Li] and [Na] in initial acid (mMolar) | 0/1.6* | 0/3.7* | 0/0* |
| [Li] and [Na]* in final acid (mMolar) | 0/4.6* | 0/10* | 0/0* |
| Init Base [Li]/[Na]/[OH] (molar) | 3.08/0.20/3.08 | 1.97/0.11/1.90 | 2.43/0.12/2.61 |
| Final Base [Li]/[Na]/[OH] (molar) | 3.44/0.24/3.52 | 2.69/0.14/2.61 | 2.81/0.12/2.70 |
| Base CE | 70 | 72.7 | 74.5 |
| Base water transport (mol/mol Li + Na | 7.3 | 8.3 | 7.1 |
| [SO$_4$] in base initial/final (mMolar) | 1.6/1.8 | 0.9/1.9 | 1.8/1.9 |
| Init Feed [Li]/[Na]/[SO$_4$] (molar) | 3.10/0.17/1.62 | 3.16/0.15/1.59 | 3.23/0.16/1.68 |
| Final Feed [Li]/[Na]/[SO$_4$] (molar) | 1.93/0.06/1.00 | 0.03/.003/0.018 | 0.67/0.007/0.42 |
| % Li Removal | 55.8 | 99.7 | 91 |
| Feed pH | Controlled at 4.0 | No pH control 3 to 1.6 to 3.3 | No pH control 3 to 1.8 |
| Li mass balance % | 100 | 102 | 104 |
| SO4 mass balance % | 101 | 104 | 94.3 |

*Corrected for Na added by KOH used for neutralization of sample prior to IC analysis.

Figure 20:
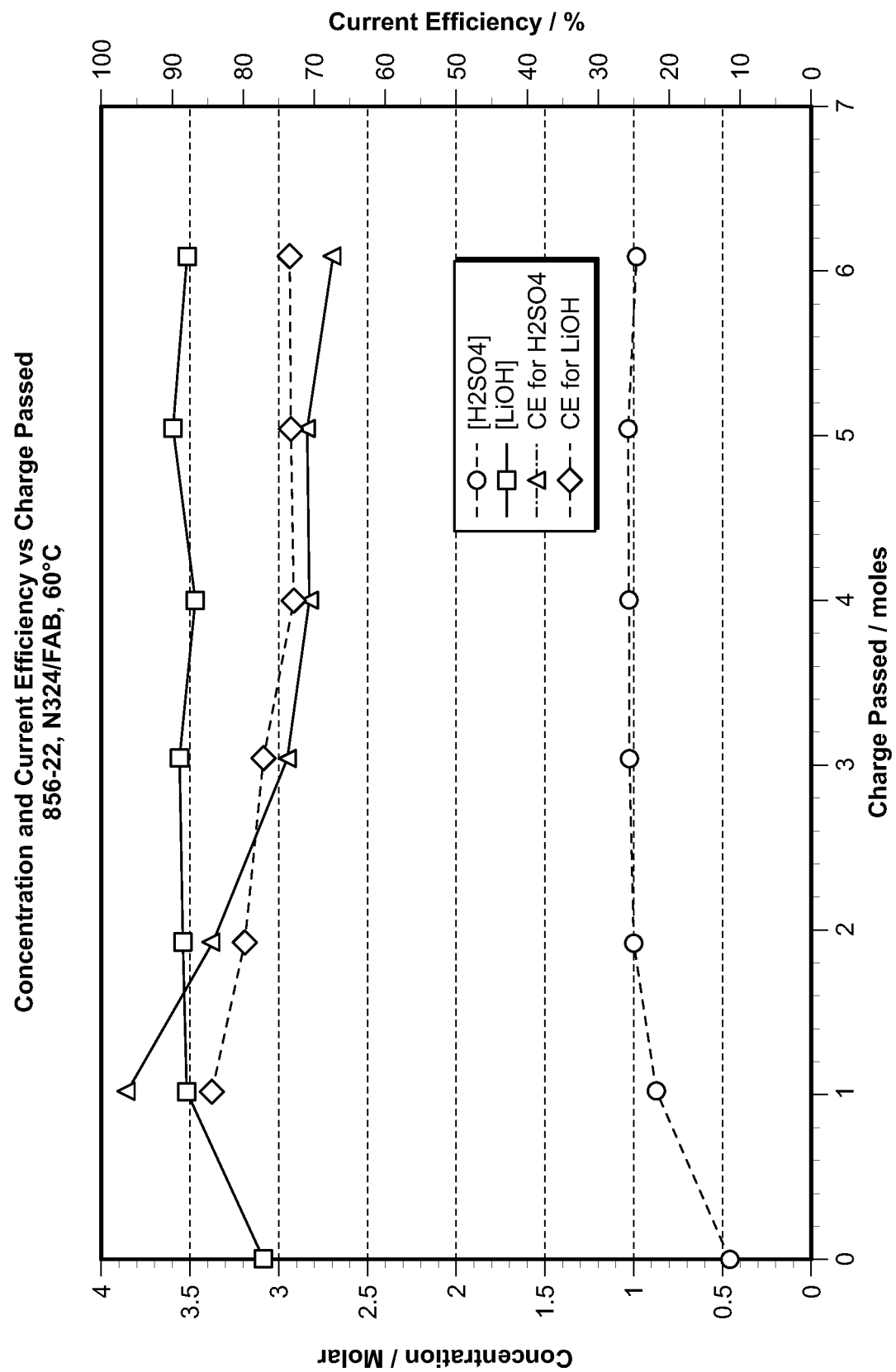
FIG. 20 is a plot showing current efficiency and concentration as a function of charge passed in another example of a process according to the present disclosure.

In the first experiment (#856-22), the acid strength was initially about 0.46 M and was allowed to rise to approx. 1 M before being held constant by the addition of dilution water. The initial lithium hydroxide strength was about 3.08 M and allowed to rise to approx. 3.5 M before being held constant; also by the addition of dilution water. A graph of the concentrations and the resultant current efficiencies is shown in FIG. 20.

The feed pH was preadjusted to about 4.0 and then held there. This initially required addition of acid (the FAB membrane was more efficient than the Nafion 324) but later required addition of lithium hydroxide (Nafion 324 became more efficient) as the acid strength increased about twofold and the proton backmigration into the feed compartment increased. The cell was run under the same constant voltage (about 6.8V at the cell) as the experiments with the Asahi AAV membrane. The overall acid current efficiency was measured at about 65% and the base current efficiency at about 70%.

Figure 21:
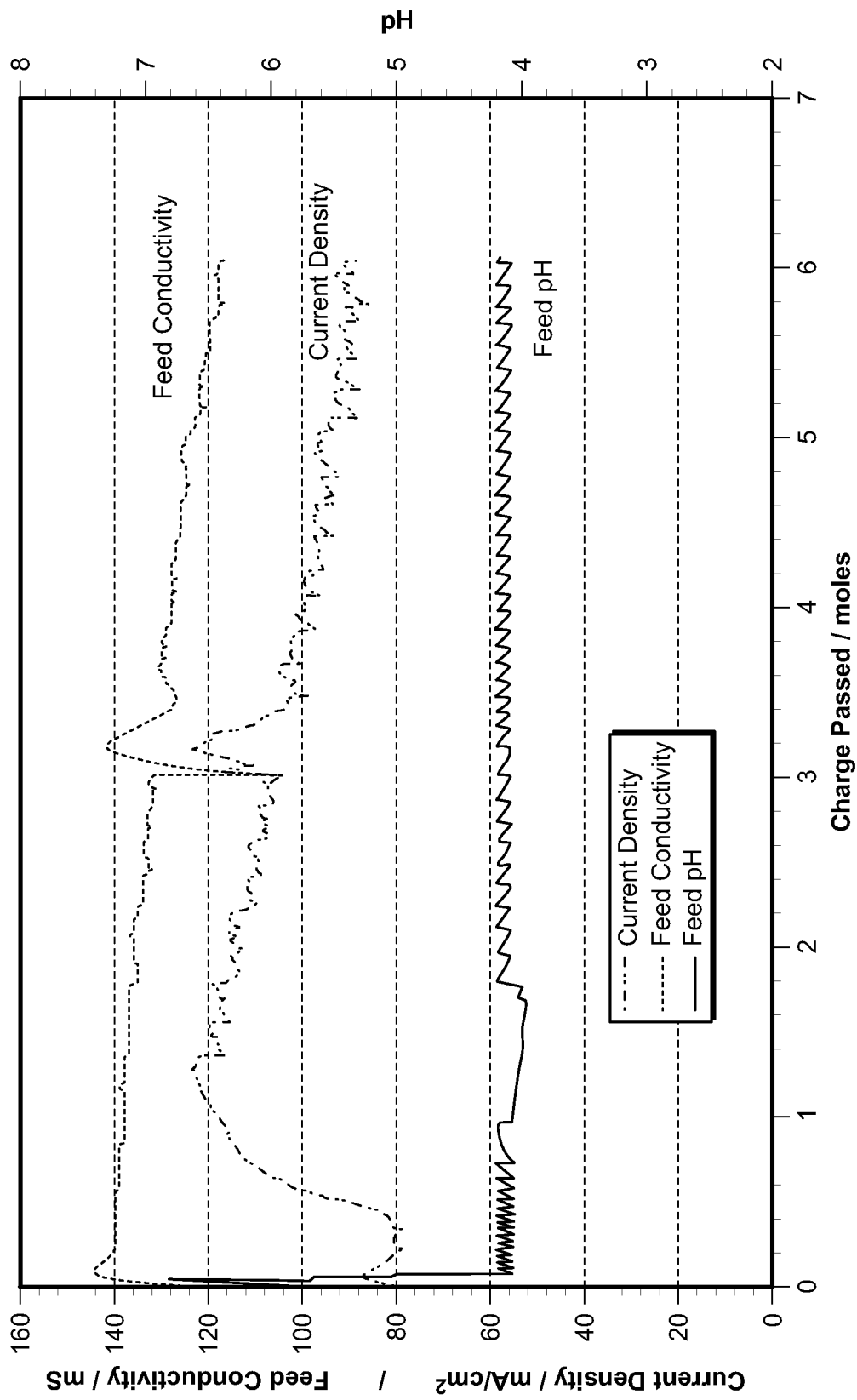
FIG. 21 is a plot showing current density, pH and conductivity profiles as a function of charge passed in another example of a process according to the present disclosure.

The average current density achieved was about 102 mA/cm$^2$. A graph of the profiles for current density, pH and conductivity is shown in FIG. 21.

A sudden increase in current density up to about 123 mA/cm$^2$ was observed during the first portion of the experiment, followed by a gradual decline over the rest of the experiment. While not wishing to be limited by theory, this increase is thought to be related to the increase in sulfuric acid strength during this time which helps to decrease the resistance of the FAB membrane. The conductivity of the FAB membrane can be dependent on its pH (for example, the FAB membrane can have a resistance of about 50 Ωcm$^2$ in about neutral sodium sulfate solution but it can decrease to about 16 Ωcm$^2$ in about 0.5 M sulfuric acid solution (both measurements at about 25° C.) which is a function of the two solutions that it divides i.e. it is a function of both the feed pH and the concentration of the acid. The peak of current density and conductivity occurring midway through the experiment was due to the solution temperatures exceeding the setpoint of about 60° C. at the start of the second day of the two day experiment before settling down.

The amount of lithium removal in this run was low at about 56%, which was due to the length of time required to treat a minimal volume of feed. The apparatus was modified so that it could be run continuously overnight which would allow larger volumes to be treated to completion. The next experiment was run in this manner and other modifications were made, for example to try to increase current density and efficiency. The acid and base concentrations were started at lower concentrations with the goal to run for the majority of the time at lower concentration with higher efficiency and then, by stopping water addition, allow the concentration of both to increase to the desired values. The other change made was to run the feed at a lower pH (pH about 3 or below) to try to decrease the resistance of the FAB membrane.

Figure 22:
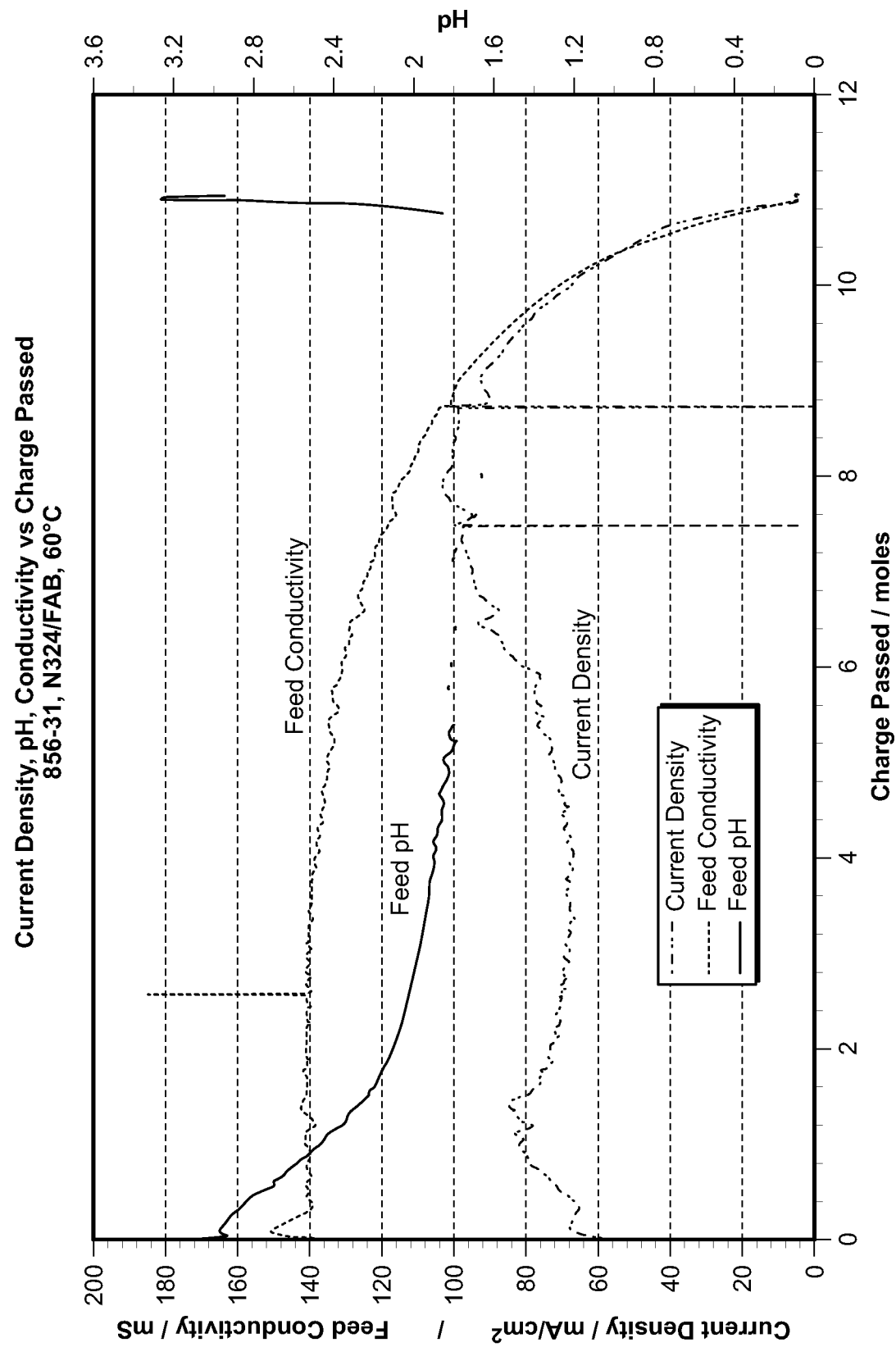
FIG. 22 is a plot showing current density, pH and conductivity profiles as a function of charge passed in another example of a process according to the present disclosure.

A significantly different and lower current density profile was observed as shown in FIG. 22. The lower acid and base concentrations would have a lower conductivity and would contribute to the lower current density but is not large enough to account for all of the decrease observed. While not wishing to be limited by theory, observations on disassembly of cells after later runs suggest that the main contribution may be fouling at the surface of the Nafion N324 membrane. This fouling seems to be carbonate formation at the membrane surface (on the feed side) and is likely formed during periods of time when the system is not running. Membranes removed later in the work had a small amount of white precipitate which was easily removed with acid (gas was formed). It is unclear if this formed when running the feed at higher pH or when the cell was drained and carbon dioxide from air was allowed to react at the surface of the membrane (with high pH). In either case, low current density was not seen to be a problem when the system was run at lower pH.

The current density improved considerably once the feed pH reached about 2 (setting on the pH meter did not allow logging of pH below about 2). The experiment was set to turn off during the night at an estimated amount of charge. However, since the efficiency of the process was slightly better than estimated, the cell continued to run and the feed was almost totally depleted (about 99.7% Li removal). Although about full depletion was possible, the current density plummeted. Full depletion can also be detrimental to the membrane as any impurities in the system are forced to transport through the membrane. The pH at the end of the experiment also increased dramatically, as the lithium/sodium concentration became comparable to the proton transport. At this point the concentration of sulfate was about 18 mM and was mostly present as bisulfate.

Figure 23:
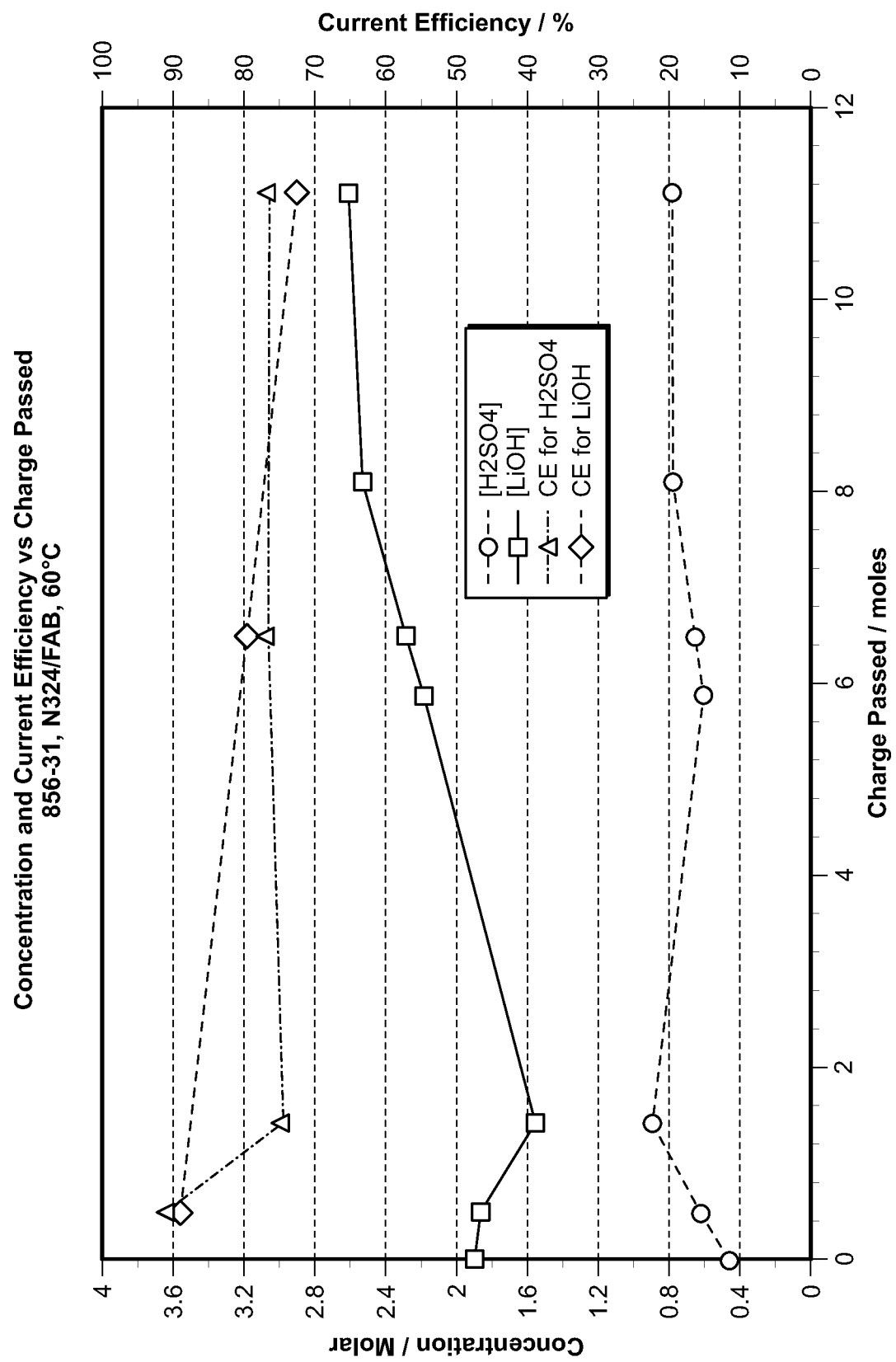
FIG. 23 is a plot showing current efficiency and concentration as a function of charge passed in another example of a process according to the present disclosure.

The final acid and base concentrations were lower than the previous run at about 0.8 M and about 2.6 M respectively. The lower concentrations produced higher overall current efficiencies at about 77% for acid production and about 73% for base production. The concentrations and current efficiency calculated over the course of the run are shown in FIG. 23.

The current efficiency for lithium hydroxide production is dependent primarily on its concentration and also on the pH of the feed solution. Higher concentrations of lithium hydroxide result in higher backmigration of hydroxyl species across the cation membrane and thus lower current efficiencies. Likewise, the lower the pH of the feed solution, the more protons are available to compete with lithium ion for transport into the catholyte compartment, also resulting in lower current efficiency. The lithium hydroxide concentration was also impacted by running the feed to completion. During the period of low current, lower current efficiency would have occurred, along with a large amount of osmotic water shift from the low concentration feed into the base. This effect is reflected in the relatively high rate of water transport measured of about 8.3 mol water per mol of lithium/sodium transported.

In addition, the pH of the feed compartment is also very dependent on the concentration of acid being produced. The higher the concentration of acid product, the more protons migrate across the anion membrane into the feed compartment, resulting in lower acid current efficiency as well as lower feed pH (which impacts the caustic current efficiency as discussed above).

Figure 24:
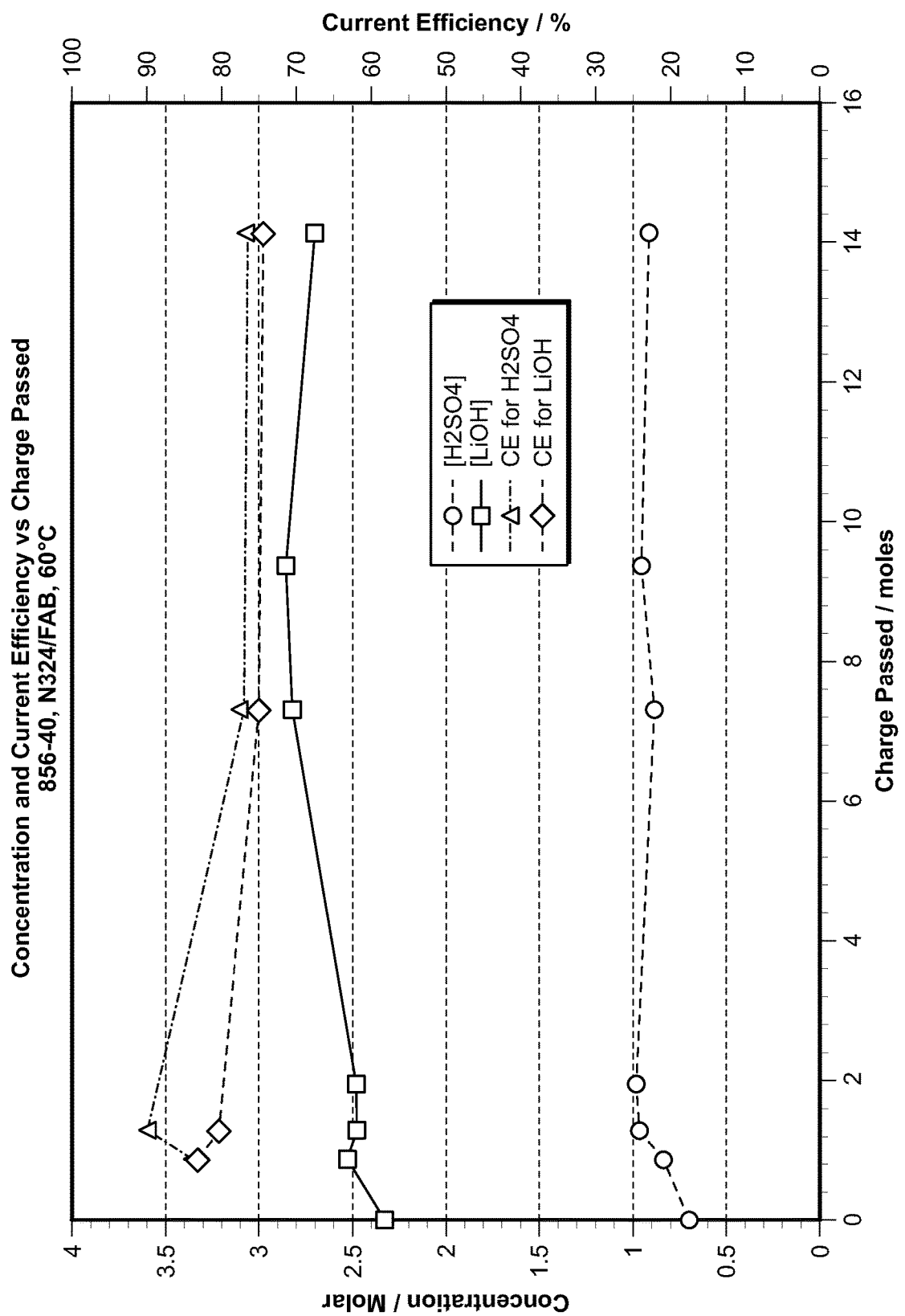
FIG. 24 is a plot showing current efficiency and concentration as a function of charge passed in another example of a process according to the present disclosure.

The cell was rebuilt with new membranes and a repeat of the previous experiment was performed except that higher start acid and base concentrations were used. FIG. 24 shows that the acid concentration was kept from about 0.9 to about 1.0 M throughout the experiment. The base started at about 2.4 M and was allowed to increase to almost about 3 M throughout the run. Current efficiencies for acid and base production were about 77% and about 75% respectively.

Figure 25:
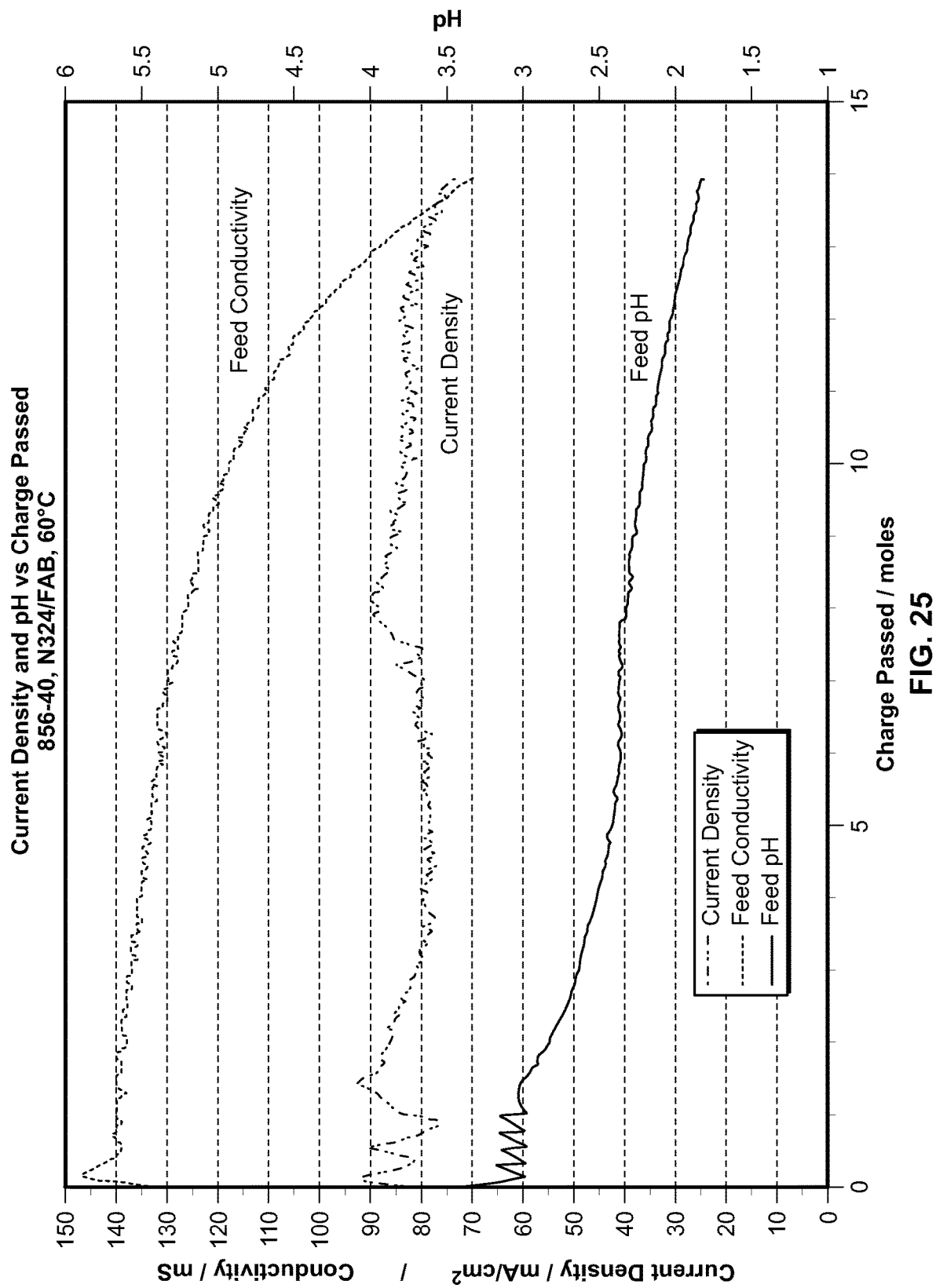
FIG. 25 is a plot showing current density, pH and conductivity profiles as a function of charge passed in another example of a process according to the present disclosure.
Figure 26:
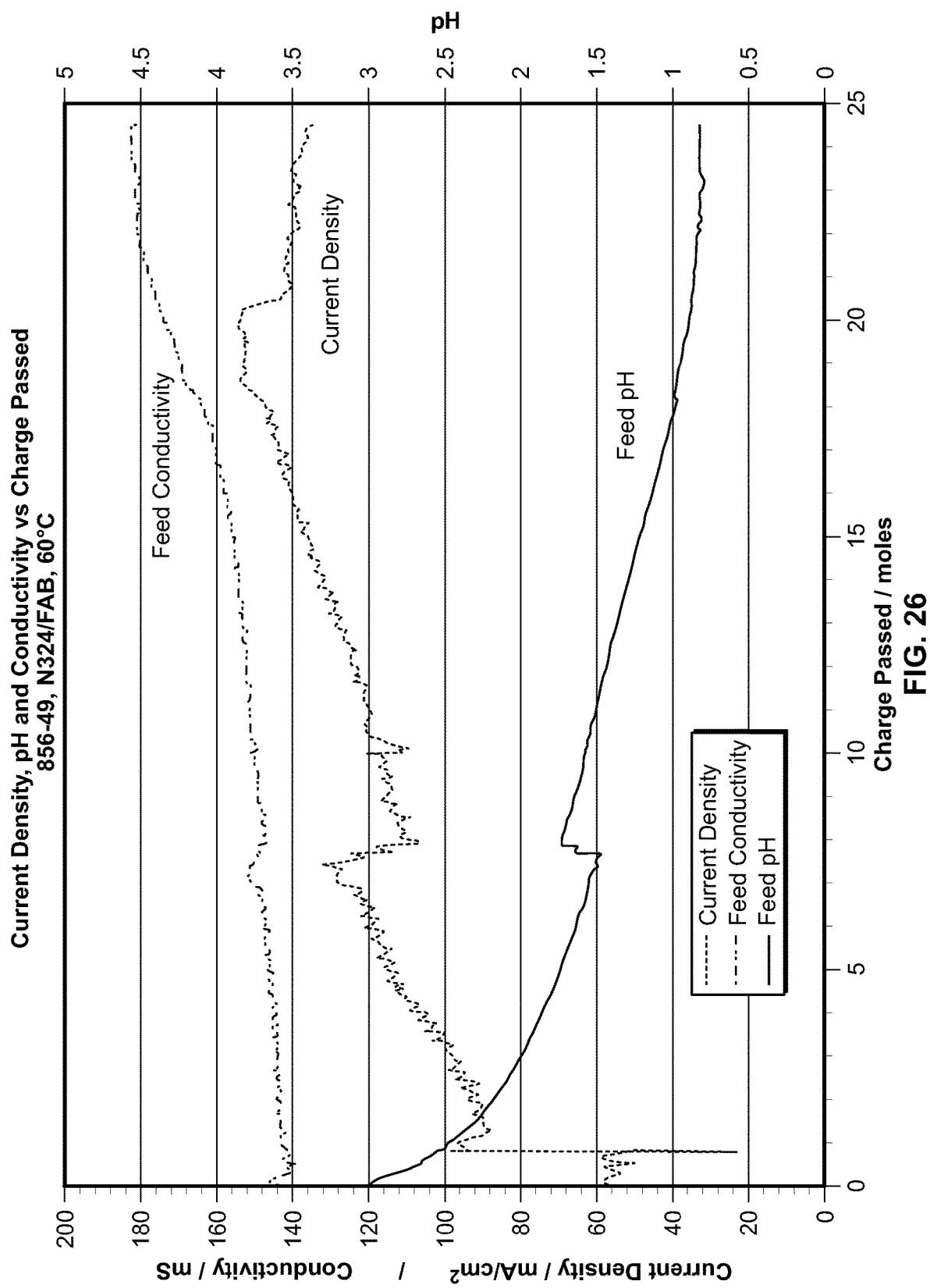
FIG. 26 is a plot showing current density, pH and conductivity profiles as a function of charge passed in another example of a process according to the present disclosure.
Figure 27:
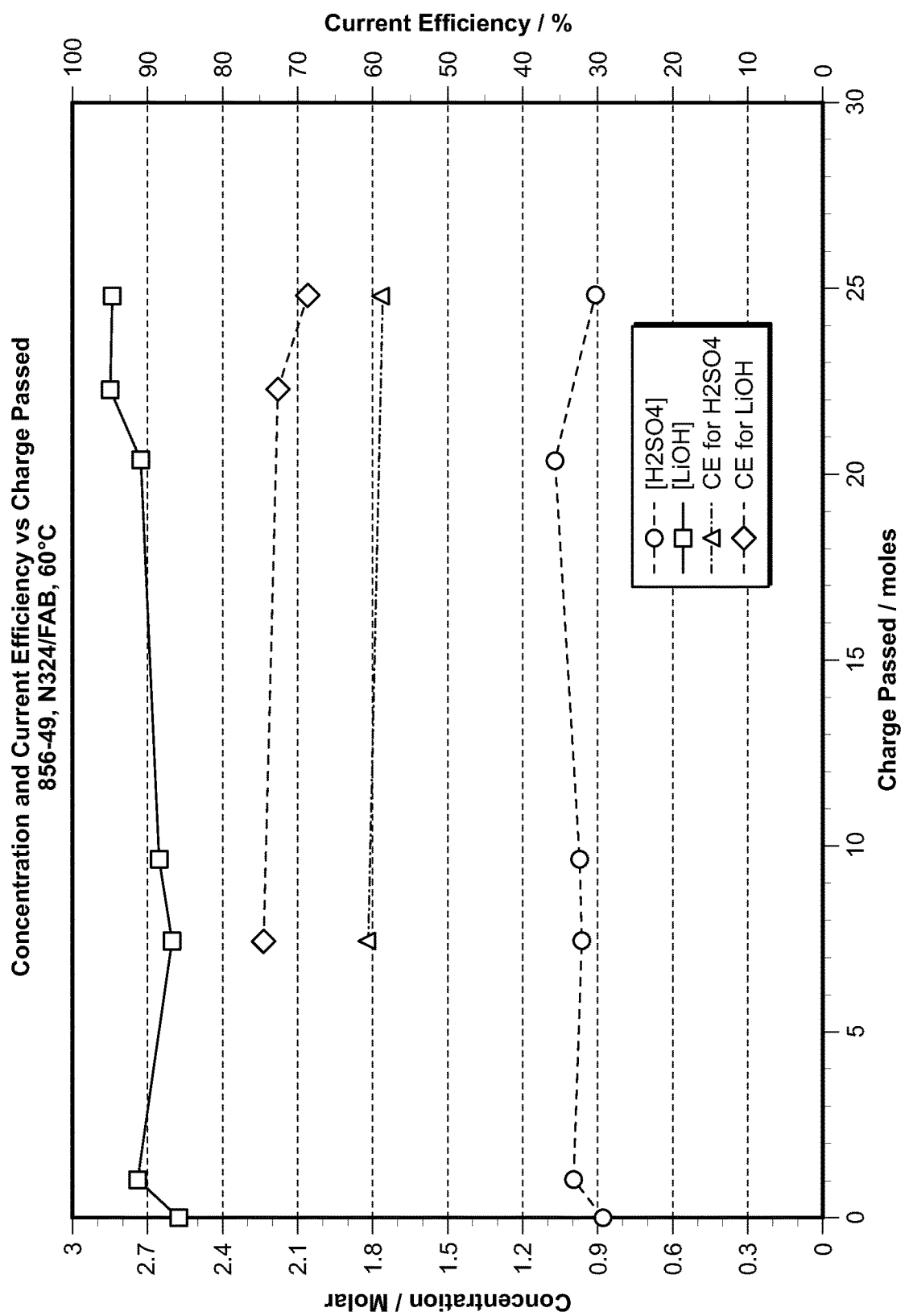
FIG. 27 is a plot showing current efficiency and concentration as a function of charge passed in another example of a process according to the present disclosure.
Figure 28:
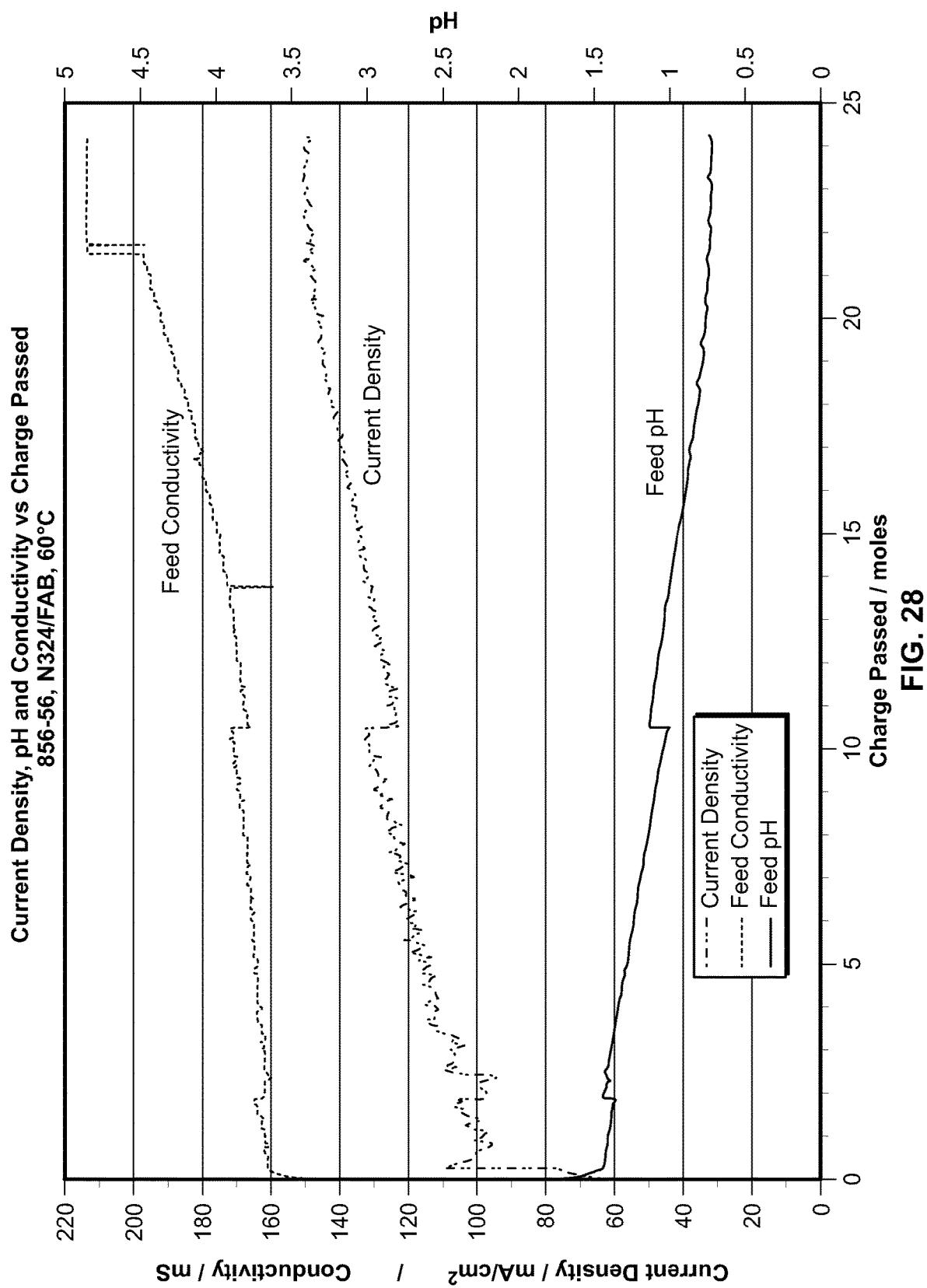
FIG. 28 is a plot showing current density, pH and conductivity profiles as a function of charge passed in another example of a process according to the present disclosure.
Figure 29:
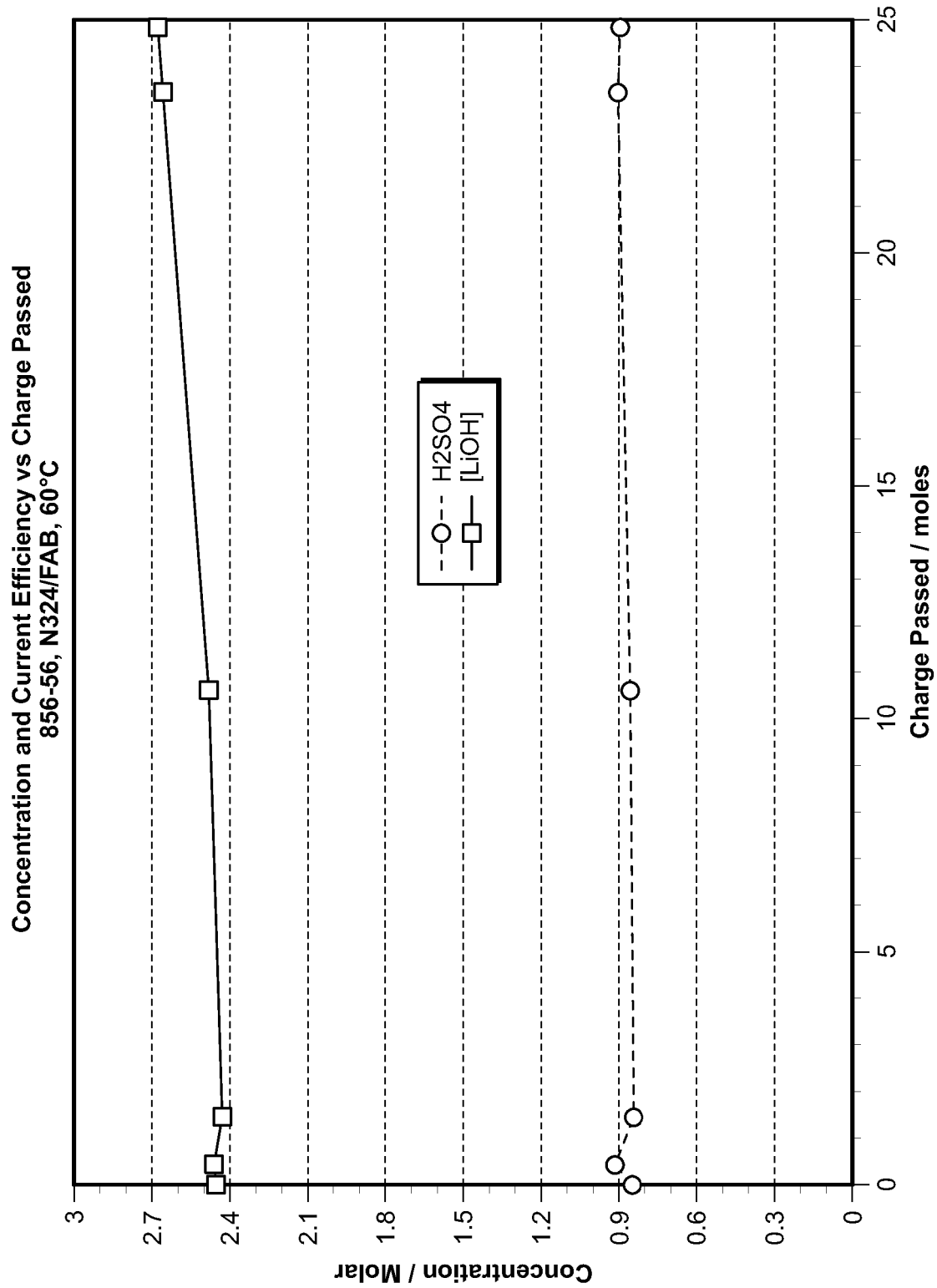
FIG. 29 is a plot showing concentration as a function of charge passed in another example of a process according to the present disclosure.
Figure 30:
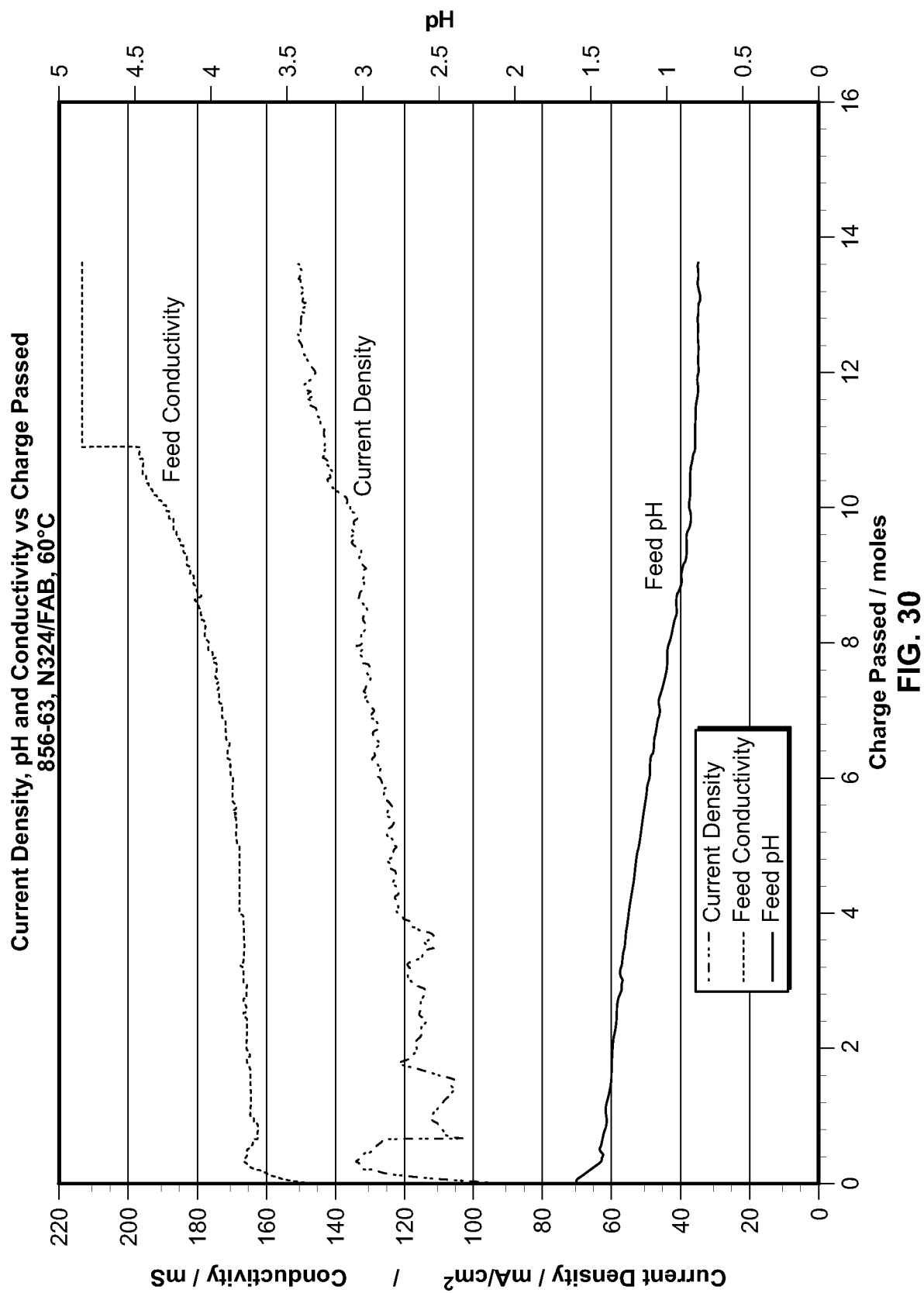
FIG. 30 is a plot showing current density, pH and conductivity profiles as a function of charge passed in another example of a process according to the present disclosure.
Figure 31:
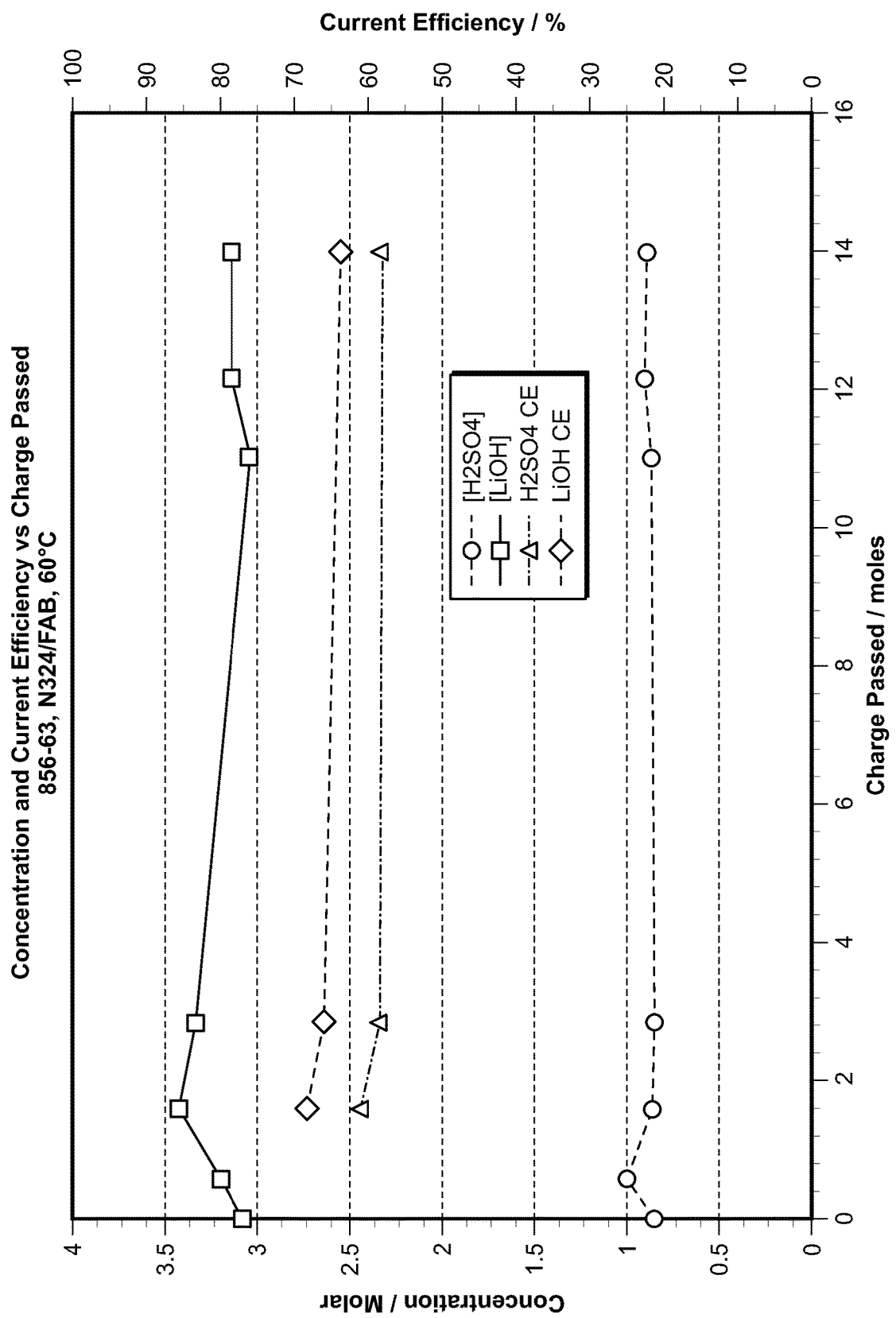
FIG. 31 is a plot showing current efficiency and concentration as a function of charge passed in another example of a process according to the present disclosure.

FIG. 25 shows that the current density for this run was still relatively low compared to the first run (856-22). It was more similar to the second run (856-34), but since this run was stopped earlier than 856-34, (at about 91% lithium removal instead of about 99.7%), the average current density was considerably higher at about 83 mA/cm$^2$.

The end pH of the solution was about 1.8 due to the amount of proton back migration. At this pH, about 60% of the sulfate is in solution as bisulfate with only about 0.015 M protons in solution.

N324/FAB Runs with Lower Feed pH (Production Runs)

The final set of three experiments was used to generate product for use in crystallization studies. The summary of the tests is shown in Table 15. Larger volumes were used and an attempt was made to increase the current density of previous runs by running the system at constant acid concentration and lower feed pH. By running at lower feed pH, there was not any problem with membrane fouling between runs as was seen when running the feed at the higher pH (>about 3). However, both the acid and base current efficiencies suffered. The other difference in these runs was that additional voltage was applied to the cell: about 7.8 V instead of about 6.8 V. This change was made early during 856-49, resulting in an increase in current density from about 55 mA/cm$^2$ to about 95 mA/cm$^2$. The higher voltage numbers will be used in determining power consumption details.

TABLE 15

Summary of Production Runs with FAB.

| Experiment# | 856-49 | 856-56 | 856-63 |
|---|---|---|---|
| Membranes | NAF324/FAB | NAF324/FAB | NAF324/FAB |
| Temperature ° C. | 60 | 60 | 60 |
| Mode | Constant 7.8 V | Constant 7.8 V | Constant 7.8 V |
| Charge Passed (moles e/% theory Li) | 24.8/125.9 | 24.8/124.6 | 14.0/146.4 |
| Time (hr) | 55.2 | 51.56 | 28.5 |
| Avg CD (mA/cm$^2$) | 120.5 | 129 | 131.7 |
| Init [H$_2$SO$_4$] (molar) | 0.879 | 0.848 | 0.855 |
| Final [H$_2$SO$_4$] (molar) | 0.910 | 0.895 | 0.888 |
| Acid CE | 58.9 | 58.9 | 58.4 |
| Acid water transport (mol/mol SO$_4$) | 0.65 | −0.59 | 0.2 |
| [Li] and [Na] in initial acid (mMolar) | 0/1* | 0/0* | 0/0* |
| [Li] and [Na]* in final acid (mMolar) | 0/2* | 0/0* | 0/0* |
| Init Base [Li]/[Na]/[OH] (molar) | 2.57/0.14/2.57 | 2.55/0.13/2.45 | 3.04/0.14/3.08 |
| Final Base [Li]/[Na]/[OH] (molar) | 2.93/0.16/2.84 | 2.82/0.15/2.68 | 3.09/0.15/3.14 |
| Base CE | 68.6 | 65.5 | 63.7 |
| Base water transport (mol/mol Li + Na | 7.7 | 8.0 | 8.2 |
| [SO$_4$] in base initial/final (mMolar) | 1.9/2.0 | 1.5/2.0 | 1.5/2.3 |
| Init Feed [Li]/[Na]/[SO$_4$] (molar) | 3.24/0.17/1.71 | 3.27/0.17/1.78 | 3.11/0.13/1.87 |

TABLE 15-continued

Summary of Production Runs with FAB.

| Experiment# | 856-49 | 856-56 | 856-63 |
|---|---|---|---|
| Final Feed [Li]/[Na]/[OH] (molar) | 1.03/0.03/1.07 | 1.20/0.04/1.32 | 1.01/0.02/1.18 |
| % Li Removal | 85.4 | 81.6 | 84.4 |
| Feed pH | No pH control 3 down to 0.8 | Acid added initially to maintain 1.5, then pH went down to 0.73 | Acid added initially to maintain 1.5, then pH went down to 0.79 |
| Li mass balance % | 104 | 104 | 105 |
| SO4 mass balance % | 103 | 102 | 104 |

*Corrected for Na added by KOH used for neutralization of sample prior to IC analysis.

Graphs showing concentrations and current efficiencies are shown in FIGS. 26 to 31. Starting the system at a lower pH and allowing the feed pH to decrease was detrimental to the current efficiency of the process. The feed pH can be better controlled in a commercial plant situation than in these laboratory experiments. In the longer term runs, sulfuric acid was added to the feed to bring its pH from about 10 down to about 3 before the start of the experiment. This was done for the complete volume of feed, and then the feed pH continued to decrease in operation. However, in a plant, a smaller heal of feed solution could be acidified and more feed at pH about 10 can be added as the experiment continues. Similar benefits occur if the process is run continuously instead of in batch mode. It is estimated from these experiments that over half of the acid in the feed at the end of the experiment was due to acid pretreatment. By adding the feed continuously, the proton concentration can be decreased from about 0.15 M to about 0.075M which would increase the measured current efficiencies.

Although small changes were made in the last three runs to increase the achievable current density, the results obtained were very consistent and reproducible. Slight changes in the base current efficiency and water transport are due to changes in feed pH. During the testing about 25 L of lithium hydroxide and about 45 L of sulfuric acid was produced.

III. Conclusions

It has been shown that lithium hydroxide can be successfully recovered at high efficiencies from a lithium sulfate process stream at temperatures of about 40° C. or about 60° C., using electrolysis with Nafion 324 cation exchange membrane and either Asahi AAV or Fumatech FAB anion exchange membranes. Both anion membranes were efficient at acid production, but the FAB membrane allowed higher acid concentrations at similar current efficiencies. The FAB membrane can also be run at higher temperatures (about 60° C.) which therefore, for example may decrease the amount of required cooling. Based on these considerations, the following process was defined using a combination of N324 and FAB.

Process Using N324/FAB Membranes

Based on the testing performed, the process would be expected to have the following characteristics:
  Sulfuric acid produced at a concentration of about 0.75 M
  Lithium Hydroxide produced at a concentration of about 3.2 M
  Average Current Density of about 100 mA/cm$^2$
  Current efficiency of about 75%
  Cell Voltage of about 6 V (see below for calculations)
  Water transport from feed to base of about 8 mol water per mol cation
  Water transport from feed to acid of <about 1 mol water per mol cation.

The cell voltage for the process in the MP cell was about 7.8 V. However, the lab cell has very large flow gaps between electrode and membranes (about 10 mm) which would be substantially reduced in the larger plant cell. The gap can typically be reduced to about 2 mm which will remove about 1.8 V from the total cell voltage (based on acid, base and feed conductivities of about 275 mS/cm, about 400 mS/cm and about 70 mS/cm, respectively). Using this reduced cell voltage and predicted current efficiency, the process would require a power consumption of about 8.9 kWh/kg of LiOH. (in an about 3.2 M solution). For a plant producing about 3 tonne/hour of LiOH, the plant would contain about 4500 m$^2$ of cell area, which would be a large electrochemical plant comparable to a moderate sized chlor-alkali plant. Other than when running at higher pH, there were no stability issues found for the membranes or electrodes.

SUMMARY

It has been shown in the studies of the present disclosure that lithium hydroxide can be successfully recovered at high efficiencies from a lithium sulfate process stream at temperatures of about 40° C. or about 60° C., using electrolysis with a Nafion 324 cation exchange membrane and either an Asahi AAV or a Fumatech FAB anion exchange membrane. In both cases, sulfuric acid was produced as the coproduct.

The Nafion 324 membrane was used in both electrolysis configurations tested. The cation membrane had very good efficiency for lithium production, making up to about 3.6 M hydroxide at a current efficiency of over about 70%. A higher efficiency at a lower concentration was shown to be possible, but the inefficiency of the anion membranes limits this need. While not wishing to be limited by theory, a lower acid efficiency effectively decreases the pH of the feed solution, resulting in either the use of some of the produced lithium hydroxide to maintain the pH or the competition of proton with lithium/sodium across the cation membrane. This effectively makes the efficiency of the process equal to the lowest efficiency of the two membranes.

The lithium sulfate feed contains a large concentration of sodium ion. The cation membrane is not selective and therefore the produced base contains sodium ion in roughly the same ratio as that found in the feed. The base also contained about 2 mM (about 200 ppm) of sulfate.

It was possible to obtain similar current densities of about 100 mA/cm$^2$ incorporating both Asahi AAV (at about 40° C.) and Fumatech FAB membrane (at about 60° C.). However, the AAV membrane gave current efficiencies of less than about 65% when the acid concentration was above about 0.5 M. The FAB acid efficiency was more dependent on acid concentration, giving about 75% current efficiency at about 0.9 M acid concentration. The acid efficiency dropped considerably above this value.

The current densities achieved when using the FAB membrane were very dependent on the pH of the feed solution (due to its higher resistance at higher pH). It was necessary to maintain a lower feed pH in order to achieve similar current densities to those with AAV membrane. This was done either by increasing the strength of the acid produced and thus also the backmigration of protons across the anion membrane into the feed compartment, or by running at a lower feed pH. Both conditions were found to result in a lower current efficiency for acid production as well as for production of lithium hydroxide by increasing the proton/Li ratio in the feed and thus also proton competition into the catholyte compartment.

Based on the testing performed in the studies of the present disclosure, the process would be expected to have the following characteristics:

Sulfuric acid produced at a concentration of about 0.75 M

Lithium hydroxide produced at a concentration of about 3.2 M

Average current density of about 100 mA/cm$^2$

Current efficiency of about 75%

Cell voltage of about 6 V (in an engineered cell for the process)

Water transport from feed to base of about 8 mol water per mol cation

Water transport from feed to acid of <about 1 mol water per mol cation.

Although the above-described process shows promise, an alternate process where ammonium sulfate is produced instead of sulfuric acid may also be employed and details of that process along with at least some of its benefits are given below in Example 3.

EXAMPLE 3

Alternate Process Using Ammonia to Neutralize Acid.

The current work has been successful at producing higher strength base and acid with higher current efficiency than both bipolar membrane electrodialysis (ED) and other development work previously carried out. However, the anion membrane that was used for this process is a proton-blocking membrane which has a high resistance especially for sulfate transport and has limited the current density achieved. These membranes can be limited to about 60° C.

Figure 32:
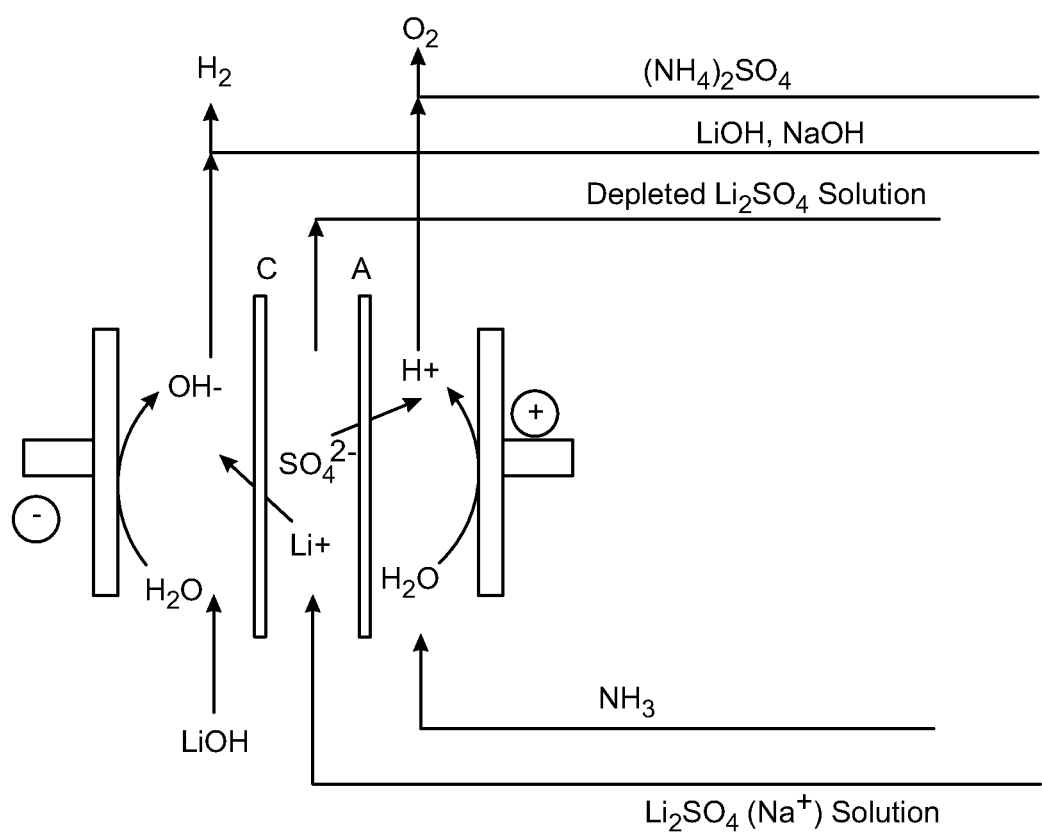
FIG. 32 is a schematic representation of an example of a membrane electrolysis cell that can be used for carrying out another example of a process according to the present disclosure.

To resolve at least some of the above-mentioned difficulties, a high concentration of ammonium sulfate (>about 2 M) can be produced in a similar electrolysis cell, and due to the buffering capacity of bisulfate and the ability to dissolve ammonia in solution, it is possible to make the anolyte solution non-acidic as shown in FIG. 32. In this way, proton blocking membranes, for example may not be required and alternative membranes, for example Neosepta AHA, which are capable of running at about 80° C. and that should have lower resistance can be used.

This will, for example allow operation at higher temperature requiring less cooling of solutions. Solutions and membranes are also less resistive at these higher temperatures, decreasing power consumption. It may also, for example remove the higher resistance FAB membrane, possibly allowing operation at either higher current density (thereby reducing membrane area), lower voltage (thereby reducing power consumption) or a combination of the two. It may also, for example generate an alternate commercial material. Ammonium sulfate can be sold as an ingredient for fertilizer and should have a higher value than the sulfuric acid. It is also, for example expected to remove more water during the electrolysis from the feed thereby allowing more efficient operation over a wider range of feed conversion.

EXAMPLE 4

Production of Lithium Hydroxide from Lithium Sulfate Using Three-Compartment Bipolar Membrane Eletrodialysis A base solution at a concentration of 2 N containing 78% of Li$^+$ can be produced from a Li$_2$SO$_4$ salt containing 83% of Li$^+$, using a three-compartment Bipolar Membrane Electrodialysis (EDBM) stack. Practically, the corresponding maximum concentration of the sulfuric acid produced is 1.5 N.

I. Introduction

The present studies investigated the splitting of lithium sulfate to produce lithium hydroxide and sulfuric acid using a three-compartment Bipolar Membrane Electrodialysis stack.

Figure 33:
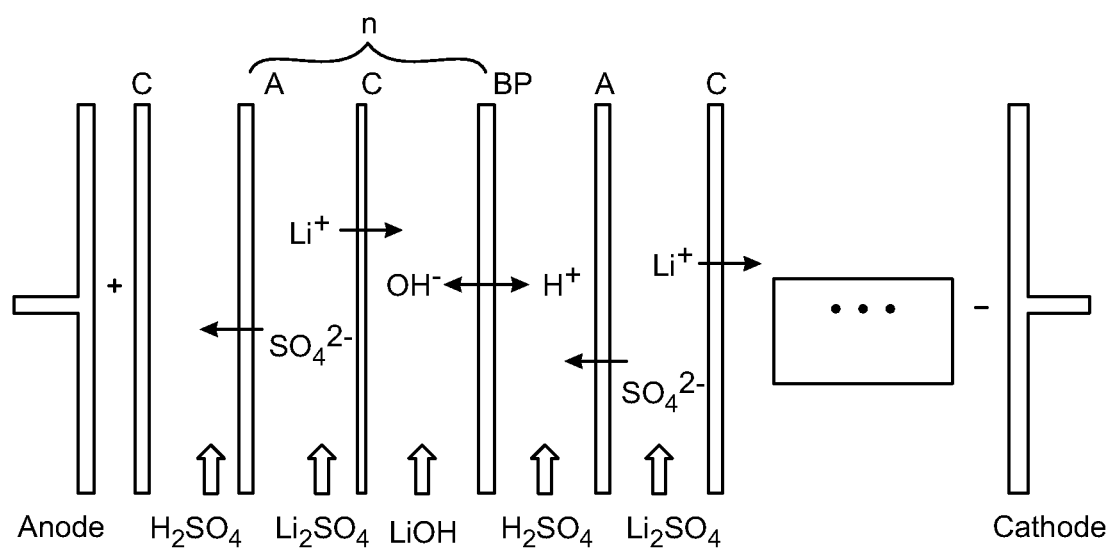
FIG. 33 is a schematic representation of an example of a configuration of a three compartment Bipolar Membrane Electrodialysis (EDBM) stack that can be used for carrying out another example of a process according to the present disclosure.

The technology used to achieve the conversion of lithium sulfate into its acid and base, is the three compartment EDBM stack shown in FIG. 33. The system has 3 compartments: one for the salt stream (Li$_2$SO$_4$); one for the base recovery (LiOH); and one for the acid recovery (H$_2$SO$_4$)

When an electric field is applied to the system, the cations (here Li$^+$, Na$^+$, K$^+$ and Ca$^{2+}$) can migrate from the salt, through the cation membrane (C), into the base loop. The anions (SO$_4^{2-}$) can migrate through the anionic membrane (A) into the acid loop. The bipolar membrane (BP) can act as a H$^+$ and OH$^-$ generator by splitting the water molecules during the process. The reaction of the H$^+$ and OH$^-$ with the ions moving from the salt into their respective compartments allows the formation of the acidic and basic solutions.

II. Materials and Methods

The lithium sulfate used in the present studies had the following characteristics detailed in Table 16:

TABLE 16

| Chemical characteristics at room temperature of $Li_2SO_4$ | |
| --- | --- |
| pH | 10.83 |
| Conductivity (mS/cm) | 86.2 |
| $Li^+$ (g/L) | 23.4 |
| $Na^+$ (g/L) | 4.46 |
| $K^+$ (g/L) | 0.13 |
| $Ca^{2+}$ (g/L) | 0.003 |

Lithium represented 83% of the feed total cations content. All of the other ions present in the solution migrated according to their initial proportions in the salt stream.

The EUR2 stack used for the experiments was composed of seven three-compartment cells. The salt solution was at room temperature and a flow rate of 190 Uh (0.8 GPM) was used for the trials. The feed was acidified to pH 1-2 with sulfuric acid, which is a useful pH for the anionic membrane.

Eight trials were conducted according to the parameters shown in Table 17 below. The 4th trial has been divided in 3 smaller trials (system stopped, volume measured and samples taken) to evaluate the effect of the acid and base concentrations on the current efficiency. For the purpose of this work, the results obtained for Trials 4, 5, 6 and 8 were compared. Trials 5, 6 and 8 are triplicates that have been done with the same initial conditions to investigate the repeatability of the results.

TABLE 17

| | Trials parameters | | | | |
| --- | --- | --- | --- | --- | --- |
| | Acid | | Base | | Salt |
| Trial No. | Volume (L) | Concentration (N) | Volume (L) | Concentration (N) | Volume (L) |
| 1 | 4 | 0.263 | 4 | 0.148 | 4 |
| 2 | 3 | 0.91 | 3 | 0.93 | 5 |
| 3 | 3 | 0.56 | 3 | 0.65 | 3.4 |
| 4.1 | 2 | 0.225 | 2 | 0.23 | 5 |
| 4.2 | 2 | 1.073 | 2 | 1.16 | 4.5 |
| 4.3 | 1.9 | 2.055 | 2.2 | 2.03 | 4 |
| 5 | 2 | 0.1 | 2 | 0.875 | 3.9 |
| 6 | 2.5 | 0.76 | 2.1 | 1.08 | 3.9 |
| 7 | 2.5 | 0.705 | 2 | 1.08 | 4.1 |
| 8 | 2 | 0.67 | 2 | 0.805 | 4.1 |

During the eight trials, no significant increase of the voltage or the resistance of the system was observed. While not wishing to be limited by theory, this indicates that the product is usefully clean and does not appear to have significantly affected the membranes under the conditions and for the amount of time used to complete the trials for this study.

Figure 34:
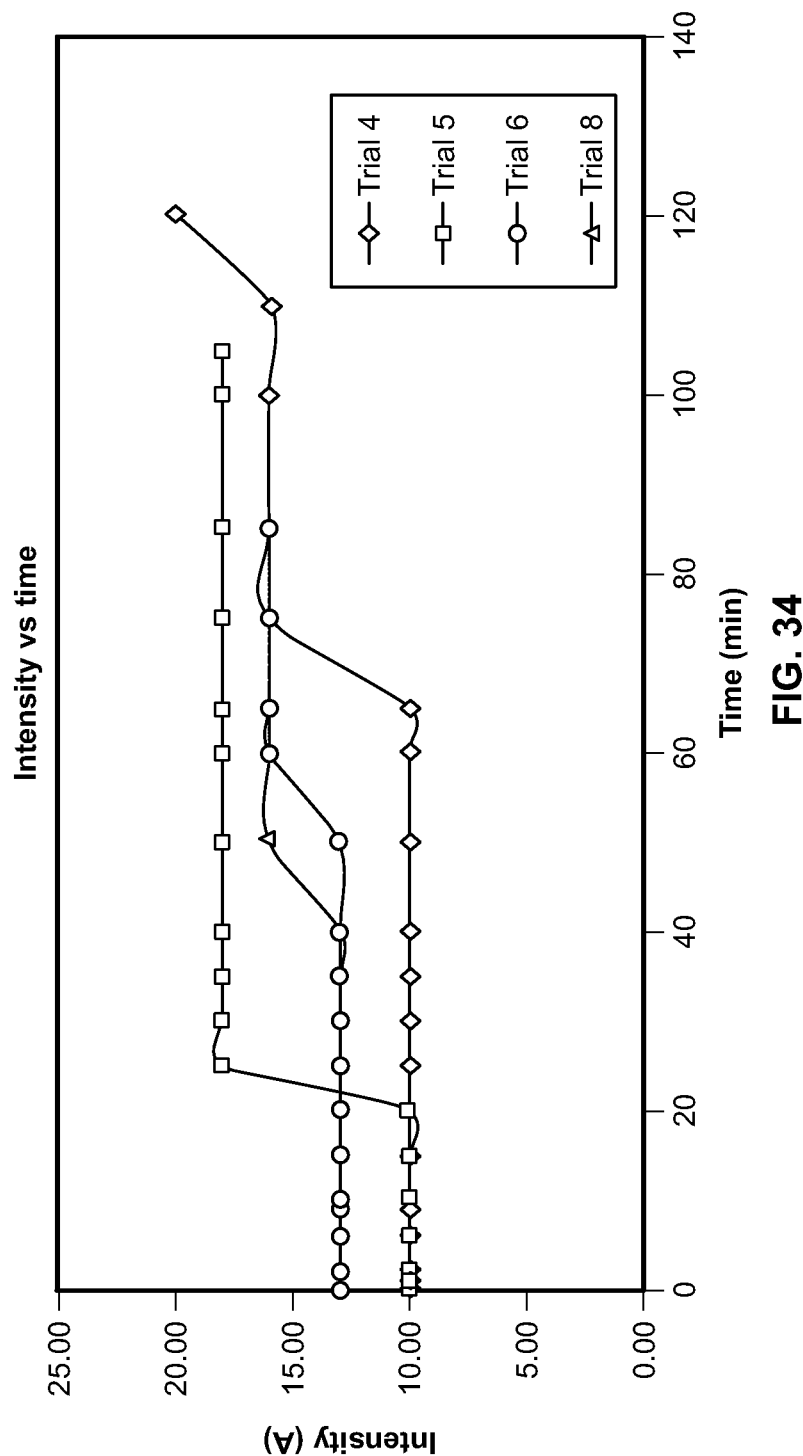
FIG. 34 is a plot showing current intensity (A) as a function of time (minutes) in another example of a process according to the present disclosure.
Figure 35:
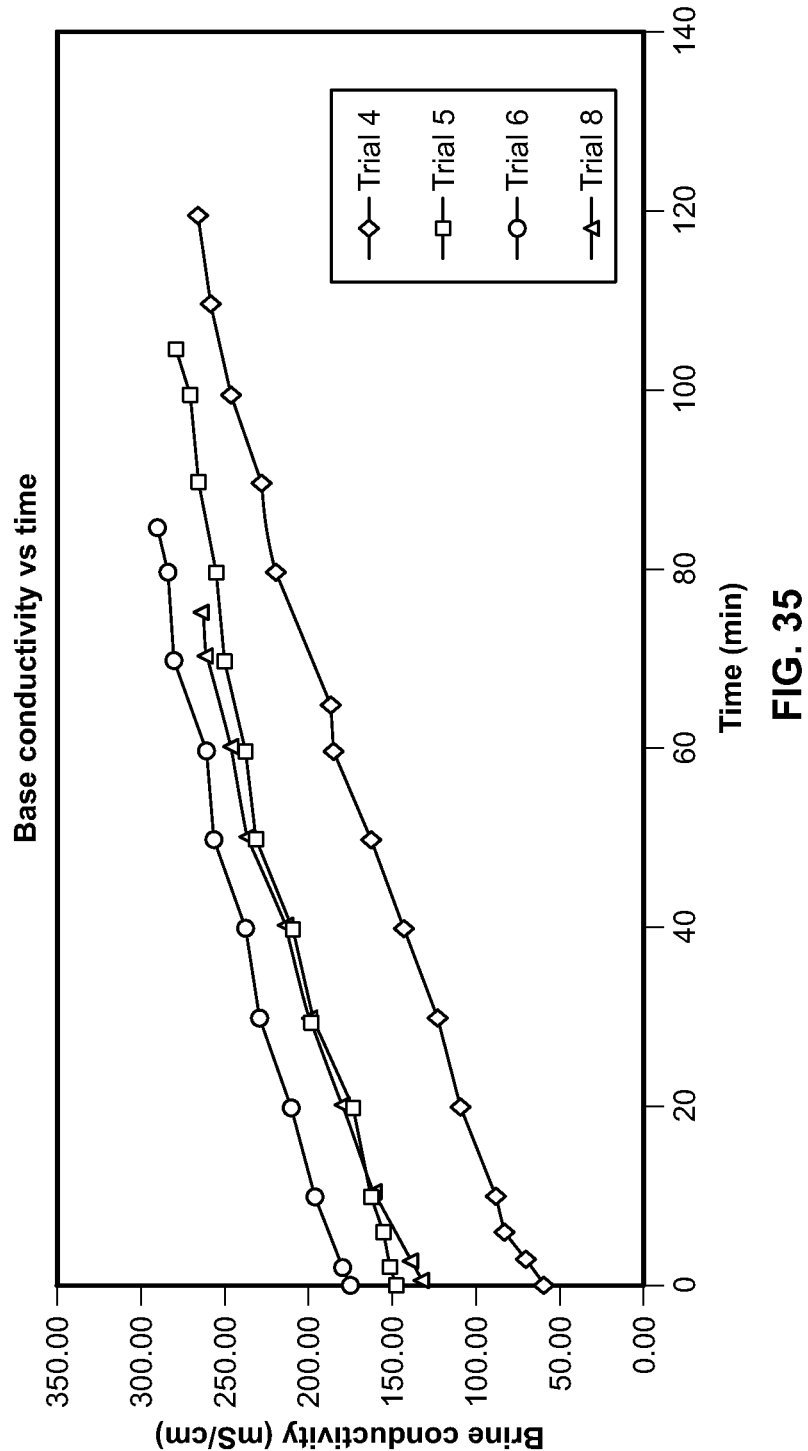
FIG. 35 is a plot showing base conductivity (mS/cm) as a function of time (minutes) in another example of a process according to the present disclosure.
Figure 36:
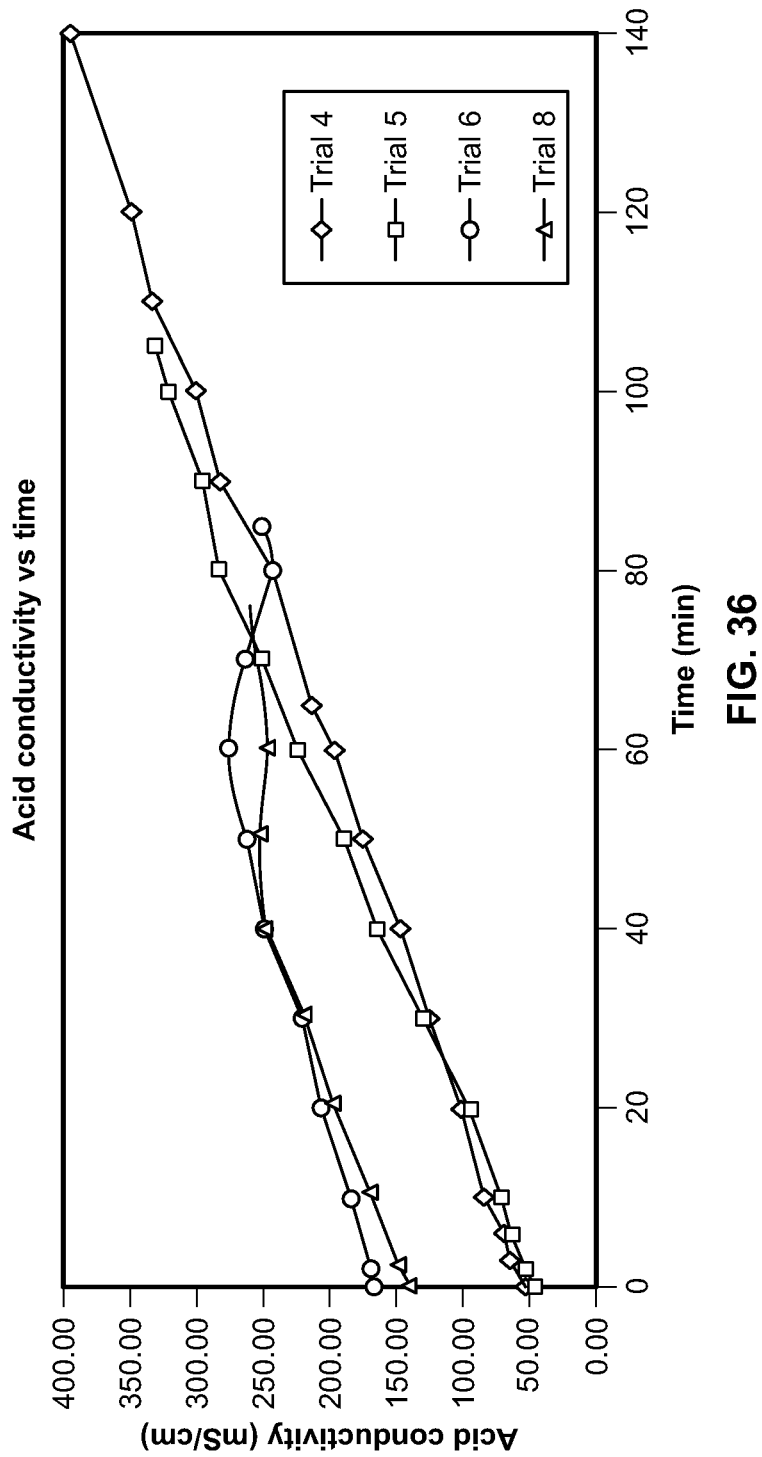
FIG. 36 is a plot showing acid conductivity (mS/cm) as a function of time (minutes) in another example of a process according to the present disclosure.

FIG. 34 shows the evolution of current over time for Trials 4, 5, 6 and 8. FIG. 35 shows the increase of the base conductivity as a function of time. The increase rate is similar for all the trials. FIG. 36 shows the increase of the acid conductivity as a function of time.

Figure 37:
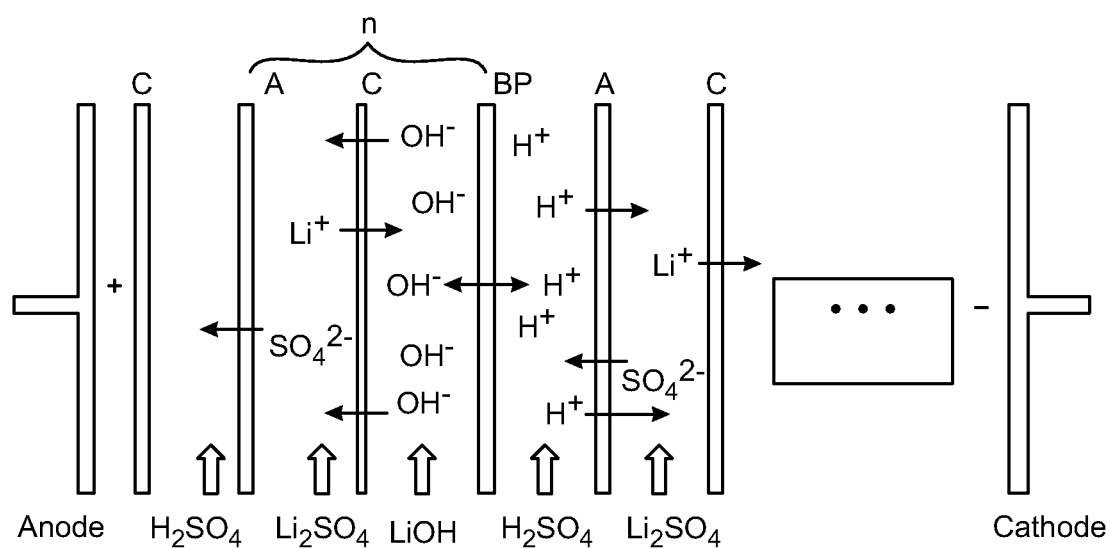
FIG. 37 is a schematic showing the loss of efficiency when the acid and base loops reach a high concentration in another example of a process according to the present disclosure.

During Trials 6 and 8, water was added to the acid tank to maintain a concentration below about 1.5N. At higher concentrations, the acid concentration negatively influences the overall current efficiency because the acid current efficiency becomes much lower than the base efficiency. While not wishing to be limited by theory, this is due to the anionic membrane allowing the $H^+$ ions to transport when their concentration becomes too high (see FIG. 37).

Figure 38:
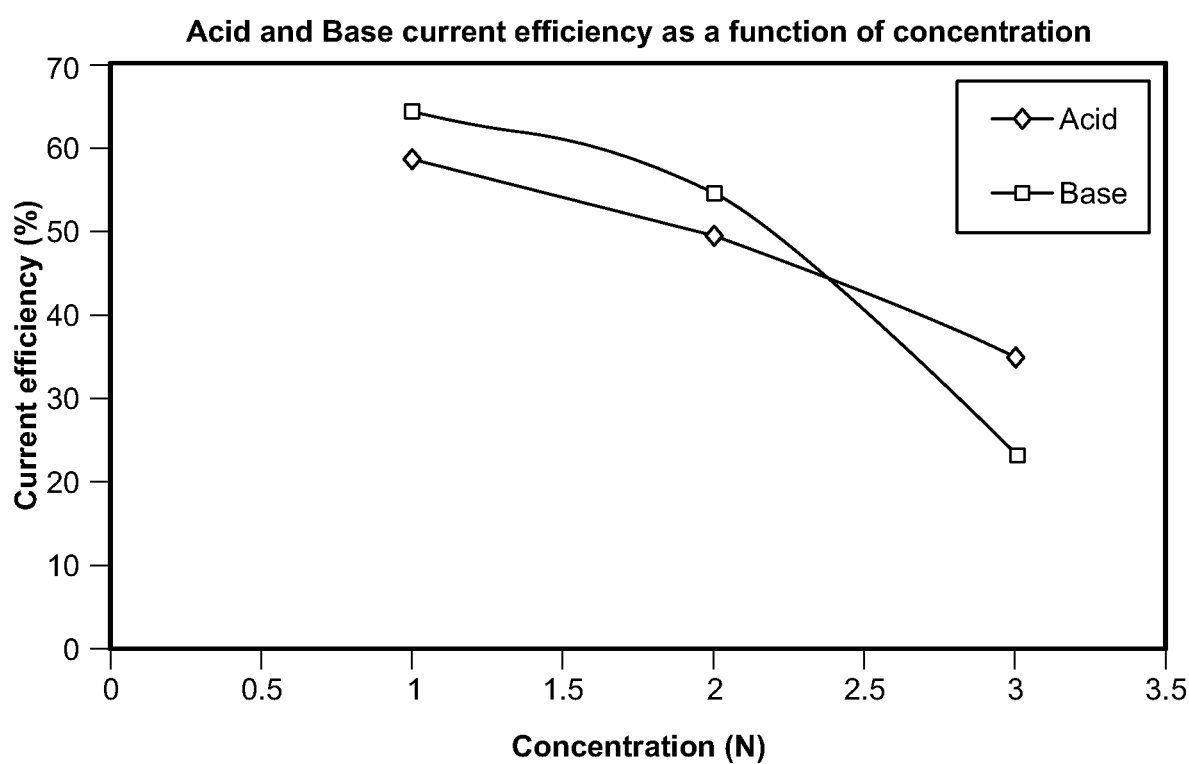
FIG. 38 is a plot showing acid and base current efficiency as a function of the concentration in another example of a process according to the present disclosure.

The impact of producing a highly concentrated base or acid has been studied during Trial 4. This trial was separated into three sub-trials for which initial and final samples have been collected. The same solutions of acid, base and salt were used to increase their concentration as much as possible. FIG. 38 shows the decrease of the current efficiency observed for Trial 4 function of the concentration of the acid and the base.

Table 18 shows the different parameters obtained for each trial, as well as the current efficiency. The current efficiency decreased by more than 20% during Trials 4; from about 60% to 36% as the concentration increased from 1.1N to 2.6N for the acid and from 1.2 to 2.4N for the base. Trials 5, 6 and 8 are similar: these trials show that, by keeping the acid concentration under about 1.5N and the base concentration at a maximum of about 2N by adding water during the batch, the averaged current efficiency is 58%. The overall current efficiency of the process is determined by the lowest current efficiency between the acid and the base.

TABLE 18

| | Trials parameters and titration results. | | | | | | |
| --- | --- | --- | --- | --- | --- | --- | --- |
| | Trial No. | | | | | | |
| | 4 | 4-1 | 4-2 | 4-3 | 5 | 6 | 8 |
| Time (min) | 155 | 65 | 55 | 35 | 105 | 85 | 75 |
| Temperature (° C.) | 36.8 | 30.93 | 39.34 | 40.52 | 39.03 | 37.22 | 36.37 |
| Intensity (A) | 14.39 | 10.00 | 14.00 | 20.00 | 16.48 | 14.24 | 14.40 |
| Current density (mA/cm$^2$) | 71.95 | 50.00 | 70.00 | 100.00 | 82.38 | 71.18 | 72.00 |
| Volt/cell | 2.44 | | | | 2.8 | 2.7 | 2.8 |
| mol water/mol $Li^+$ transferred | 2.31 | | | | 5.37 | 5.42 | 3.98 |
| Acid initial concentration (N) | 0.225 | 0.225 | 1.075 | 2.059 | 0.100 | 0.760 | 0.670 |
| Acid final concentration (N) | 2.610 | 1.075 | 2.059 | 2.610 | 1.890 | 1.390 | 1.430 |
| Base initial concentration (N) | 0.230 | 0.230 | 1.160 | 2.030 | 0.875 | 1.085 | 0.805 |
| Base final concentration (N) | 2.400 | 1.160 | 2.030 | 2.400 | 2.180 | 2.230 | 2.000 |
| Q th | 9.71 | 2.83 | 3.36 | 3.05 | 7.53 | 5.27 | 4.70 |
| Qa (%) | 49.14 | 60.09 | 58.72 | 36.17 | 59.43 | 56.30 | 56.67 |
| Qb (%) | 49.65 | 65.75 | 51.92 | 40.04 | 54.91 | 58.36 | 59.36 |

Table 19 shows the salt conversion ratio and current efficiency for the base according to the cations analysis results obtained. The highest conversion rate obtained was 31% but could have been higher by continuing to convert the same solution for more than one trial (when the acid and base reached the maximum concentrations). For the purpose of this study, the salt was changed for each trial to keep the same initial conditions. Therefore, while not wishing to be limited by theory, the relatively low conversion rate is due to the choice of the testing conditions.

TABLE 19

Salt conversion and current efficiency based on the total $Li^+$, $Na^+$, $K^+$ and $Ca^{2+}$ content of each fraction.

| | Trial No. | | | | | | |
|---|---|---|---|---|---|---|---|
| | 4 | 4-1 | 4-2 | 4-3 | 5 | 6 | 8 |
| Salt In (eq/L) | 3.34 | 3.34 | 3.10 | 2.59 | 2.80 | 3.50 | 3.55 |
| Salt Out (eq/L) | 2.41 | 3.10 | 2.59 | 2.41 | 1.92 | 2.64 | 2.85 |
| Conversion (%) | 28.05 | 7.37 | 16.28 | 7.22 | 31.15 | 24.73 | 19.72 |
| Base In (eq/L) | 0.34 | 0.34 | 1.12 | 1.93 | 0.89 | 1.12 | 0.82 |
| Base Out (eq/L) | 2.41 | 1.12 | 1.93 | 2.41 | 2.17 | 2.26 | 1.99 |
| Current efficiency Base (%) | 47.49 | 55.32 | 48.17 | 46.94 | 54.21 | 58.20 | 58.15 |

The current efficiencies obtained by the base analysis confirm those obtained by titration for Trials 5, 6 and 8 and the decrease of efficiency observed as a function of the increasing concentration for Trial 4. The chemical analysis of the base showed that the final base contained 78% of lithium (see Table 20 for all chemical results).

TABLE 20

Chemical analysis results.

| Sample ID | Li (mg/L) | Na (mg/L) | K (mg/L) | Ca (mg/L) | Total (eq/L) |
|---|---|---|---|---|---|
| In - Product T1-T5 | 23400 | 4460 | 127 | 3.2 | 3.51 |
| In - Product T6-T8 | 23200 | 4360 | 129 | 3.2 | 3.47 |
| 4.1 Salt - In | 22300 | 4360 | 121 | 3.2 | 3.34 |
| 4.2 Salt - 65 min | 21500 | — | — | — | 3.10 |
| 4.3 Salt - 120 min | 18000 | — | — | — | 2.59 |
| 4.4 Salt - F | 16300 | 1940 | 28 | 2.7 | 2.41 |
| 5.1 Salt - In | 18600 | 3830 | 115 | 2.9 | 2.80 |
| 5.2 Salt - F | 13000 | 1740 | 23 | 2.1 | 1.92 |
| 6.1 Salt - In | 23300 | 4820 | 128 | 3.2 | 3.50 |
| 6.2 Salt - F | 17700 | 2870 | 54 | 3.3 | 2.64 |
| 8.1 Salt - In | 23600 | 4900 | 139 | 3.3 | 3.55 |
| 8.2 Salt - F | 19100 | 3220 | 66 | 3 | 2.85 |
| 4.5 Acid - In | 461 | — | — | — | 0.07 |
| 4.6 Acid - 65 min | 577 | — | — | — | 0.08 |
| 4.7 Acid - 120 min | 639 | — | — | — | 0.09 |
| 4.8 Acid - F | 646 | — | — | — | 0.09 |
| 5.3 Acid - In | 102 | — | — | — | 0.01 |
| 5.4 Acid - F | 236 | — | — | — | 0.03 |
| 6.3 Acid - In | 75 | — | — | — | 0.01 |
| 6.4 Acid - F | 125 | — | — | — | 0.02 |
| 8.3 Acid - In | 79.8 | — | — | — | 0.01 |
| 8.4 Acid - F | 129 | — | — | — | 0.02 |
| 4.9 Base - In | 2270 | 469 | 11 | 1.5 | 0.34 |
| 4.10 Base - 65 min | 7800 | — | — | — | 1.12 |
| 4.11 Base - 120 min | 13400 | — | — | — | 1.93 |
| 4.12 Base - F | 15900 | 3800 | 126 | 3.9 | 2.41 |
| 5.5 Base - In | 5890 | 1360 | 43 | 1.6 | 0.89 |
| 5.6 Base - F | 14300 | 3770 | 124 | 3.3 | 2.17 |
| 6.5 Base - In | 7340 | 2040 | 45 | 2.3 | 1.12 |
| 6.6 Base - F | 14800 | 4110 | 134 | 3.7 | 2.26 |
| 8.5 Base - In | 5320 | 1760 | 45 | 1.4 | 0.82 |
| 8.6 Base - F | 13100 | 3270 | 133 | 2.6 | 1.99 |

III. Conclusions

This example shows that the conversion of lithium sulfate into lithium hydroxide and sulfuric acid is useful up to concentrations of about 2N for the base and about 1.5N for the acid. The conversion of the salt may be increased by continuing to convert the same salt solution when the acid and base reach these concentrations. Based on the obtained results, the Bipolar Membrane Electrodialysis technology appears to be useful.

While a description was made with particular reference to the specific embodiments, it will be understood that numerous modifications thereto will appear to those skilled in the art. Accordingly, the above description and accompanying drawings should be taken as specific examples and not in a limiting sense.

What is claimed is:

1. A process for preparing lithium hydroxide, said process comprising:
   submitting an aqueous composition comprising lithium sulphate to an electrolysis under conditions suitable for converting at least a portion of said lithium sulphate into lithium hydroxide;
   wherein during said electrolysis, said aqueous composition comprising lithium sulphate is at least substantially maintained at a pH having a value of about 1 to about 4;
   wherein said aqueous composition comprising lithium sulphate is prepared by a process comprising:
   leaching an acid roasted lithium-containing material with water so as to obtain an aqueous composition comprising $Li^+$ and at least one metal ion, wherein said lithium-containing material is a material that has been previously reacted with $H_2SO_4$;
   reacting said aqueous composition comprising $Li^+$ and said at least one metal ion with a base so as to obtain a pH of about 4.5 to about 6.5 and thereby at least partially precipitating said at least one metal ion under the form of at least one hydroxide so as to obtain a precipitate comprising said at least one hydroxide and an aqueous composition comprising $Li^+$ and having a reduced content of said at least one metal ion, and separating said aqueous composition from said precipitate comprising said at least one hydroxide;
   reacting said aqueous composition comprising $Li^+$ and having said reduced content of said at least one metal ion with another base so as to obtain a pH of about 9.5 to about 11.5, thereby at least partially precipitating at least one metal ion so as to obtain a precipitate and an aqueous composition comprising $Li^+$ and having a reduced content of said at least one metal ion;

seperating said aqueous composition from said precipitate; and contacting said aqueous composition comprising Li⁺ and having said reduced content of said at least one metal ion with an ion-exchange resin so as to at least partially remove at least one metal ion from said composition, thereby obtaining said aqueous composition comprising lithium sulphate.

2. The process of claim 1, further comprising:

reacting said aqueous composition comprising Li⁺ and having said reduced content of said at least one metal ion with said another base and with at least one metal carbonate, thereby at least partially precipitating at least one metal ion under the form of at least one carbonate so as to obtain a precipitate comprising said at least one carbonate and an aqueous composition comprising Li⁺ and having a reduced content of said at least one metal ion; and separating said aqueous composition from said precipitate comprising said at least one carbonate.

3. The process of claim 1, wherein during said electrolysis, said pH is at least substantially maintained at a value of about 2 to about 4.

4. The process of claim 1, wherein during said process said aqueous composition comprising lithium hydroxide is at least substantially maintained at a concentration of lithium hydroxide of about 35 to about 70 g/L.

5. The process of claim 1, wherein during said process said aqueous composition comprising sulphuric acid is at least substantially maintained at a concentration of sulphuric acid of about 20 to about 50 g/L.

6. The process of claim 1, wherein during said process said aqueous composition comprising lithium sulphate is at least substantially maintained at a concentration of lithium sulphate of about 10 to about 20 g/L.

7. The process of claim 1, wherein during said process, temperature of said aqueous composition comprising lithium sulphate is at least substantially maintained at a value of about 20 to about 80° C.

8. The process of claim 1, wherein during said process, temperature of said aqueous composition comprising lithium sulphate is at least substantially maintained at a value of about 50 to about 60° C.

9. The process of claim 1, wherein during said process electrical current is at least substantially maintained at a density of about 400 to about 3000 A/m².

10. The process of claim 1, wherein during said process electrical current is at least substantially maintained at a constant value.

11. The process of claim 1, wherein during said process voltage is at least substantially maintained at a constant value.

12. The process of claim 1, wherein an anolyte used during said process comprises ammonia.

13. The process of claim 1, further comprising adding ammonia in an anolyte used for said process, thereby generating an ammonium salt.

14. The process of claim 13, wherein said ammonium salt is (NH₄)₂SO₄.

15. A process for preparing lithium hydroxide, said process comprising:

submitting an aqueous composition comprising a lithium compound to an electrolysis under conditions suitable for converting at least a portion of said lithium compound into lithium hydroxide;

wherein during said electrolysis, said aqueous composition comprising said lithium compound is at least substantially maintained at a pH having a value of about 1 to about 4;

wherein said aqueous composition comprising said lithium compound is prepared by a process comprising:

leaching an acid roasted lithium-containing material with water so as to obtain an aqueous composition comprising Li⁺ and at least one metal ion;

reacting said aqueous composition comprising Li⁺ and said at least one metal ion with a base so as to obtain a pH of about 4.5 to about 6.5 and thereby at least partially precipitating said at least one metal ion under the form of at least one hydroxide so as to obtain a precipitate comprising said at least one hydroxide and an aqueous composition comprising Li⁺ and having a reduced content of said at least one metal ion, and separating said aqueous composition from said precipitate comprising said at least one hydroxide;

reacting said aqueous composition comprising Li⁺ and having said reduced content of said at least one metal ion with another base so as to obtain a pH of about 9.5 to about 11.5, thereby at least partially precipitating at least one metal ion so as to obtain a precipitate and an aqueous composition comprising Li⁺ and having a reduced content of said at least one metal ion;

separating said aqueous composition from said precipitate; and contacting said aqueous composition comprising Li⁺ and having said reduced content of said at least one metal ion with an ion exchange resin so as to at least partially remove at least one metal ion from said composition, thereby obtaining said aqueous composition comprising said lithium compound.

16. The process of claim 15, further comprising:

reacting said aqueous composition comprising Li⁺ and having said reduced content of said at least one metal ion with said another base and with at least one metal carbonate, thereby at least partially precipitating at least one metal ion under the form of at least one carbonate so as to obtain a precipitate comprising said at least one carbonate and an aqueous composition comprising Li⁺ and having a reduced content of said at least one metal ion; and separating said aqueous composition from said precipitate comprising said at least one carbonate.

17. The process of claim 15, wherein during said electrolysis, said pH is at least substantially maintained at a value of about 2 to about 4.

18. The process of claim 15, wherein said aqueous composition comprising said lithium compound comprises lithium sulphate, lithium chloride, lithium fluoride, lithium carbonate, lithium bicarbonate, lithium acetate, lithium stearate or lithium citrate.

* * * * *